United States Patent [19]

Karlin et al.

[11] 4,270,174
[45] May 26, 1981

[54] REMOTE SITE ENGINE TEST TECHNIQUES

[75] Inventors: Richard A. Karlin, Chicago; Carl J. Koskinen, Barrington, both of Ill.

[73] Assignee: Sun Electric Corporation, Crystal Lake, Ill.

[21] Appl. No.: 9,258

[22] Filed: Feb. 5, 1979

[51] Int. Cl.³ .............................................. G06F 15/46
[52] U.S. Cl. .................................... 364/551; 364/424; 324/378; 73/116
[58] Field of Search ............... 364/424, 425, 551, 200, 364/900; 324/378–380; 73/116, 117.2, 117.3; 340/151, 52 F, 53

[56] References Cited

U.S. PATENT DOCUMENTS

| | | | |
|---|---|---|---|
| 3,882,305 | 5/1975 | Johnstone | 364/551 |
| 3,906,207 | 9/1975 | Rivere et al. | 364/425 |
| 4,006,461 | 2/1977 | Coulter et al. | 340/151 |
| 4,027,289 | 5/1977 | Toman | 340/151 |
| 4,061,025 | 12/1977 | Willenbecher et al. | 364/424 |
| 4,072,850 | 2/1978 | McGlynn | 364/424 |
| 4,125,894 | 11/1978 | Cashel et al. | 364/424 |

Primary Examiner—Felix D. Gruber
Assistant Examiner—Gary Chin
Attorney, Agent, or Firm—Allegretti, Newitt, Witcoff & McAndrews

[57] ABSTRACT

Digital condition data corresponding to a plurality of engine operating conditions of an internal combustion engine are generated and stored in a memory system for visual display to an operator mechanic. Particular data from the memory are converted from a parallel digital format to a serial digital format for transmission to a remote site computer across telephone lines. The remote site computer analyzes the data and returns the diagnostic results for visual display to the operator mechanic.

23 Claims, 21 Drawing Figures

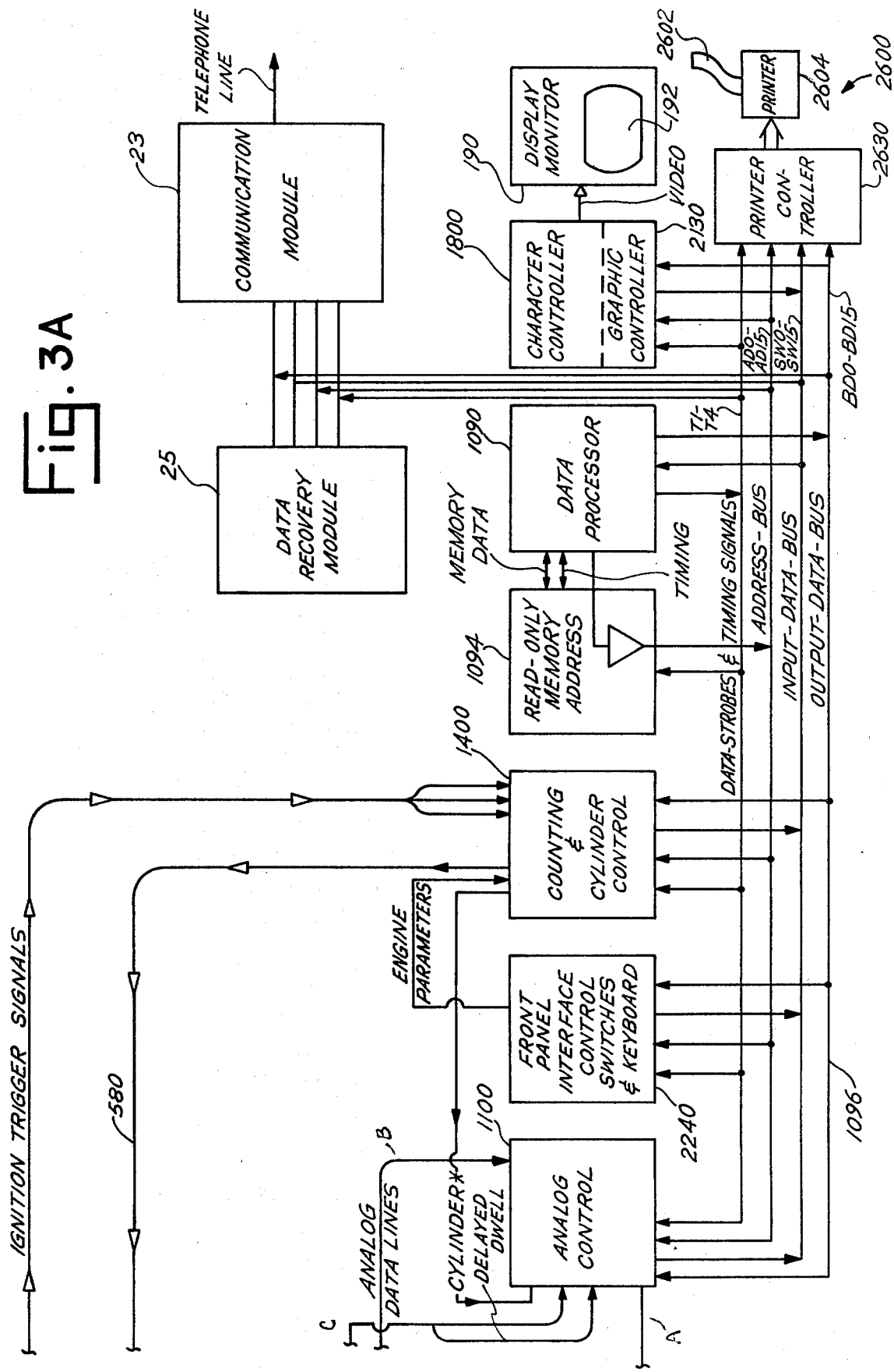

Fig. 5

|   | TEST 1-CRANKING |  |
|---|---|---|
| DISABLE IGNITION | | |
| CRANK ENGINE | | |
| BATTERY | XX.X | VOLTS |
| STARTER DRAW | XXX | AMPS |
| CRANKING SPEED | XXXX | RPM |
| DYN. DIST. RES. | X.XX | VOLTS |
| DWELL | XX.X | DEG |
| COIL OUTPUT | XX | KV |

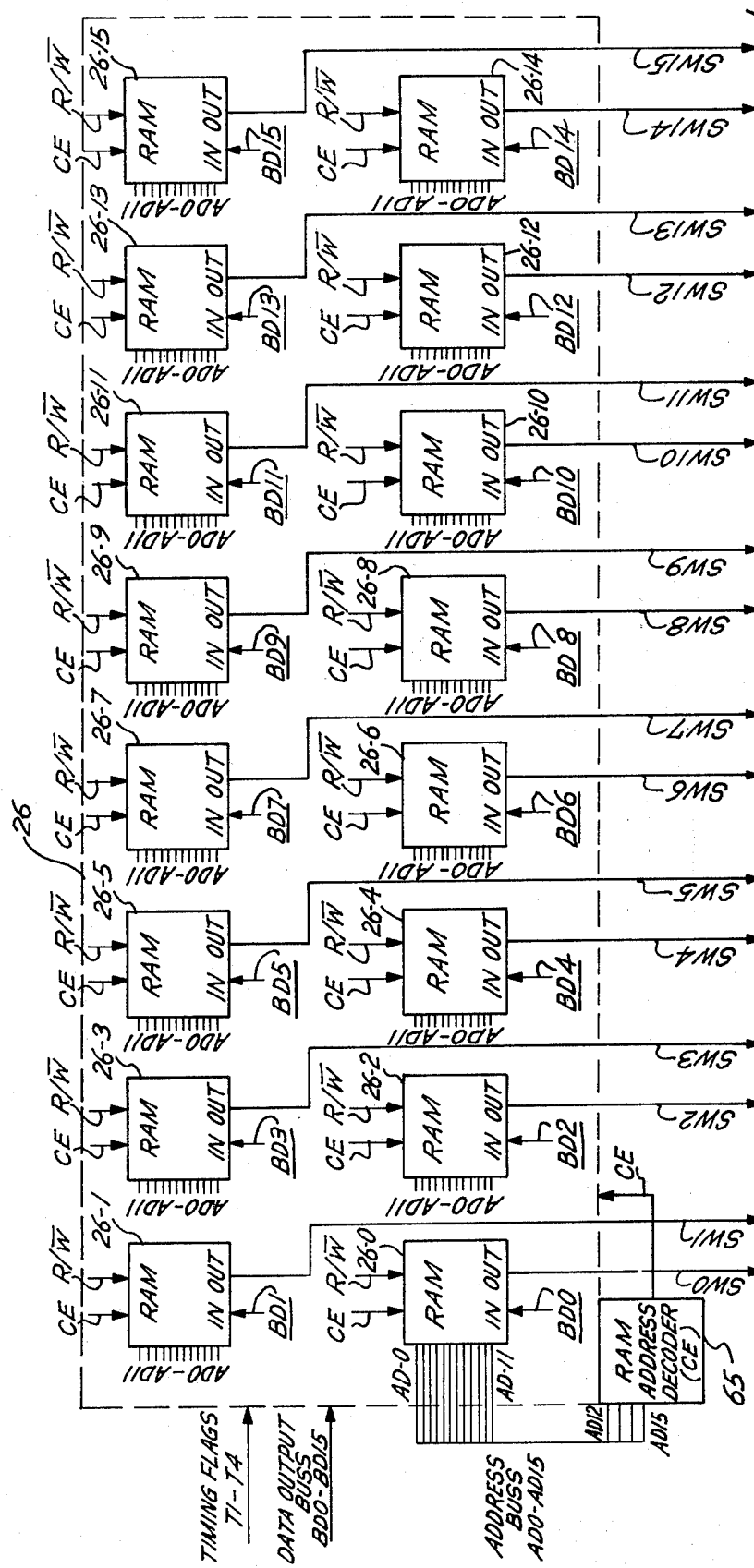

Fig. 15

```
         TEST 1-CRANKING

BATTERY          =   0.   VOLTS
   LO LIMIT         = 9.6    VOLTS
   CHECK CHARGING/STARTER SYSTEM

STARTER DRAW     =   0.   AMPS
   LO LIMIT         =  80    AMPS
   CHECK STARTER STYSTEM

DWELL            =   0.   DEG
   LO LIMIT         =  28    DEG
   ADJUST DWELL
```

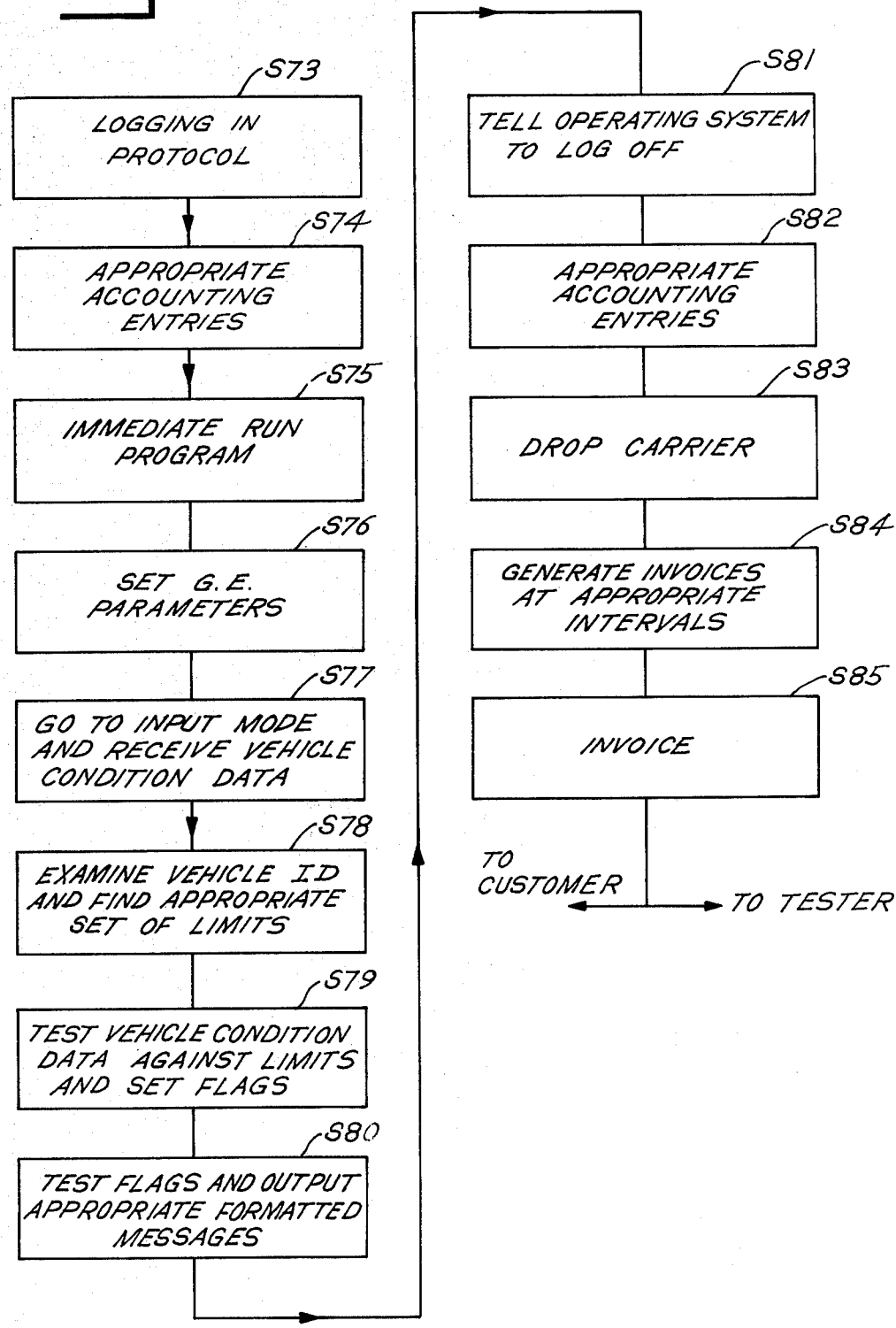

REMOTE SITE ENGINE TEST TECHNIQUES

BACKGROUND OF THE INVENTION

The invention relates to internal combustion engine testing apparatus, and more particularly relates to apparatus for enabling the (1) acquisition of engine condition data, (2) analysis of the condition data to obtain diagnostic data, and (3) display of the diagnostic data.

In U.S. Application Ser. No. 641,362, now abandoned entitled "ENGINE TEST AND DISPLAY APPARATUS", filed Dec. 16, 1975, in the names of Cashel et al., a system for performing engine analysis and for displaying the results thereof on a CRT screen is described. In such a system, which recovers raw measurements from an internal combustion engine, it is necessary to process the measurements to a form which communicates to the operator the operating conditions of the engine. In order to provide a correct operational analysis of the particular vehicle engine being tested, the processed measurements must be compared with a data base containing the normal operating conditions of the engine.

The system described in the above-identified application provides a means for monitoring an internal combustion engine and making necessary measurements with regard to the engine's operation. It further provides a means for processing these measurements, and visually displaying the measurement results to the operator.

However, the operator must provide his own data base (as, for example, through engine operational manuals and look-up tables) related to the specific engine under test. The operator must use his own ingenuity and experience to analyze the discrepancies found between the information of the tables and the empirical measurements taken.

Such an analysis is limited by the mechanic's skill and experience. The mechanic is also required to maintain voluminous look-up tables and manuals, and is forced to continually purchase new manuals and update existing ones.

However, if the operator mechanic had a large scale computer system in his garage, he could quickly call for operational table data to be displayed on the computer readout to make his comparisons. The operator might also feed into the computer the raw measurement data and program the computer to analyze the discrepancies existing between the empirical measurements and the data base.

The average engine mechanic, however, does not have the computer skills nor the programming skills to successfully operate such a system. Nor does the mechanic have the time to continually update the data base as new automobiles come onto the market throughout the year. And, finally, the great expense of a large scale computer system makes such an idea totally impractical.

SUMMARY OF THE INVENTION

It is, therefore, an object of the present invention to provide an improved engine analyzer which is capable of analyzing empirical measurements with a large data base and displaying the results of the engine analysis on a display device remote from the location of the data base.

It is another object of the present invention to provide apparatus which permits an engine mechanic to have access to a large scale computer system, directly from his garage or workshop.

It is a further object of the present invention to provide apparatus for causing automatic diagnosis of an internal combustion engine by a large scale computer system without the need for a computer-skilled technician.

It is a further object of the present invention to provide apparatus having an engine test analysis data base which is continuously updatable.

It is another object of the present invention to provide engine analysis apparatus usable by a plurality of operators and having inexpensive and accurate billing performed by the apparatus.

It is yet another object of this invention to provide sophisticated analysis of engine data by an engine mechanic.

It is yet another object of the present invention to provide an engine analyzer in which data is simultaneously entered into a buffer memory of a display device, a buffer memory of a printing device and a buffer memory of a transmitting device.

It has been discovered that these objectives can be accomplished by acquiring, at the sites of engines, condition data quantitatively defining the conditions of those engines, and transmitting the condition data, preferably along telephone lines, to a remote site central computer for processing. After the condition data has been compared to a data base by the remote central computer, diagnostic data is transmitted back to the engine sites for visual display on a display device. By acquiring the condition data at individual engine sites but analyzing the data by means of a central computer, engines can be economically analyzed with a degree of accuracy previously unavailable. By using this unique arrangement, the analytical data base of the central computer can be rapidly updated with the latest data. The central computer can be conveniently reprogrammed with the latest diagnostic routines without changing any of the acquisition systems located at the engine sites. To the engine mechanic the system operates as if he had a sophisticated engine data processor in his own shop.

Other objects, features and advantages of the invention will be readily apparent from the following description of the preferred embodiment, taken in conjunction with the appended claims and accompanying drawings.

BRIEF DESCRIPTION OF THE DRAWINGS

FIG. 3A is a system block diagram of a preferred form of one data acquisition installation shown in FIG. 2.

FIG. 5 illustrates a preferred format display of the CRT screen of FIG. 3A.

FIGS. 6A and 6B are schematic diagrams of another portion of the recovery module of the preferred system of FIG. 3A.

FIG. 15 illustrates a preferred format display of diagnostic data of the CRT screen of FIG. 3A.

FIG. 16 is a flow chart illustrating a preferred control sequence of the remote site central computer of FIG. 2.

DESCRIPTION OF THE PREFERRED EMBODIMENT

Introduction

Figure 1:
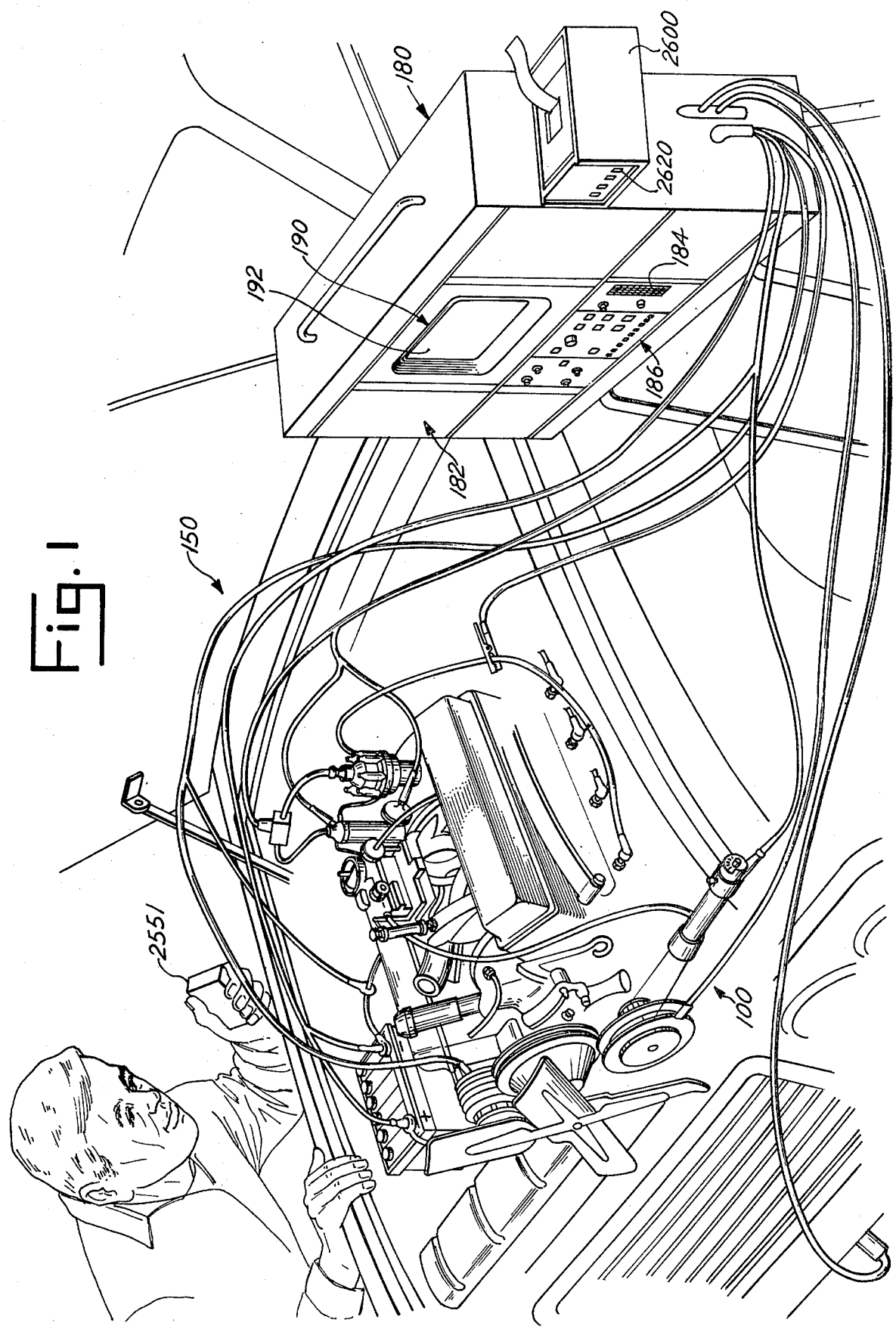
FIG. 1 is a perspective view of an internal combustion engine that is connected to a preferred form of the present invention.

Referring to FIG. 1, an engine data acquisition and display apparatus is illustrated which is capable of conducting specific area tests of an automotive engine 100 in order to locate a general area of engine malfunction. The apparatus of FIG. 1 is fully described in U.S. Application Ser. No. 798,181, now U.S. Pat. No. 4,125,894 filed May 18, 1977, a continuation of Ser. No. 641,362, entitled ENGINE TEST AND DISPLAY APPARATUS, filed Dec. 16, 1975, in the names of Cashel et al., (now abandoned) which are incorporated herein by reference, and portions of which are repeated herein with like reference symbols used to designate like parts to facilitate an explanation of the present invention.

Figure 2:
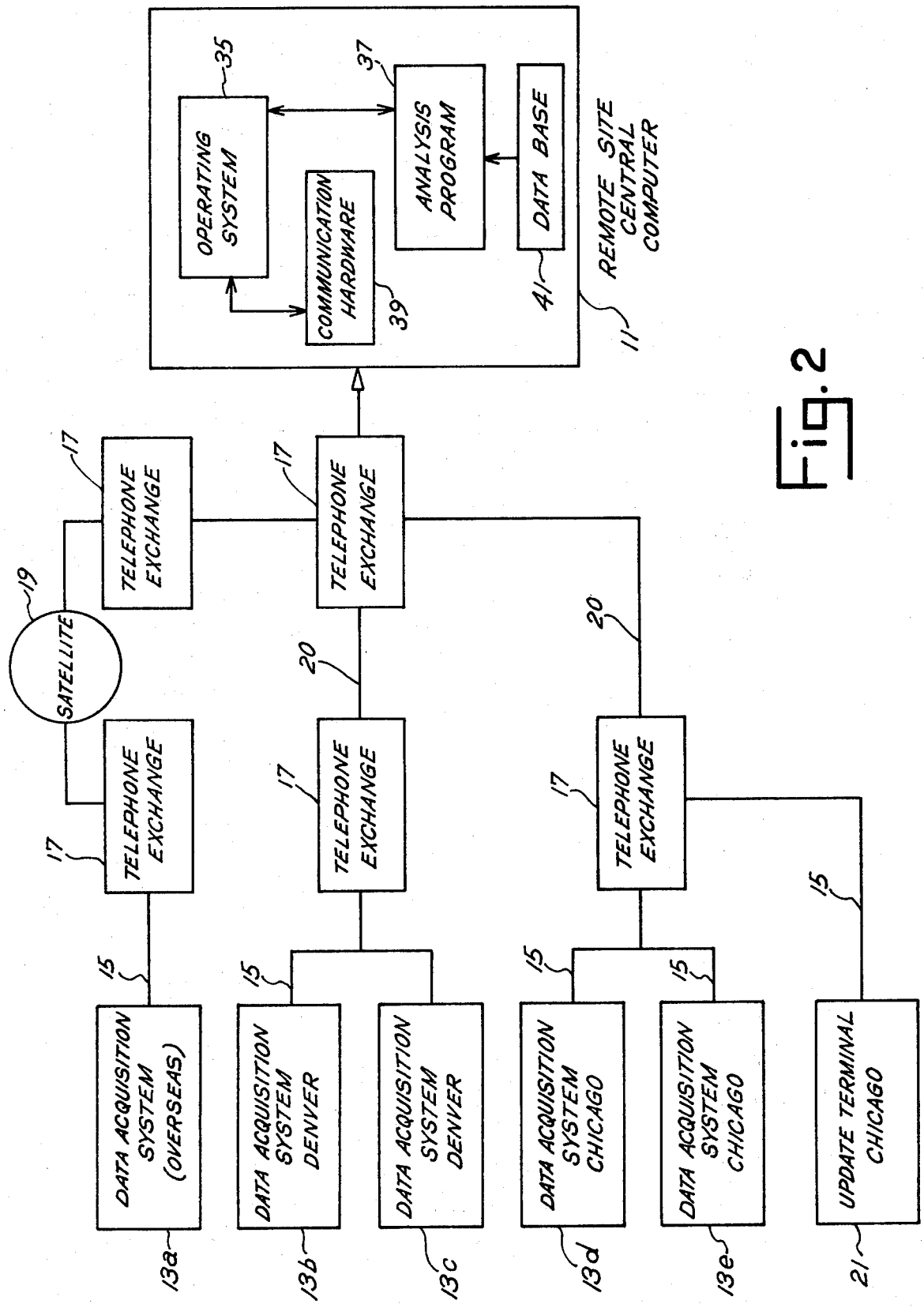
FIG. 2 is a block diagram of a preferred form of a diagnostic system made in accordance with the present invention.

The apparatus of FIG. 1 is combined with apparatus according to the present invention for communicating with a remote site central computer (RSCC) 11, as shown diagrammatically in FIG. 2, for fault analysis of the particular engine undergoing test. A plurality of data acquisition and display installations 13a-e of FIG. 2, each having the apparatus of FIG. 1, are linked to RSCC 11 from a plurality of remote cities. Each such installation is capable of acquiring data from a separate engine. The installations 13a through 13e are connected via telephone lines 15 to various telephone exchanges 17 which are in turn linked, as for example, by satellite 19, or long lines 20, to the RSCC 11.

RSCC 11 preferably is a General Electric operating system 35 which handles all communication protocol and provides the means for an analysis program 37 to transmit and receive information via communication hardware 39. The analysis program 37 consults a data base 41 which provides the specificational limits for the vehicular parameters or conditions of each of the engines measured by the data acquisition installations. The GE system, of course, includes a data processor and a memory.

The data base 41 may be updated by an update terminal 21 located remotely from the RSCC 11. The update terminal 21 may be any of the popular 2-way terminals as for example: a Teletype 33 ASR, a Texas Instruments 733ASR, a General Electric Terminet 30, or an ADDS-980. The GE system may be accessed by the terminal in order to alter the data base or the analysis program. This is an important feature which enables the data base to stay current and enables the latest analysis routines to be used for diagnosis of all the engines, wherever located.

RSCC 11 may include any computer of the requisite computing power with sufficient memory, but preferably a utility system, such as that operated by General Electric business information systems division, is utilized. Further information on the GE operating system 35 can be obtained from GE business information services.

FIG. 1 illustrates exemplary data acquisition apparatus 13b. The remaining acquisition installations may be identical to installation 13b and can be understood from the following description. Certain aspects of the data acquisition apparatus shown in FIG. 1 are described in Application Ser. No. 641,362. By means of a keyboard 184 and a control switch assembly 186, an operator may command the apparatus to automatically evaluate the engine under various test procedures. As a particular group of the components of engine 100 (e.g. the starter system) is evaluated by means of an "area test", the critical conditions or parameters of that engine component group are measured and displayed on CRT face 192. The display on the CRT face may be printed on a paper tape readout by a print system 2600 which is fully described in U.S. Application, Ser. No. 756,532, now U.S. Pat. No. 4,145,746 entitled "CRT ALPHA NUMERIC COPY PRINTER", filed Jan. 3, 1977, in the names of Trussell et al., which is incorporated herein by reference.

As illustrated in FIG. 1, the operator connects a plurality of cables, generally indicated by numeral 150, to appropriate components of engine 100. The cables permit acquisition apparatus 13b to sense the operating parameters or conditions of the engine under test. The apparatus includes a case assembly 180 comprising a front panel 182 which includes a keyboard 184. The panel also includes a control switch assembly 186 which performs various input control functions.

The case assembly is fitted around a conventional video display monitor 190, such as Model XM-702-72, manufactured by Motorola Corp., Chicago, Ill., having a cathode ray tube with a display face 192 for displaying data in alphabetic, numeric or graphical form.

Engine parameter information is retrieved from the engine via cables 150 in a manner described in the above-identified applications and is fed along lines A, B, C and E of FIG. 3A to an analog control circuitry 1100 and a counting and cylinder control circuitry 1400 of apparatus 13b. Analog control 1100 sets up and controls data acquisition circuits described in the above-identified applications so that various analog parameters or conditions of the engine are systematically channeled to a single analog-to-digital converter which makes the value of the parameter available to a data processor 1090 in the form of a digital measurement signal.

Counting and cylinder control 1400 is utilized by data processor 1090 to designate particular cylinders of engine 100 for shorting or sampling of engine parameters. Shorting commands are fed to engine 100 from counting and cylinder control 1400 via line 580 in order to obtain information relating to parameter values of a particular cylinder of engine 100. Counting and cylinder control circuitry 1400 is also used to derive parameter information in the form of digital numbers.

The overall processing and management of the acquisition apparatus is controlled by data processor 1090. The processor performs a number of tasks which may be summarized as follows:

(1) measurement signals are received from analog control 1100 and counting and cylinder control 1400 which measure the parameters or conditions of the engine being tested;

(2) signals received from the analog control and the counting and cylinder control are manipulated to provide output commands and condition data to a character controller 1800, a graphic controller 2130 and a printer controller 2630 which enable the display and printing of alphabetic, numeric or graphical information on display monitor 190 and printer 2604; and (3) the status of keyboard 184 and control switch assembly 186 via front panel interface 2240 is periodically monitored to determine the type of engine being tested and the kind of test desired by the operator.

As shown in FIG. 3A, data processor 1090 treats analog control 1100, counting and cylinder control 1400, character controller 1800, graphic controller 2130, printer controller 2630 and front panel interface 2240 as peripheral devices which are interconnected by means of a processing bus 1096. The bus includes output data bus conductors BDO-BD15, input data bus conductors SWO-SW15, address conductors ADO-AD15 and timing signal conductors T1-T4. The signal mnemonics for the pulses transmitted on conductors T1-T4 are shown in TABLE A.

TAbLE A

| Timing Signal Conductor | Signal Mnemonic |
|---|---|
| T1 | RSET* |
| T2 | READ STROBE |
| T3 | WRITE STROBE |
| T4 | CLK* |

(Throughout this specification, an asterisk (*) is used to identify the inverse or complement of a pulse or signal identified without an asterisk.)

Figure 3B:
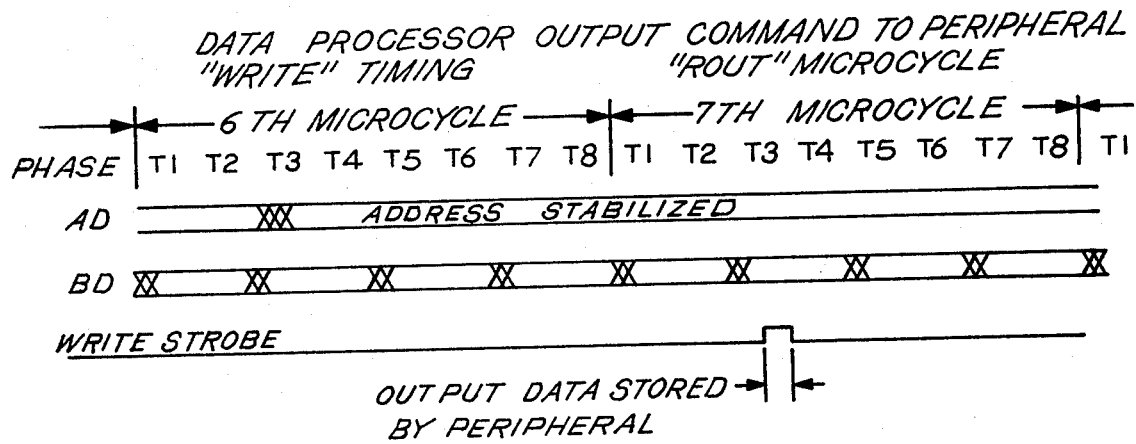
FIGS. 3B and 3C are timing diagrams showing the manner in which data is transmitted and received by the data processor of FIG. 3A.

The manner in which the data processor outputs commands to peripheral devices, such as analog controller 1100 or counting and cylinder control 1400, is shown in FIG. 3B. The data processor operates through a number of microcycles, the 6th and 7th of which are illustrated in FIG. 3B. The bits of data transmitted in the output commands are communicated to the peripheral device over output data bus conductors BDO-BD15. In order to have the data on the BD conductors received by the proper peripheral devices, the proper address of the peripheral device must be placed on the address (AD) conductors during phase T3 of the 6th micro cycle (FIG. 3B).

During the remaining portion of the 6th microcycle and throughout the 7th microcycle, the address identifying bits on the AD conductors are stabilized. Throughout the 6th microcycle and part of the 7th microcycle, information used internally by the data processor continues to be placed on the output BD conductors. This mode of operation is signified by the x's shown in FIG. 3B during phases T3, T5 and T7 of the 6th microcycle and phase T1 of the 7th microcycle. Just prior to phase T3 of the 7th microcycle, the data processor places on the BD output conductors the bits of information intended to be received by the peripheral device addressed by the AD conductors.

As soon as the data has stabilized on the BD conductors, between phases T3 and T4 of the 7th microcycle, the data processor generates a WRITE STROBE pulse. During the duration of the WRITE STROBE, the output data on the BD conductors is stored by the peripheral device for later use. After the WRITE STROBE is returned to its 0 state, a different peripheral device can be addressed and different data can be transmitted to the BD output conductors.

Figure 3C:
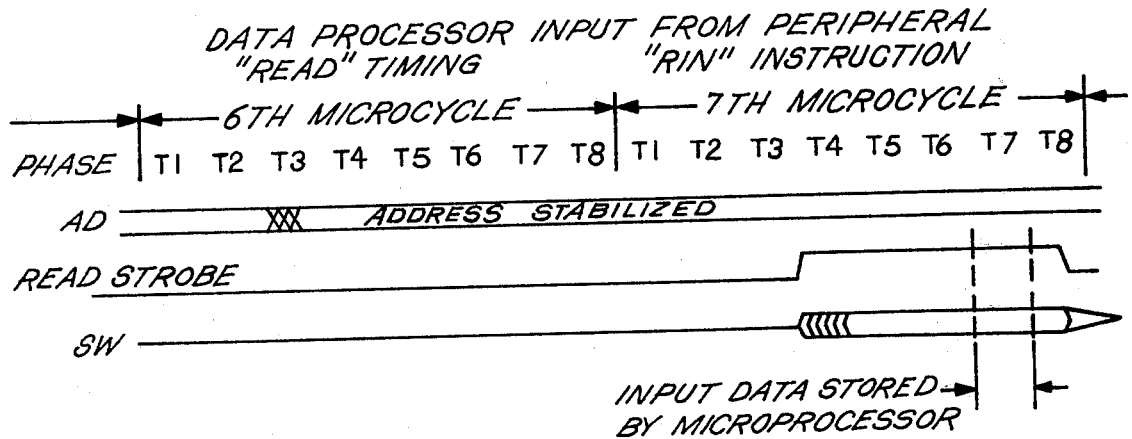

The manner in which the data processor inputs data from a peripheral device is shown in connection with FIG. 3C. As in the case of the output commands, the address of the peripheral device from which information is needed is placed on the address conductors AD during phase T3 of the 6th microcycle. Throughout the remaining portion of the 6th microcycle and the 7th microcycle, this address remains stabilized on the AD conductors. During phase T3 of the 7th microcycle, the data processor transmits a READ STROBE on conductor T2 which enables the peripheral device addressed on conductors AD to transmit bits of data over the input data bus conductors SW. During phase T4 of the 7th microcycle, the input data is stabilized and remains stable until the phase T8 of the 7th microcycle. At the end of the 7th microcycle, the data processor returns the READ STROBE to its 0 state, and then can address a different peripheral device to receive additional information.

One suitable data processor is the IMP-16C manufactured by National Semiconductor Corporation, Santa Clara, California. The IMP-16C is a 16 bit parallel processor having an arithmetic unit and a control unit. The processor includes a read/write memory for temporarily storing values. For example, condition data quantitatively defining various engine conditions or parameters are temporarily stored before they are transmitted to character controller 1800. In this specification and claims, the term "data" means signals and other physical phenomena usable by data processors.

As shown in FIG. 3A, data processor 1090 is used in connection with a read-only memory 1094 having a storage capacity of about 4 k. The IMP-16C processor can be used with a variety of read-only memories as long as they have an access time equal to or less than 850 nanoseconds. Instructions for wiring read-only memory 1094 and connecting it to the processing bus and data processor may be found in the IMP-16C Application Manual published by National Semi-conductor Corporation in January, 1974, (Publication No. 420021C), which is incorporated herein by reference.

In order to transfer information between acquisition system 13b and RSCC 11 of FIG. 2, a communication module 23 and a data recovery module 25 has been added to the apparatus described in the referenced applications, as shown in FIG. 3A. Data processor 1090 treats modules 23 and 25 as peripherals linked by means of processing bus 1096 in a manner similar to character controller 1800 and printer controller 2630.

CHARACTER CONTROLLER

Character controller 1800 is a character generator used to generate the video signal required to display alphabetic, numeric and symbolic characters on the face of the CRT tube located in display monitor 190. As data processor 1090 inputs information to the character controller for display, module 25 simultaneously receives the same information.

For purposes of character display, CRT screen 192 is divided into sixteen horizontal rows and 32 vertical columns permitting a total of 512 characters to be placed on the screen at any one time. The CRT includes an electron beam-producing electron gun which scans the face of the CRT with a predetermined number of parallel beam scan lines at a predetermined rate. Each line is scanned at the same predetermined rate during a time period having a predetermined duration. Character controller 1800 includes a clock, a line counter and a row counter which enables the scan of the electron gun to be divided into rows and lines within a row.

Only one character is entered into the controller 1800 at a time, with a row and column position of the CRT specified. A CHARACTER CONTROLLER WRITE CHARACTER OUTPUT COMMAND is utilized by the data processor to command character display as shown in TABLE 1.

TABLE I
CHARACTER CONTROLLER WRITE CHARACTER OUTPUT COMMAND

| AD2 | AD3 | AD4 | AD5 | AD6 | AD7 | BD0 | BD1-BD6 | BD7-BD11 | BD12-BD15 |
|-----|-----|-----|-----|-----|-----|-----|---------|----------|-----------|
| 1   | 1   | 1   | 0   | 0   | 1   | 0   | ←Character→ | ←Column→ | ←Row→ |

As shown in Table 1, the address of the character controller is transmitted to conductors AD2–AD7 and the BD0 conductor is set to its zero state. The binary code of the character to be entered into the controller is transmitted to conductors BD1–BD6, the column in which the character is to be displayed is transmitted to conductors BD7–BD11 and the row in which the character is to be displayed is transmitted to conductors BD12–BD15. The signals by which the column and row are identified constitute display address signals which determine the location on the CRT screen 192 at which the character is displayed.

Data processor 1090 communicates with controller 1800 for deciding whether a new character can be accepted by the controller. The data processor stores a single "page" of display data in controller 1800 which continuously displays the page of data until a new command is received from data processor 1090.

DATA RECOVERY MODULE

Module 25 utilizes recovery hardware to recover the information displayed on CRT 192 for later transmission to the RSCC 11. As data processor 1090 outputs a character for display to character controller 1800, the particular peripheral address associated with character controller 1800 is placed on address bus lines AD-2–AD7 (TABLE I). Module 25 also responds to the peripheral address of controller 1800 and records the character and location information placed on the output data bus, which is being sent to the character controller.

Figure 4A:
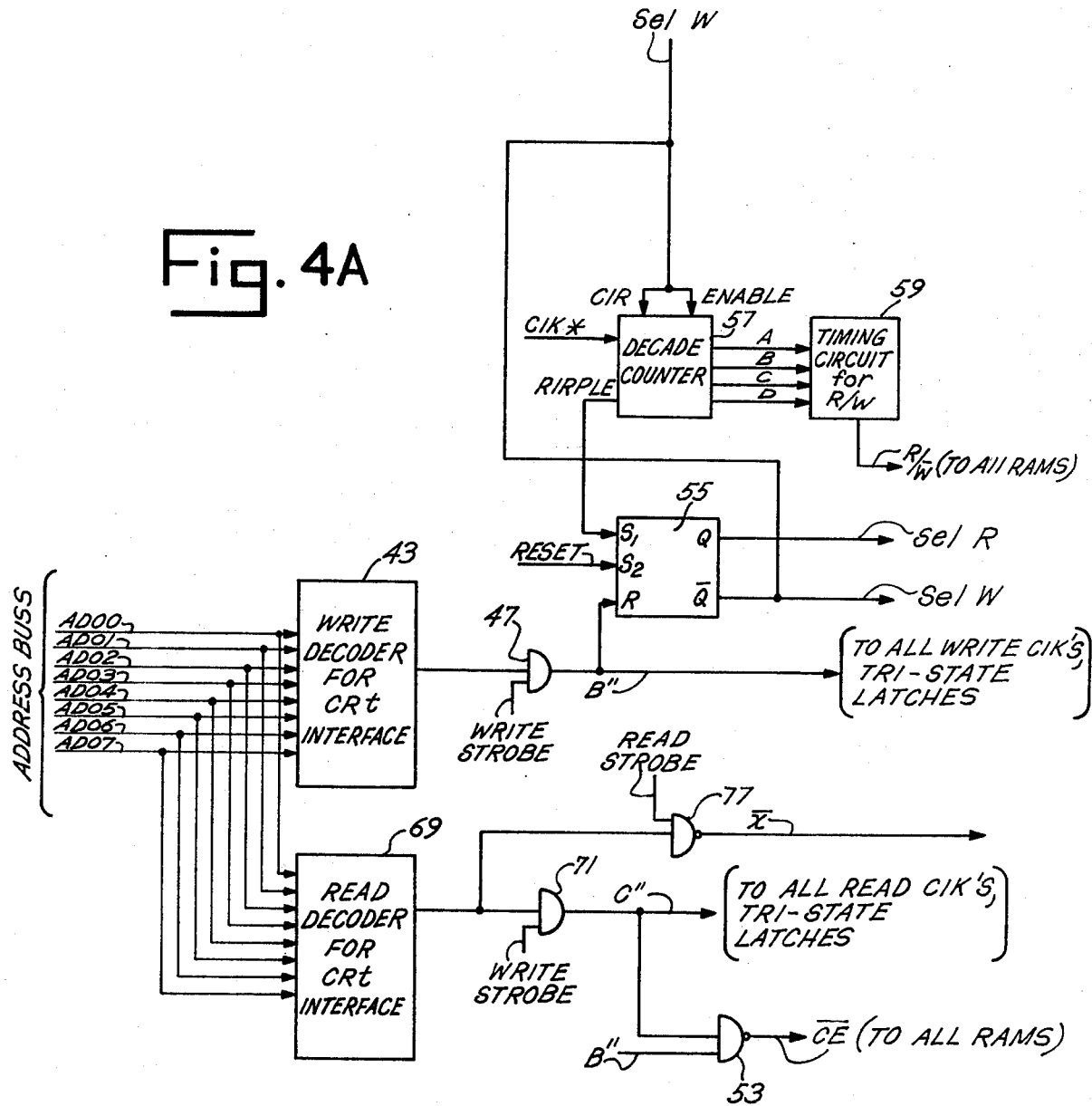
FIGS. 4A and 4B are schematic diagrams of a portion of the recovery module of the preferred system of FIG. 3A.
Figure 4B:
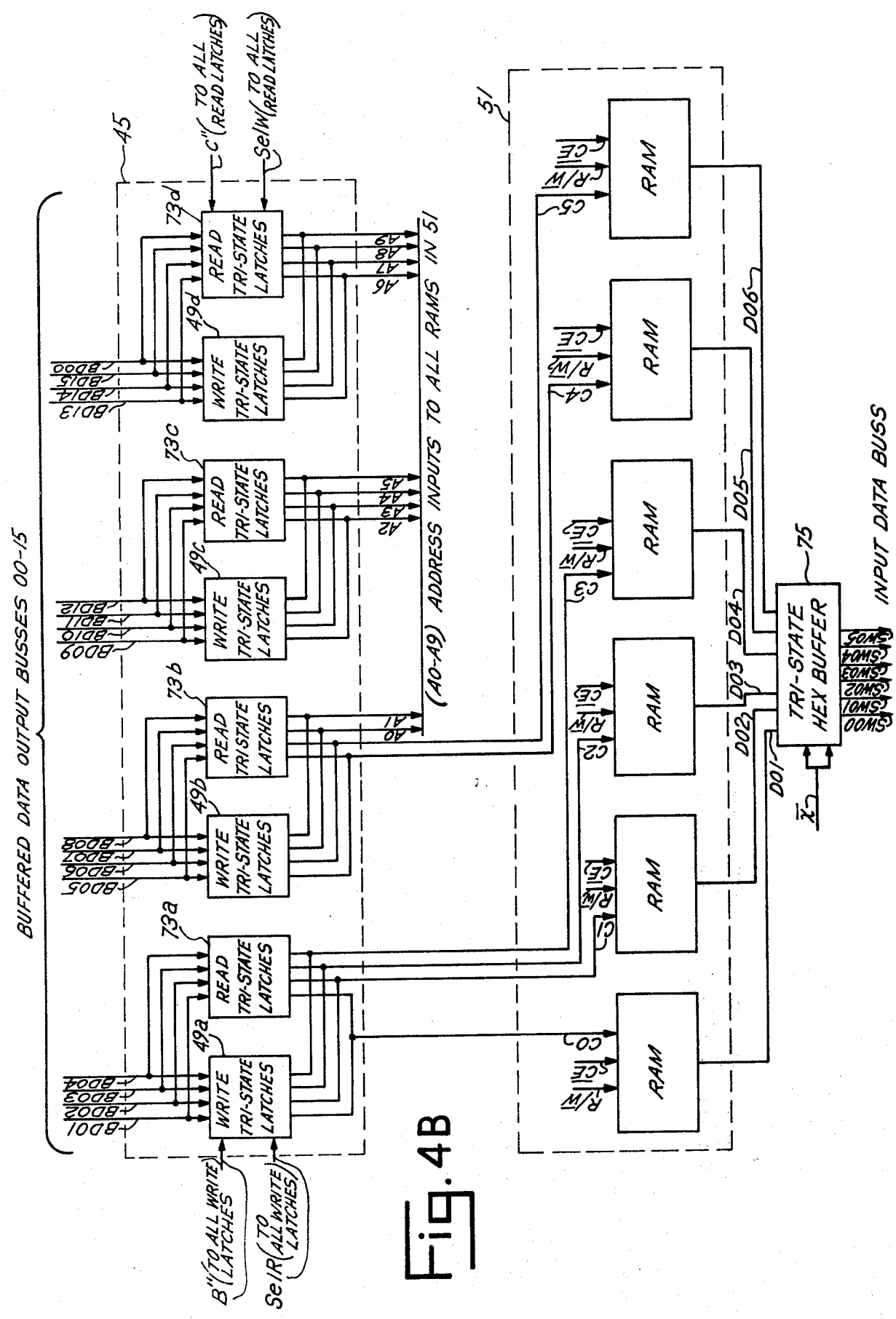

The portion of recovery module 25 shown in FIGS. 4A and 4B is an extension of the memory operated by processor 1090. It includes a write address decoder 43 (FIG. 4A) which recognizes the peripheral address of character controller 1800 and enables a tri-state latch system 45 (FIG. 4B) to receive condition data placed on the output data bus. Decoder 43 cooperates with the write strobe flag from the data processor (FIG. 3B) to produce an output B″ from AND gate 47 which enables write latches 49a–d of the latch system 45 to store the data residing on the output data bus, BD0–BD15. As described above, the data carried by the output data bus BD0–BD15 indicates the row, the column, and the character information utilized to display a particular character.

The character information from bus lines BD0–BD06 recovered in write latches 49a, 49b of FIG. 4B is placed in RAM memory system 51 at RAM inputs C0–C5. The remaining data from output bus lines BD7–BD15 and BD0 recovered in latches 49b–49d (which carry row-column information) are utilized as address inputs to RAM 51 for storing the 6-bit character information at an address location related to the row-column position on the CRT face at which the character is displayed. The output B″ produced by AND gate 47 of FIG. 4A generates signal CE* via NAND gate 53 and generates signal R/W* via flip flop 55, decade counter 57 and timing circuit 59 for enabling RAM 51 to store the character information on RAM inputs C0–C5. Thus, the recovery module 25 recovers the display character information and relates the same to the position where it resides on the CRT in RAM system 51.

SYSTEM PROCESSING AND MANAGEMENT

In order to obtain the analog and digital condition data required for display on the CRT screen, particular area tests are conducted in a program sequenced manner. A portion of the same data is evaluated by RSCC 11 in order to locate a general area of engine malfunction. As the operator pushes a remote control button 2551 (FIG. 1) or a PROCEED button on the keyboard 184, the next area test in the sequence is initiated. Until the operator pushes the PROCEED button, the data processor updates the data on the CRT screen.

Data processor 1090 steps through a basic executive control sequence which is common to all test modes and is used throughout all data acquisition area tests. The executive sequence embodies a basic set of subroutines used to scan the front panel, read entries from the keyboard 184, and display characters and messages on the CRT screen. The executive subroutines, combined with the calls to them embedded within the measurement and computational program segments, form the executive control sequence.

As an area test is entered, the data processor causes a display of the type shown in FIG. 5 to be presented on the CRT face 192. FIG. 5 illustrates the display relating to area test No. 1. However, in place of the x's shown in FIG. 5, the data processor presents condition data in the form of Arabic numbers which quantatively define the parameters shown. These numbers are derived from the data processor program segment.

FIG. 5 is representative of the fact that each area test format is displayed as a single "page" on the CRT face. This simplifies the task of the operator because he can view all of the critical parameters of each area test at a single glance. Additional area tests including display formats are described in the above-identified applications.

In the preferred embodiment, it is desired that the condition data of all area tests be sent to RSCC 11 and that the condition data be stored in the recovery module before a communication link is established with RSCC 11, so that all condition data may be sent as a unit.

While the above-referenced applications teach the flexibility of the apparatus in making selected area testing and pin-point testing, it is desired that the present system utilize the apparatus in an automatic mode, i.e., a mode in which the apparatus is controlled to run through all of the programmed area tests. The placing of the apparatus in such an automatic mode is described in the referenced application Ser. No. 756,532.

At the beginning of each area test, the format for the data display is transmitted to the character controller, one character at a time, by a series of CHARACTER CONTROL WRITE CHARACTER OUTPUT COMMANDS (Table I). As described above, module 25 simultaneously decodes the same commands and stores the single page of information displayed on the CRT in RAM 51 (FIG. 4B).

Since only the numerical engine condition data of the CRT display, shown as x's in FIG. 5, needs to be transmitted to RSCC 11, this numerical engine condition data alone is retrieved from RAM 51 and restored in a read-write memory. The storing of specified data from RAM 51 into the read-write memory is accomplished at the completion of each area test so that the RAM 51 needs the capacity to store only a single display page of data.

Communication firmware executed by processor 1090 controls communication between apparatus 13b and RSCC 11. For example, the firmware saves the specific vehicular condition data of each area test. The communication firmware routine is called after completion of an area test and control thereafter is passed back to the acquisition firmware if additional area tests are to be made. The communication firmware determines which area test is being displayed and jumps to a corresponding "AREA SAVE ROUTINE" to save the necessary vehicular measurements of the display as indicated by that particular SAVE ROUTINE. Each AREA SAVE ROUTINE has its own tables to determine which characters on the CRT are to be saved and where they are to be saved in the read-write memory.

The read-write memory referred to above could be part of the memory inside processor 1090. Likewise the communication firmware could be part of ROM 1094. However, in the preferred embodiment, the read-write memory and communication firmware form part of recovery module 25.

Figure 6B:
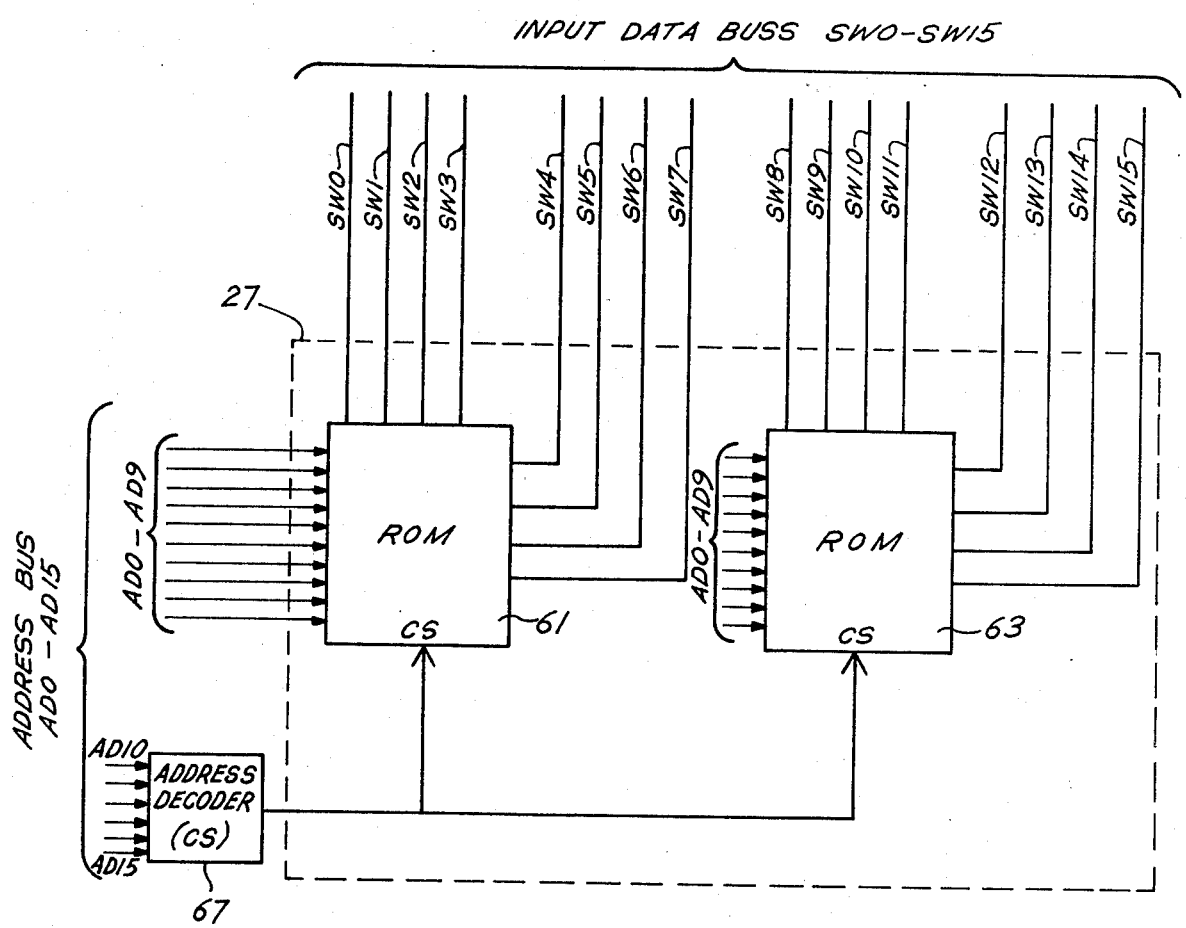

Referring to FIGS. 6A and 6B, additional read-write memory 26 (FIG. 6A) is illustrated in conjunction with communication firmware 27 (FIG. 6B). Firmware 27 includes read-only memories (ROM's) 61, 63 for storing a communication firmware program (SPECL B). Read-write memory 26 is formed of a random access memory utilized to execute certain sections of the communication firmware subroutines, to store the recovered vehicular condition data before transmission to RSCC 11 and to store the received diagnostic analysis results from RSCC 11. The communication firmware routines and the additional RAM memory 26 may be implemented in core memory (Micro Memory Incorporated LM 416-N used in the IMP-16 Microcomputer). Further information in regard to this interface technique may be found in the LM 416-N technical manual, pages 1-9, incorporated herein by reference.

The RAM and ROM required for communication with RSCC 11 also can be implemented in a static RAM arrangement using standard commercial parts such as National Semiconductor RAM number MM5257 or Advanced Micro Devices number AM9140 or equivalent, and the National Semiconductor ROM Number MM5249 or the Advanced Micro Devices number AM9208 or equivalent.

In the preferred embodiment RAM 26 (FIG. 6A) includes MM5257 chips 26-0 through 26-15, each capable of storing four thousand one-bit words. ROMs 61 and 63 (FIG. 6B) each comprise an AM9208 chip capable of storing one thousand 8-bit words.

As illustrated in FIGS. 6A and 6B, the read-write memory 26 and firmware 27 are addressable along address bus AD0-AD15 by data processor 1090. Address bits 12-15 of the address bus are decoded by RAM address decoder 65 in conjunction with a write flag from the data processor for writing data into read-write memory 26 from the data output bus BD0-BD15 to an address location specified by address bus lines AD0-AD11. Data may be read out of the read-write memory 26 along input data buss lines SW0-SW15 by addressing memory 26 with an appropriate address and read flag.

In like manner, data is read from the ROMs 61, 63 along bus lines SW0-SW15 by addressing address decoder 67 from address lines AD10-AD15. Decoder 67 generates a CS pulse for permitting addressing of the ROMs along address lines AD0-AD9.

Interfacing of the memories to IMP-16 microcomputer 1090 is fully described in the IMP-16 applications manual and in the above-identified applications. Of course, the particular memory address which stores the communication firmware is irrelevant as long as the program segment linkages between routines are consistent.

Data is transferred from RAM 51 of the recovery hardware of FIG. 4B, to memory 26 of FIG. 6A via control of data processor 1090. The data processor executes a write command addressing read decoder 69 (FIG. 4A) for producing output C" from AND gate 71, which enables read latches 73a-73d (FIG. 4B) to receive an address from bus lines BD7-BD15 and BD0 which specifies the location in RAM 51 where information is to be read. The address is fed along lines A0-A9 for addressing RAM 51 which outputs the addressed information in buffer 75. A read strobe from the data processor via NAND gate 77 (FIG. 4A) dumps the contents of buffer 75 onto input data bus lines SW0-SW5 for transfer to data processor 1090.

The data processor in turn places the data retrieved from RAM 51 onto the data output bus and addresses memory 26 of FIG. 6A for storing the character information at an appropriate address location.

PRINTING A PERMANENT RECORD BEFORE DATA TRANSMISSION

In the preferred embodiment, it is desired that the print system 2600 (FIG. 3A) be utilized for printing out a permanent record of the area test after each area test has been completed, as explained in Application Ser. No. 756,532. Thus, after the completion of each area test, control is shifted to a print routine, SPCLA, for printing the display of the CRT; after which control is shifted to the Communication firmware 27 for storing the particular numerical measurements of the display in read-write memory 26.

As described in Application Ser. No. 756,532, when the system is placed in its automatic mode, the print routine, SPCLA, is called by operator actuation of the PROCEED button. This is accomplished by the firmware setting in a memory location, called "Advanced Pointer", an instruction to jump to the print control routine, SPCLA. The Advanced Pointer memory location identifies the program segment to be executed next after the PROCEED button is pushed. Once the PROCEED button is pushed, the print routine is executed. At the end of the print routine, the word usually stored in the Advance Ponter memory location causes control to pass back to the main program for conducting the next area test.

The communication firmware 27, utilizes the firmware control described in Application Ser. No. 756,532, with modifications, for calling the communication control routine, SPCLB. SPCLB saves the particular numerical measurements stored in RAM 51 after the print control routine has been performed.

The modifications are made such that a pressing of the PROCEED button causes control initially to pass to the communication firmware 27 for performing modifications on the control sequence of the print routine, SPCLA. SPCLA is modified by the communication firmware such that upon completion of the print routine, SPCLA, control is passed to the communication routine, SPCLB, instead of the next area test routine.

The communication function may be automatically requested whenever the printer is placed in its automatic mode via manual/auto switch 2620 located on the printer console (FIG. 1). As understood by those skilled in the art, other methods of requesting the communication function may be utilized, including a separate switch device on the front panel 182. When the communication function is requested, the advanced pointer memory location is loaded with the appropriate jump instruction to the communication firmware for calling the routine, SPCLB, upon pressing of the proceed button during area testing.

Once control is passed to the communication firmware, a print control return variable (SVADP) is set up to return control to the communication firmware instead of to the main program after completion of the print routine. Once this print control return variable has been set up, the firmware then jumps to the print control routine for printing out the area tests specified on the CRT face. After print-out, control is then passed back to the communication firmware where a determination is made as to which area test is being displayed on the CRT. This determination causes the control to jump to the appropriate area save routine to save the necessary vehicular measurements in additional read-write memory 26.

The specified vehicular measurements are saved one character at a time in RAM 51. After all necessary information for the specific area test has been saved, control restores the stack and checks for determination as to whether the last area test of the Automatic Mode procedure has occurred. If the last area test has not occurred control is returned to the next area test in the main program. The next area test is then performed and displayed on the CRT screen. Pressing the PROCEED button will cause the printing of the display on paper tape and the storing of the numerical results of the CRT screen in the read-write memory 26. When the last area test has been saved, the save area test routine passes control within the SPCLB to prepare to establish communication with RSCC 11.

OPERATION OF COMMUNICATION FIRMWARE

Figure 7:
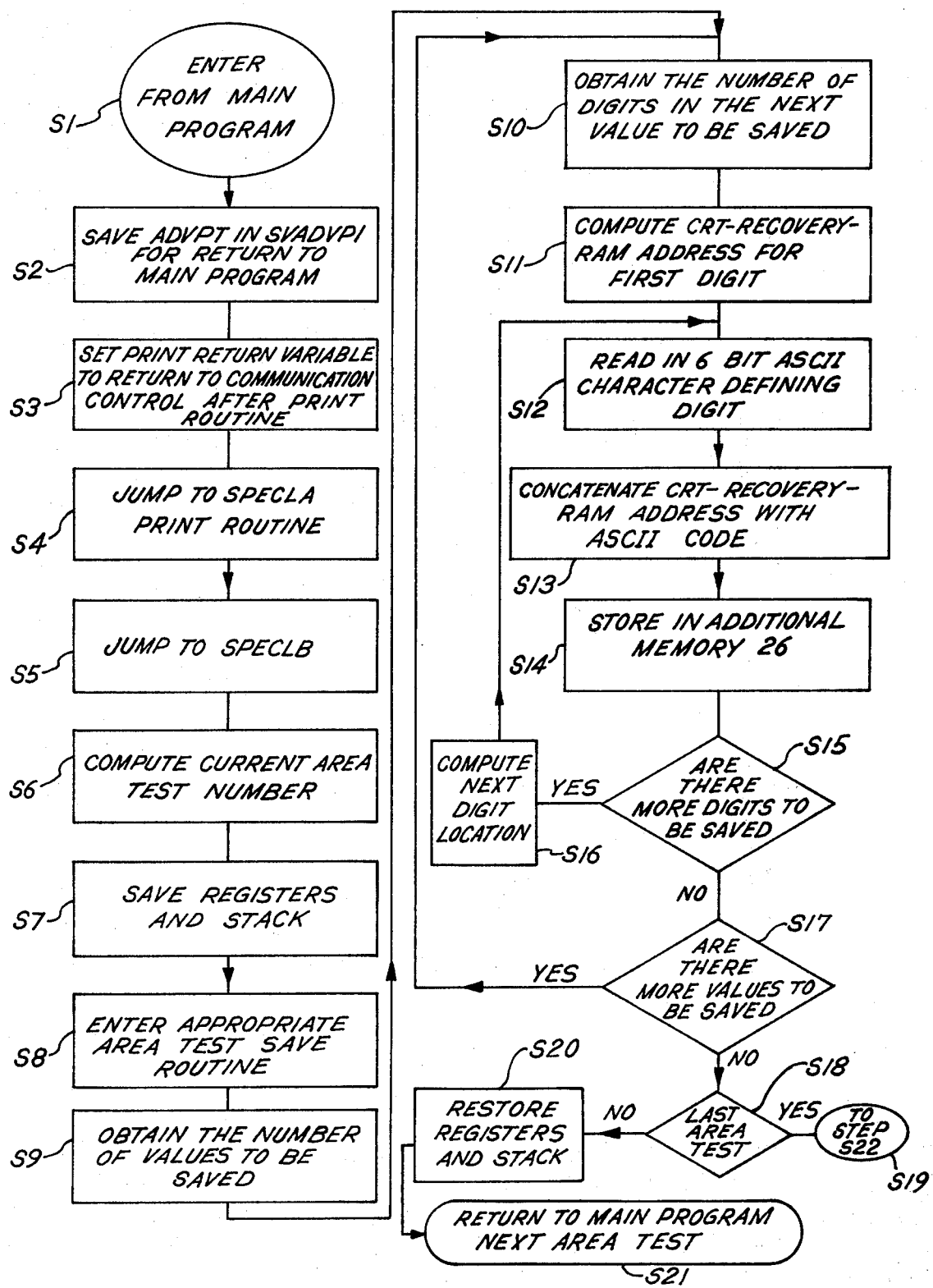
FIGS. 7, 8 and 9 are flow charts illustrating control sequences executed by the data processor of FIG. 3A.

FIG. 7 illustrates a portion of the flow diagram of the Communication firmware executed by processor 1090. Step S1 shows entry into the firmware from the main program routine in response to depression of the PROCEED button. As described above, this function is produced by loading the advanced pointer memory location with the instruction to jump to the SPCLB, the communication routine. The initial loading of the advanced pointer may be accomplished using the SPCLA print routine with some modifications.

Figure 8:
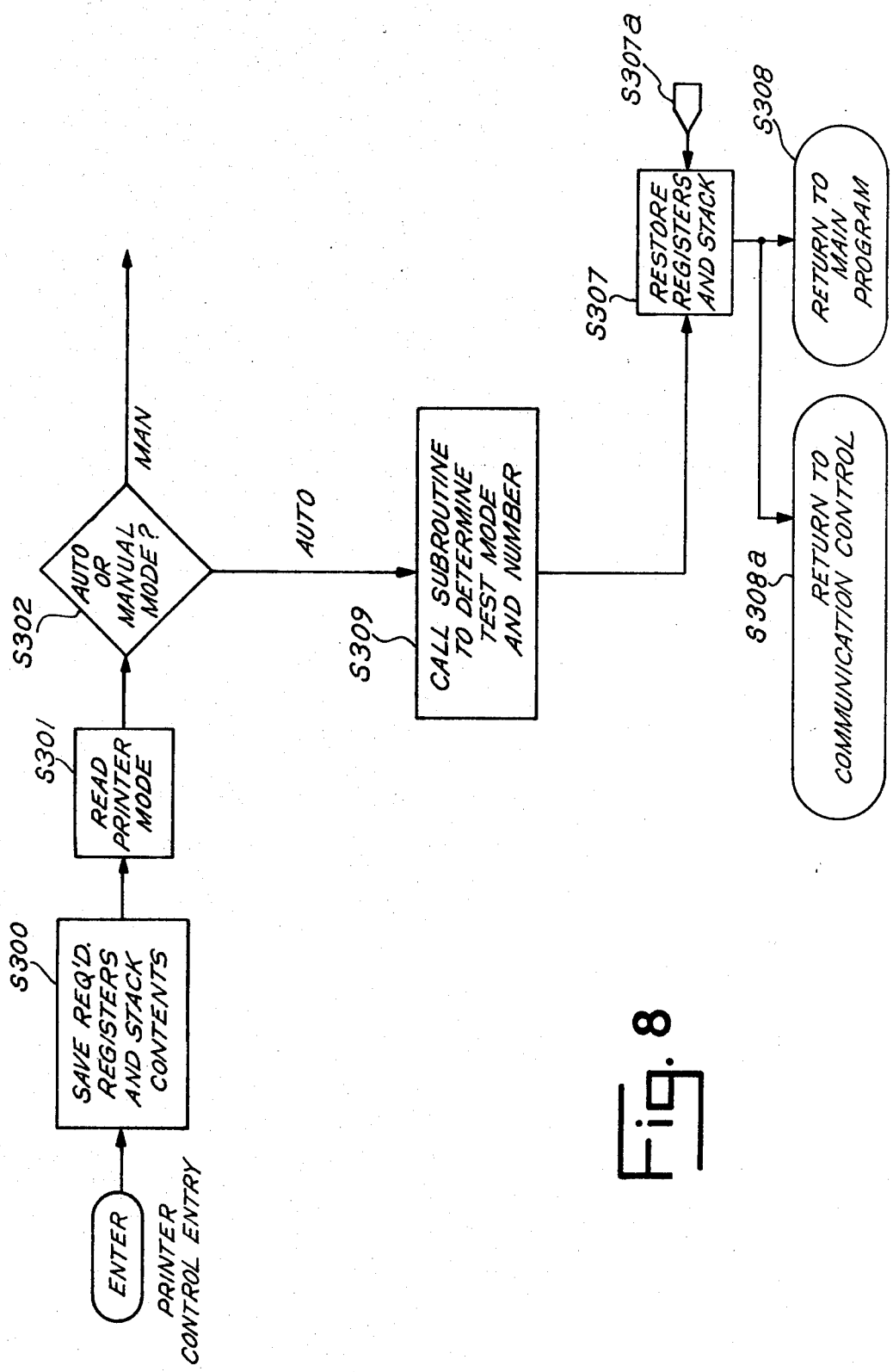

FIG. 8 corresponds to the SPCLA flow diagram FIG. 40 of Ser. No. 756,532, which is utilized in the present embodiment to set the advanced pointer memory location for jumping to the SPCLB routine.

Figure 9:
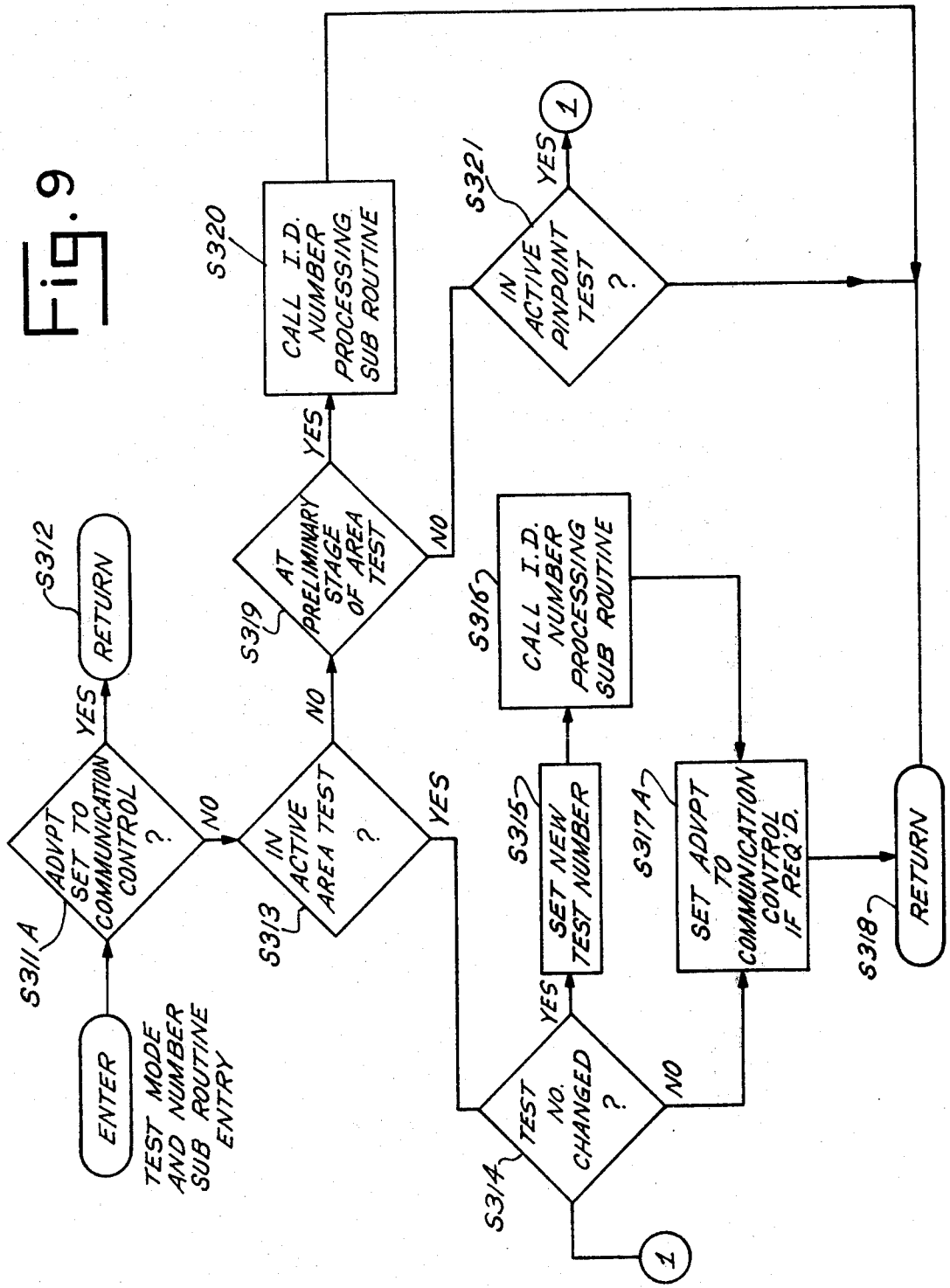

The data processor periodically executes the printer control routine of FIG. 8 in which at step S300 the processor saves the required registers and stack contents of the program segmet currently being executed. In step S301 the status of the manual/auto switch 2620 is read for determining whether the printer is in its automatic mode. If it is decided that the printer is in its automatic mode, step S309 calls a subroutine for setting of the advanced pointer memory location. The flow of the called subroutine is illustrated in FIG. 9 corresponding to FIG. 41 of Ser. No. 756,532. The routine of FIG. 9 is modified at steps S311A and S327A such that the advanced pointer memory location is set to jump to the communication routine SPCLB, instead of its normal setting to jump to the print routine SPCLA, as described in Ser. No. 756,532.

After the advanced pointer memory location is set, control is returned to the main program via the print control return variable executed in step S308 (FIG. 8) after the registers and stack have been restored, step S307.

Referring again to FIG. 7, step S1 shows the entry into the communication firmware by operation of the operator pressing the PROCEED button during area testing. Steps S2 and S3 cause saving of the Advanced Pointer in memory location SVADVP1 in order to return to the diagnostic control program at the completion of the communication routine, and the Print Control Return Variable is set for returning to the communication firmware after completion of the print routine at step S308A (FIG. 8). Once those registers have been realigned, the control jumps via step S4 to SPECLA print routine for printing the information displayed on the CRT as described in the above-referenced Application Ser. No. 756,532.

Once the display has been printed, control is passed within SPCLA to entry point 307a, FIG. 8, for restoring the registers and stack at step S307. However, the control now enters step S308a for returning to the communication routine, rather than entering step S308. This modification was made by step S3 of the routine SPCLB, FIG. 7. This control return is shown by step S5 of FIG. 7.

The current area test being conducted is then deciphered, step S6, the registers and stack are saved, step S7. Using the computed area test number, the appropriate area test save routine is entered, step S8, and the appropriate table for that area test is determined. The table defines the condition data stored within RAM 51 which needs to be transmitted to the RSCC 11. For example, in the case of area test 1, only the engine condition values represented by the "x" digits need to be transmitted. There is one value for each of the engine conditions opposite the terms battery, starter draw, cranking speed, dynamic distributor resistance, dwell and coil output. Each value is defined by multiple digits. The remaining data shown in FIG. 5 remains stored in RAM 51, but is not transmitted to RSCC 11. This is an important feature which reduces the amount of data transmitted to a minimum, thereby assuring the most economical use of long distance telephone lines, communication equipment and computer time.

In step S9 the number of condition values in the recovery RAM 51 are determined. Step S10 initially obtains the number of digits in the first value to be transmitted, and step S11 computes the 9-bit address location in RAM 51 of the first digit of the first value. Step S12 retrieves from the calculated address the 6-bit ASCII mode defining the first digit. In step S13, the 9-bit RAM 51 address and the retrieved 6-bit code are concatenated or combined to form 15 bits of a 16-bit word which is stored in read-write memory 26 in step S14. (The 16th bit defines an erase function which is not used in FIG. 7.)

Step S15 determines whether there are any more digits of that condition value to be saved. Control is returned via step S16 to step S12 for retrieving all digits of the first value and step S17 determines whether any more values are to be saved from the RAM system 51. Finally, after all values have been saved from RAM 51, step S18 decides whether the particular area test is the last test to be performed by the diagnostic apparatus of FIG. 1. If it is the last area test, step S19 jumps to a routine which sets up the communication link with RSCC 11. If the present area test is not the last area test, step S20 restores the registers and stack and step S21 returns control to the main program to perform the next area test.

Thus, at the completion of the last area test conducted by the acquisition apparatus, all pertinent numerical test measurements or values are stored in read-write memory 26, and the display data has been permanently retained on print-out 2602. The communication firmware then prepares to establish a communication link with RSCC 11.

COMMUNICATION MODULE

After recovery module 25 has acquired all specified vehicular measurements in read-write memory 26, communication module 23 (FIG. 3A) is utilized to link up telephone communication with RSCC 11. Communication module 23, shown in more detail in FIGS. 10A and 10B, basically comprises a converter circuit 29 of FIG. 10A and a transfer circuit 28 of FIG. 10B.

A parallel-to-serial and serial-to-parallel data converter 79 (FIG. 10A), acts as an interface to convert (1) parallel condition data from data processor 1090 to a serial format for transmission over telephone line 81 (FIG. 10B) and (2) serial diagnostic data from RSCC 11 to parallel format for use by processor 1090. In this specification, "the term telephone line" includes all transmission media by which telephone communication can be conducted, including microwave and radio systems.

A Vadic Modem 83 (FIG. 10B) and data coupler 85 are utilized to transmit and receive information to and from RSCC 11. The modem 83 includes an automatic dialer 101 for dialing the RSCC's telephone number to establish the link.

Converter 79 is addressable by the data processor via address decoder 87. The decoder 87 produces an enable flag SELV at output 89 for gating read/write strobe flags coming from the data processor as stored in latches 91, 93 via NAND gates 84, 86 and NOT gate 88. The bottom 4 bits of the address bus AD0-AD3 are decoded by decoders 95, 97 for producing order codes for further processor control of the subsystem of FIGS. 10A and 10B.

Four different order codes are produced by decoder 95. Order 0 is utilized for reading and writing the ASCII character that is to be transmitted and received, via control gate 90, NOT gate 92 and NAND gate 94. Order 1 is used for setting control bits. Order 2 is used for master reset to clear all control bits and reset the converter 79 before receiving or transmitting data. Order 4 is used for reading in status bits by producing signal SWE*via NOT gate 96 and NAND gate 98. Three status bits read from the Modem 83 via 3-bit latch 99a are CC, CF and CE, and five status bits read from the converter 79 are Data Ready (RDA), Parity Error (RPE), Framing Error (RFE), Overrun Error (ROR), and Transmission Buffer Empty (TBMT).

Four different order codes are produced by decoder 97. Order 8 is used to enable a 4-bit latch 99b which stores incoming status flags from Automatic Dialer 101 of Modem 83, to be entered on the input data bus returning to the data processor. Order 9 is used to enable 4-bit latch 103 which receives the actual telephone number of the RSCC in BCD code from the buffered data output bus, BD0–BD3. Order 10 is used as a flag to Automatic Dialer 101 to initiate the dialing sequence. A flip flop 105 by way of AND gate 102 stores the order 10 command for conversion to a CRQ input of the Automatic Dialer. Order 11 is used to flag the Automatic Dialer that the digit to be dialed is ready. A flip flop 107 by way of AND gate 104 stores the order 11 command for conversion to a DPR input of the Automatic Dialer.

Converter 79 is a National Semiconductor Universal Asynchronous Receiver Transmitter (UART) #MM5303. Converter 79 converts vehicular data coming in the buffered data Output Bus (BDO) via quad latches 86, 88 to a serial stream along line 79a for transmission via the Modem and data coupler, and also converts a serial stream of analysis results demodulated by the Modem, along line 79b, to a parallel form suitable for the data processor to interpret.

Vadic Modem 83 is a #3405C-80-MH and Data Access Arrangement 85 is a Western Electric, DAA 1001D, both of which are standard commerical items. The modem uses a standard interface known as RS-232 for converting the TTL circuitry of the data processor to RS-232 voltage levels for interfacing the modem; such interfaces 100a–100f are illustrated. There are standard integrated circuits available for such interfacing, e.g. National Semiconductors DS1488 and DS1489.

Automatic dialer 101 is a standard Bell 801 or equivalent. The typical method of automatically dialing a particular number can be found in Vadic's Publication #18008–011.

The interfacing cable between interface converter 79 and Modem 83 is a set of twisted pairs. This is to minimize the noise on the lines which may occur at particular high speeds.

Vadic Modem 83 generates a 1200 baud timing signal. The 1200 baud timing signal is multiplied by 16 using a frequency multiplier 109 which consists of a Motoroal No. CD4046 phase lock loop. The output of multiplier 109 produces the timing for the 1200 baud which inputs to the receive and transmit clocking signals of converter 79. This gives a very accurate timing signal. Phase lock loop frequency multiplier 109, however, takes a few seconds to stabilize and therefore is turned on as soon as power to the system is received.

ESTABLISHING COMMUNICATION LINK

Figure 11:
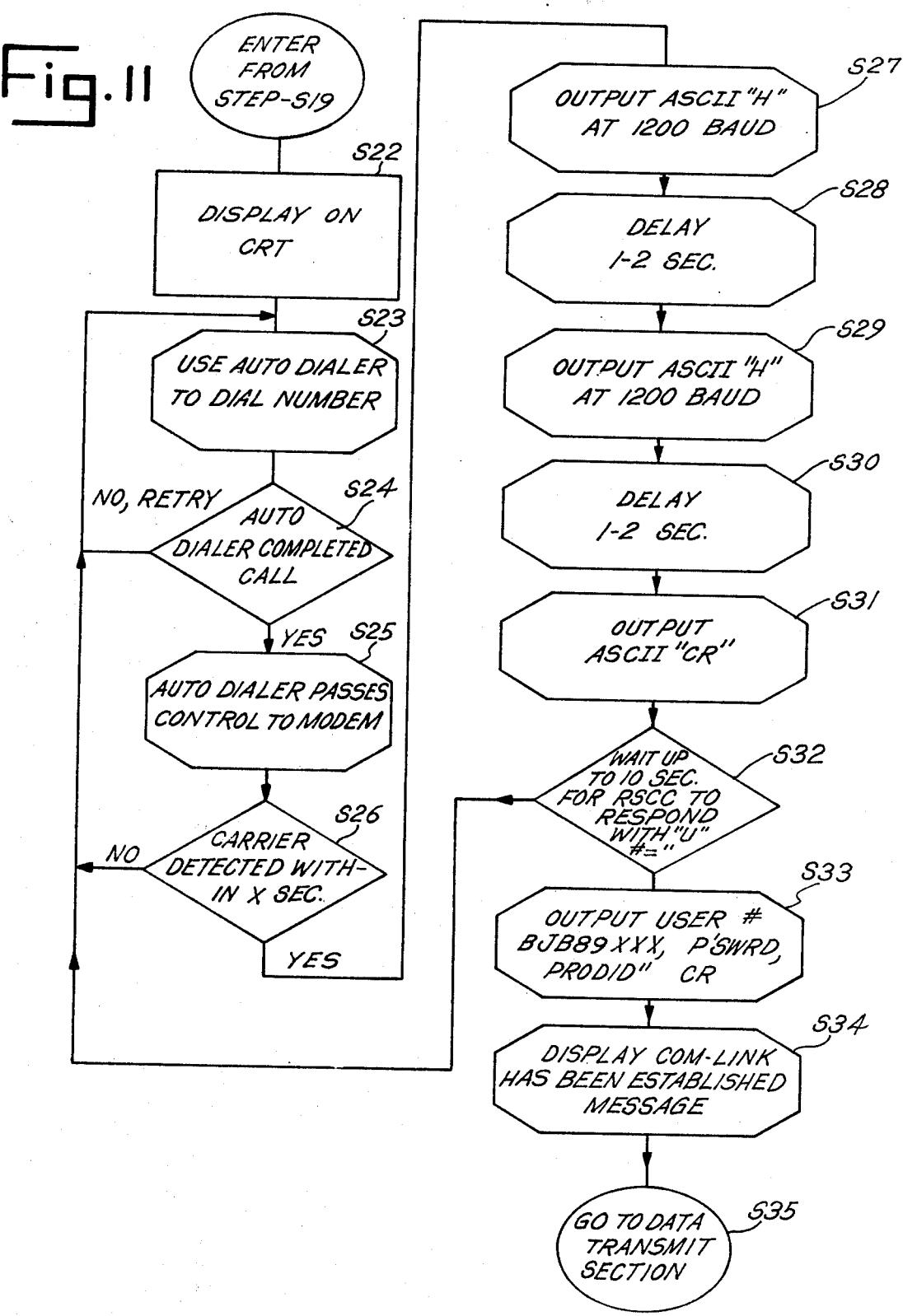
FIGS. 11-14 are flow charts illustrating control sequences executed by the data processor of FIG. 3A.

After the condition data resulting from the last area test are saved in memory 26, processor 1090 prepares to establish communication with RSCC 11 by executing a routine shown by the flow diagram of FIG. 11. The communication firmware informs the operator at step S22 that the RSCC is being consulted by displaying on the CRT face "ESTABLISHING COMMUNICATION LINK TO COMPUTER".

The firmware then utilizes communication subsystem 23 for dialing the RSCC at step S23. The data processor places appropriate information on the address bus and the data output bus for sending the actual phone number to automatic dialer 101 via latch 103 (FIG. 10B) and appropriate order codes are generated to initiate the dialing sequence by dialer 101.

After the firmware dials the RSCC telephone number, it awaits a flag from the input data bus via latch 99 (FIG. 10B) signifying that the dialer has completed the call, step S24 (FIG. 11). Automatic dialer 101 then passes control to Modem 83 for detecting a valid carrier from the RSCC, step S25.

If a valid carrier has not been detected by the communication subsystem within a predetermined time, the firmware abandons the call and retries, step S26. After a valid carrier has been detected, the communication firmware outputs a "Speed Character" to the RSCC. This character is used to determine communication rate. The particular rate used is 1200 baud, and for the G.E. system of the RSCC the speed character used is an ASCII "H". Approximately two seconds after the carrier detect flag is turned on, the communication firmware outputs an ASCII "H", step S27. Approximately 1–2 seconds later another ASCII "H" is outputted, steps S28 and S29. Approximately 1–2 seconds thereafter, a Carriage Return (ASCII "CR") is outputted, steps S30 and S31, and the firmware awaits for the RSCC to reply, step S32.

After the RSCC has received this information, it outputs a request "U#=" for a correct User Number. The communication firmware waits until the end of this message and outputs its appropriate User Number to the computer followed by a Carriage Return (step S33).

Upon receipt of the User Number, the RSCC determines if the number is valid, and if so, the RSCC automatically goes into analysis program 37 (FIG. 2). This is set up with G.E. through an "IMMEDIATE RUN OPTION" described in G.E. Manual 3502.01A, Administrative User, which is incorporated herein by reference. More information on the logging in procedure may be obtained from G.E. Manuals: 3501.06B and 3501.01J, which are incorporated herein by reference.

Upon initiation of analysis program 37, the RSCC requests data transmission by outputting a question mark (?) to the communication firmware.

After the communication firmware has outputted its appropriate User Number at step S33, the firmware informs the operator at step S34 that the communication link has been established by displaying on the CRT face, "LINK ESTABLISHED". At step S35, processor 1090 moves to a data transmission routine illustrated by the flow diagram of FIG. 12, where it awaits receipt of the question mark (?) from the RSCC, at step S36.

If the communication link is lost during any part of the routine of the flow diagram of FIG. 11, the routine returns to step S23 for redialing the RSCC.

Figure 12:
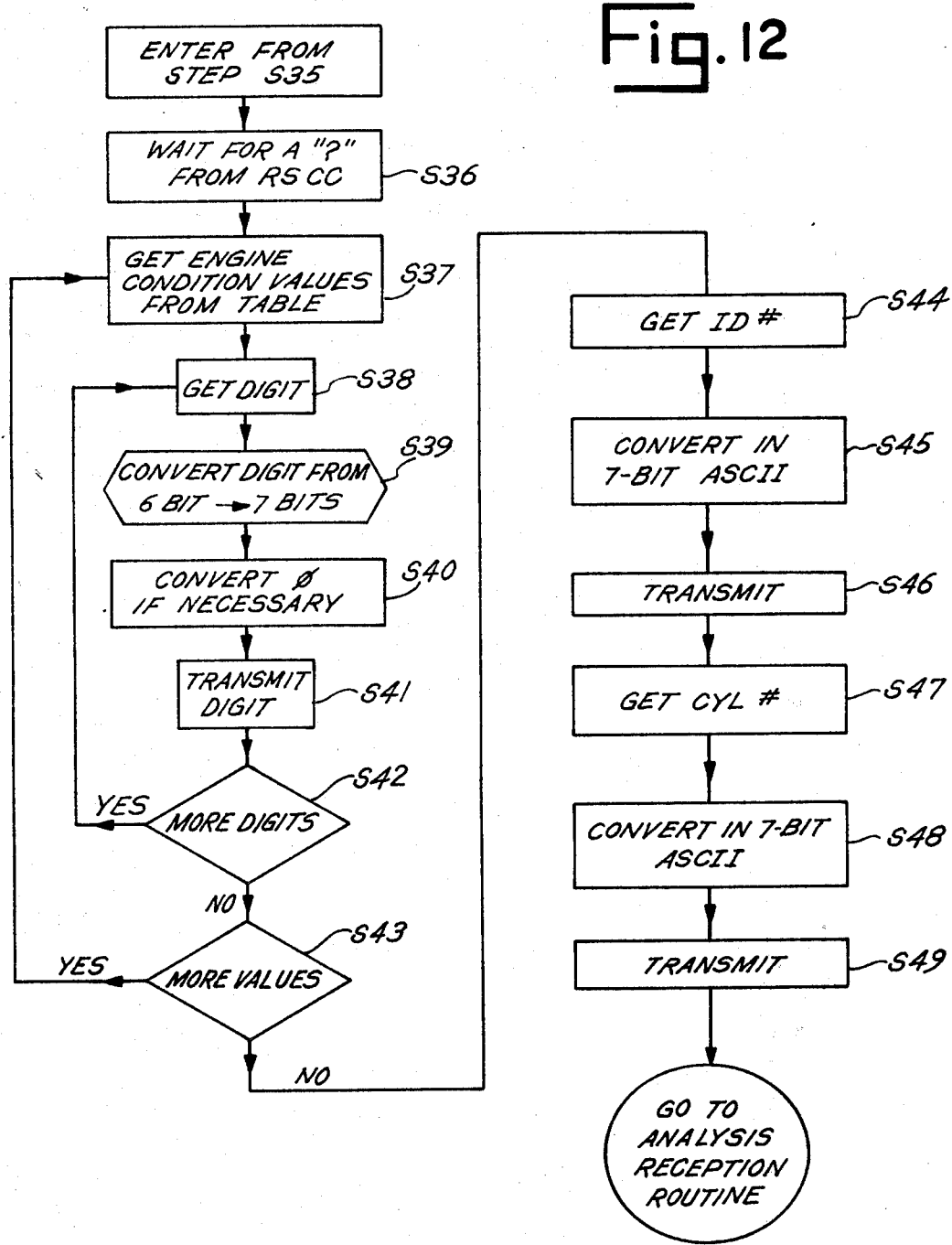
Figure 13:
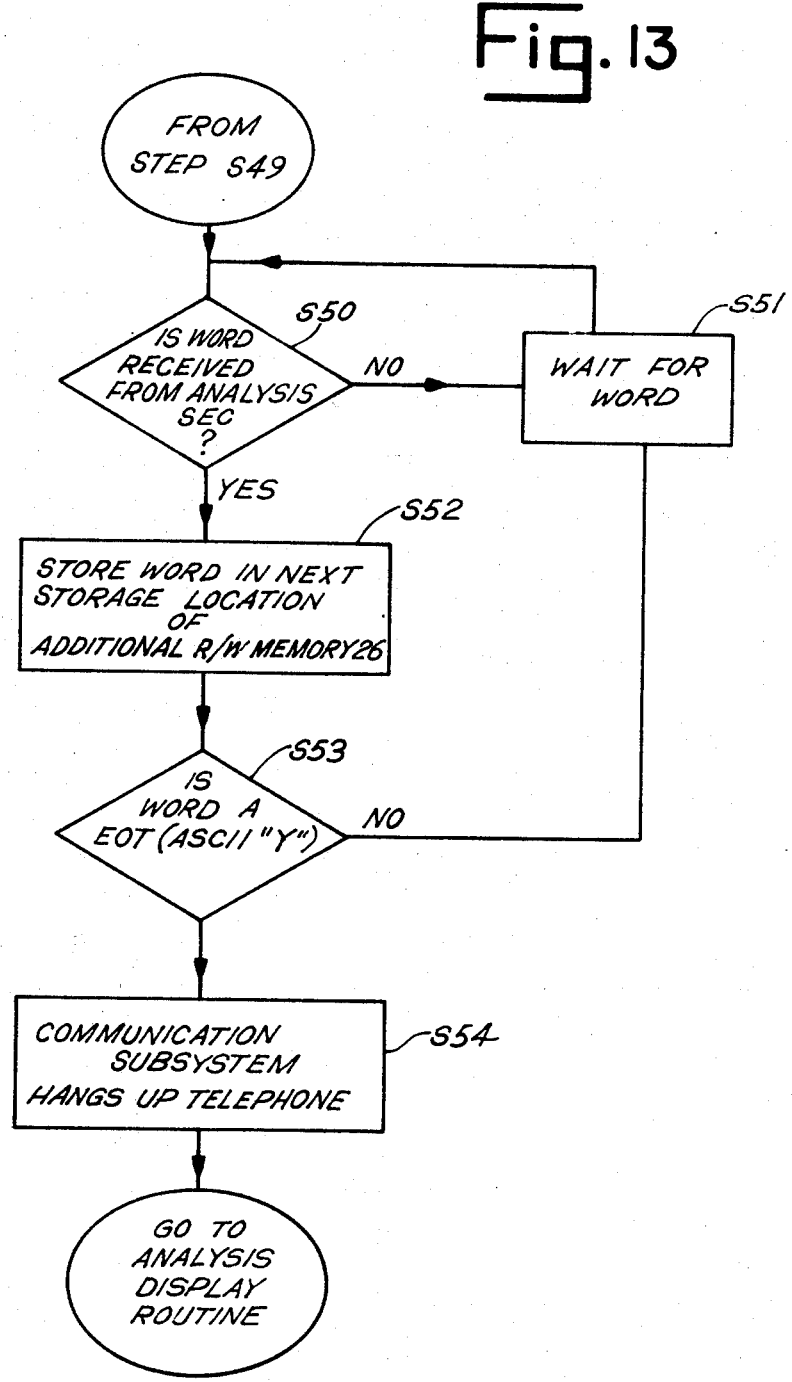

Upon the receipt of a question mark (?), processor 1090 transmits the stored engine condition data word-by-word according to the flow diagram of FIG. 12. The communication firmware outputs its stored engine condition data utilizing a table defining which condition values are to be transmitted and retrieves the values one digit at a time from the read-write memory 26 via steps S37–S43. As previously explained in connection with FIG. 7, each digit is stored as bits 0–5 of each word in memory 26. Thus, each word defines a digit of an engine condition value, as well as an address for that digit. All digit portions of the words stored in memory 26 are successively obtained, steps S38 and S42, and encoded at steps S39 and S40 before transmission at step S41.

Because the particular G.E. system of the RSCC uses a standard seven-bit ASCII code, translation from the six-bit code of the memory 26 to the seven-bit code of the RSCC is necessary at Step S39. Also, in all of the numeric data, an ALPHA "O" is used by the RSCC instead of a ZERO, requiring another conversion at step S40.

Figure 10A:
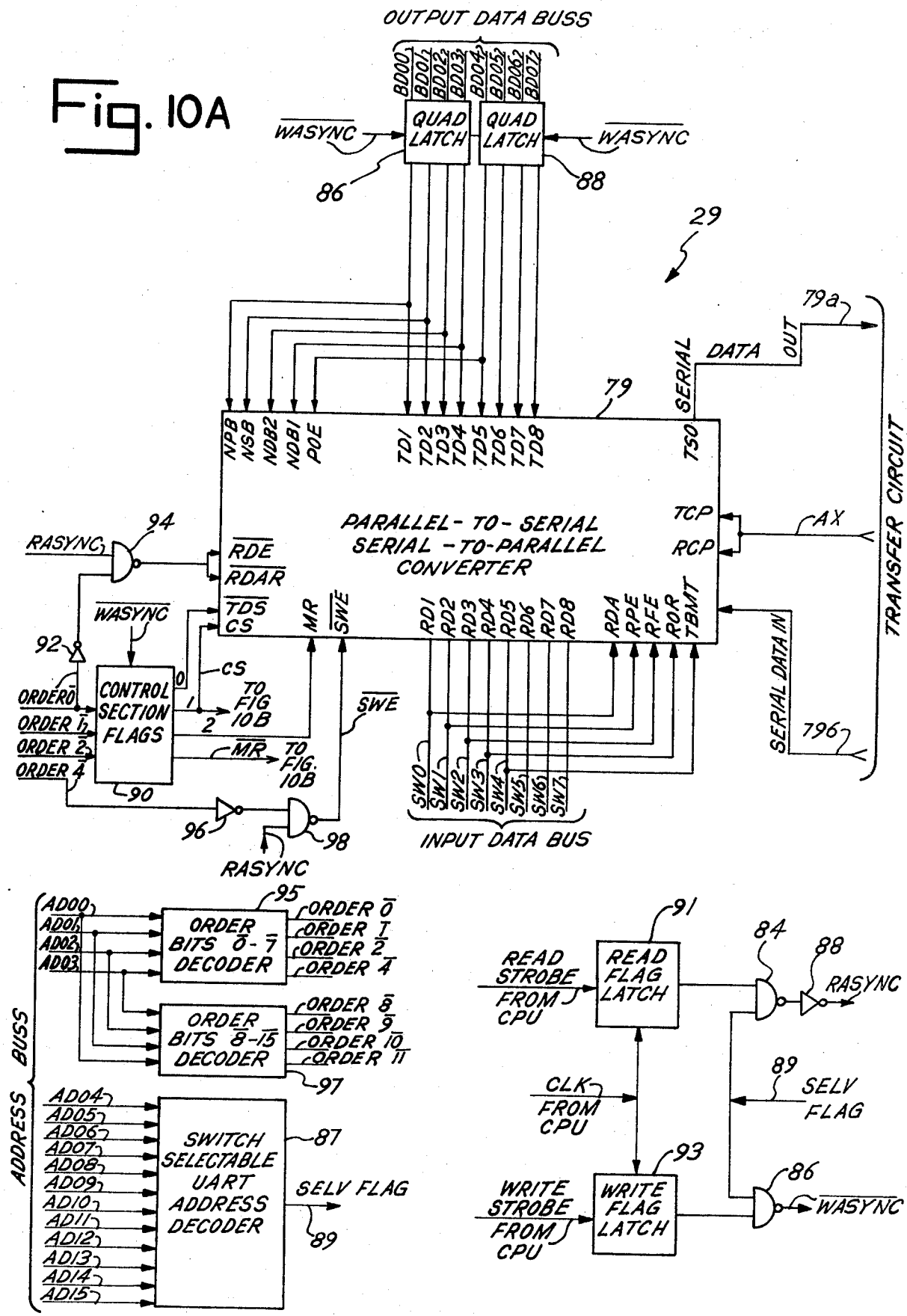
FIGS. 10A and 10B are schematic diagrams of the communication subsystem of the apparatus shown in FIG. 3A.
Figure 10B:
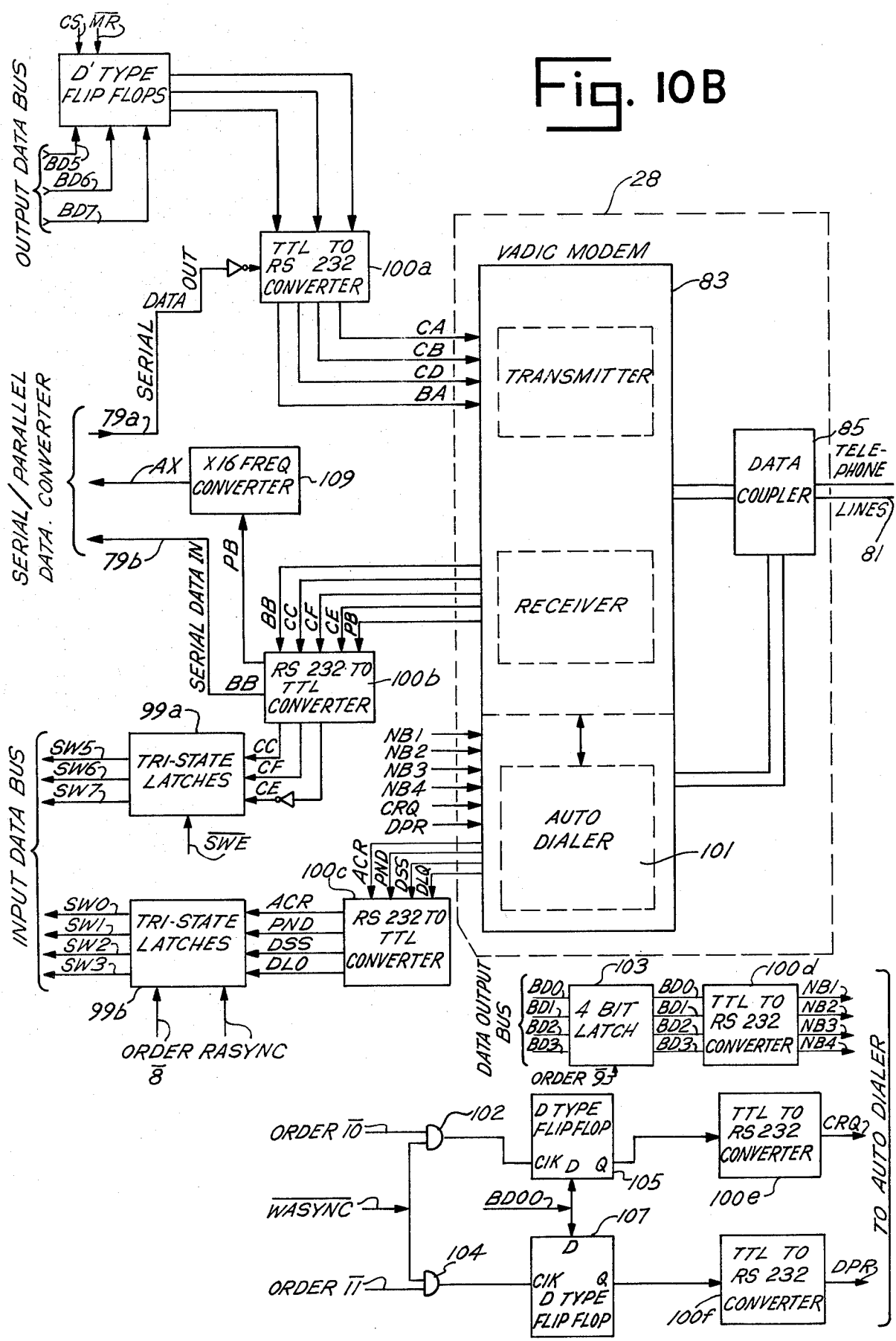

To translate from the internal six-bit code used by processor 1090 to the external seven bit code, a simple algorithm is used. First, everything is zeroed-out but the lowest 6 bits. Then, the number is checked to see if it is less than a HEX 20; if it is less than HEX 20, a HEX 40 is added. This transfers the six-bit code to the standard seven-bit code for transmission. A determination must then be made as to whether there are any "O"s to be converted to ZEROS. If the character is a 4F, which is a "O", it is simply replaced with a 30 HEX, which is a ZERO, before outputting the character. The seven bit code defining each digit of the engine condition values is received on conductors BD0–BD7 by latches which store the bits for converter 79 (FIG. 10A). The address associated with the digit remains stored in memory 26 and is not transmitted to RSCC 11. This is an important feature which enables communication to be achieved with a minimum of telephone time.

After all condition data have been transmitted, the vehicular identification number and the number of cylinders of the engine under test, also are transmitted to the RSCC. The vehicular identification number and the number of cylinders is retrieved at steps S44 and S47 from memory locations where the information was stored after operator input, as described in Ser. No. 641,362 and 756,532. The information is converted to seven-bit ASCII Code at steps S45 and S48 before transmission at steps S46 and S49.

As illustrated in FIG. 12, transmission is continued digit by digit until all information is transmitted. Each digit is followed up with a carriage return which is a HEX D. CL RECEIPT OF RSCC DIAGNOSTIC ANALYSIS After apparatus 13b has transmitted its condition data and the RSCC has analyzed the data, the RSCC transmits the resulting diagnostic data back to apparatus 13b for operator display. The apparatus stores the diagnostic data and then drops the RSCC off the telephone line. Processor 1090 receives and stores the diagnostic data as illustrated in the flow diagram of A continuous polling of the communication module occurs until data is received, steps S50 and S51. When data is received it is stored as an eight (8) bit word in read-write memory 26 (step S52). Next, a check is performed to determine if the word received is an ASCII EOT (END OF TRANSMISSION) word (step S53). If the word is not an EOT, the system returns to wait for the next word. If the word received is an EOT, the assumption is made that the transmission is ended and the communication link is dropped via step S54.

The analysis program of the RSCC is set up to output as its last word an EOT. After it has outputted an EOT, it uses the G.E. standard routines to tell its operating system to log-off the analysis program. After it has logged-off it will drop its carrier.

Processor 1090 does not wait for the carrier to be dropped. Once an EOT has been received, the communication firmware tells communication module 23 to drop its own carrier. The communication module drops the carrier thereby "hanging up" the telephone. If, however, the communication firmware fails to tell the communication module to drop its carrier via the EOT, the communication module will automatically drop its carrier and "hang up" the telephone upon detection of the RSCC carrier drop. Control is then passed to step S55 of FIG. 14 for displaying the diagnostic data transmitted from RSCC 11.

CRT DISPLAY OF RSCC DIAGNOSTIC DATA

The diagnostic data from RSCC 11 are to be displayed in a format similar to that shown in FIG. 15. Before the data can be displayed on the CRT, the data is converted from its 7-bit ASCII code as received from RSCC 11 into a proper format that the CRT display routine can interpret. Because the CRT displays only one page at a time, the diagnostic data are passed from memory one page at a time to the CRT for display and to the printer for printing.

Figure 14:
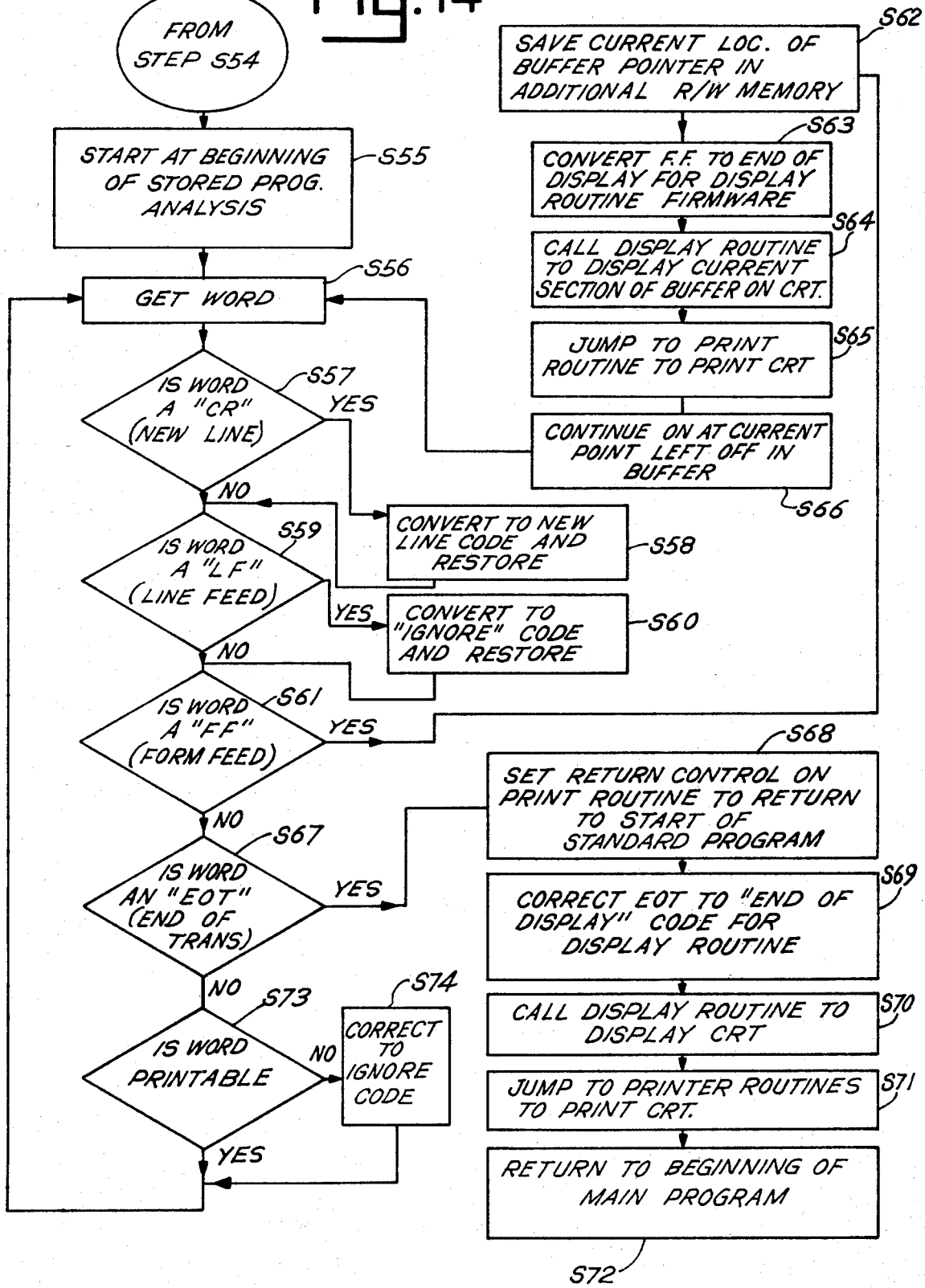

The flow diagram of FIG. 14 illustrates the steps executed by processor 1090 for displaying the RSCC diagnostic data using the display and print routines. The communication firmware starts at the beginning of the diagnostic data stored in the read-write memory 26, step S55, and retrieves one word at a time, step S56, checking the word at steps S57, S59, S61, S67, and S73 for conversion to a proper format which the CRT display routine can interpret.

If the word is a "CR" character, (indicating a new line) the word is converted to a "new line" code and restored in memory, steps 57 and 58. If the word is an "LF" character (indicating "line feed") it is converted in memory to an "ignore" code, steps S59 and S60. If the word is not a printable character, it also is converted in memory to an "ignore code", steps S73 and S74.

At step S61, the word is checked for a "form feed" code, "FF", indicating an end of page, which signals the firmware that a single page has been checked and is ready for CRT display. Accordingly, steps S62–65 are executed for displaying all words checked up to the FF character in the current page.

At step S62, the current location in memory of the diagnostic data being checked is saved for return thereto after the page of data is displayed. The FF word is converted to an "End of Display" code for interpretation by the CRT display routine, step S63, and the display routine is called for displaying the current section of the read-write memory which will be one page.

After display on the CRT, control is passed to the print control routine, SPCLA, via step S65 for printing the contents of the display. A return control variable is set up in the print control routine for returning to step S66 of the communication display routine after printing. Step S66 of the firmware sets up pointers to continue checking memory 25 from the point left off before the display, until the next page has been detected.

At step S67 the word is checked for an EOT code which signals the firmware that the last page has been checked and is ready for CRT display. Accordingly steps S68–S72 are executed for displaying all characters up to the EOT character.

The last page of diagnostic data is displayed and printed in the same manner as previous pages, however, since this is the last page to be printed, the return control variable is set to return control to the start of the main program of the diagnostic apparatus, step S68.

In step S69, the EOT word is converted to an "END OF DISPLAY" code for interpretation by the CRT display routine; the display routine then is called for displaying the last section of the read-write memory which will be one page, step S70. After display, control is passed to the print routine via step S71 for printing the contents of the display.

Thus, after the last page is printed, control jumps to the beginning of the main program, step S72, and processor 1090 is now prepared to take the next set of vehicular measurements.

REMOTE SITE CENTRAL COMPUTER ANALYSIS

The utility system selected for the storage of the data base and analysis program is a G.E. time sharing system. In order to access this system via telephone lines, the communication module, under control of the communication firmware, dials the proper telephone number and outputs special words to the G.E. operating system in order to establish the type and speed of transmission, as described above.

After RSCC recognition, the firmware transmits its particular user number and pass word to the G.E. operating system. Once this security maze has been passed, the G.E. operating system will automatically call the analysis program with its data base and retrieve the condition data from apparatus 13b in order to execute the analysis.

The analysis is made using an updatable data base for fault criteria. The data base defines upper or lower limits for the engine conditions defined by the condition data. These limits change as manufacturers alter their existing engines and produce new engines. Since the data base is maintained in a central computer, it can be kept current by periodically updating the data with terminal 21. This is an important feature which enables the operator mechanic to receive up-to-date diagnostic data for almost any existing engine.

The diagnostic analysis performed by RSCC 11 preferably isolates defective components or component groups of an engine. Such a diagnostic routine is described in U.S. Applicaton Ser. No. 807,186 filed June 16, 1977, in the names of Arnston et al which is incorporated herein by reference. Such a routine could typically produce diagnostic data resulting in a CRT display of the type shown in FIG. 15. The diagnostic data is displayed as characters identifying the defective components. After the program is finished analyzing all data it automatically transmits the results and calls the G.E. operating system to execute a log-off. The G.E. operating system also records the necessary information for accounting and billing purposes.

FIG. 16 illustrates a flow of the RSCC program. After the telephone number has been dialed by the autodialer 101 and the carrier tones have been detected by the G.E. operating systems, the G.E. operating system checks for the particular baud rate of the incoming call, step S73. After baud rate signal recognition, the G.E. operating system requests a user number and password for its appropriate accounting files, step S74. The system is set up so that the G.E. operating system will proceed immediately to the analysis program after entering the user number and time of entry, step S75.

Upon the G.E. operating system entering the analysis program, it proceeds to set certain parameters (step S76) by calling certain subroutines in the G.E. operating system to establish the type of terminal with which it is communicating and to set a flag to exit the main program of processor 1090 when the need arises to update the data base or revise the analysis program itself. After parameters have been set, the engine condition data is inputted into an array for comparison with its specific identification numbered data base, step 77. The I.D. number transmitted from the processor 1090 is then examined, step S78, and its corresponding data base is also entered into an array. The program then proceeds to analyze the condition data using the data base as its fault criteria, step S79.

The proper messages are generated during execution of the program for transmission back to communication module 23, step S80. When the analysis has been completed and the results transmitted in the form of diagnostic data, the analysis program passes control back to the G.E. operating system for the log-off of the customer and for storing that customer's accounting files and appropriate accounting entries of the customer for billing at a later date, steps S81–S82 and steps S84–S85. The G.E. operating system will then drop its carrier to end the communication link and "hang up" the telephone, step S83.

Further information on the logging procedure and the G.E. operating system can be found in the G.E. Command System Manual Publication No. 3501.01J and G.E. Administrative USCR Manual Publication No. 3502.07A which are incorporated herein by reference. Further information on the methods used for construction of the analysis program can be obtained from the G.E. Fortran IV Manual Publication No. 3102.01A and the G.E. Fortran IV Systems Routines Manual Publication No. 3104.01C which are incorporated herein by reference.

The SPCLB program described in connection with FIGS. 7–9, 11–14 can be implemented on an Imp-16C processor by means of the following program listing which is encoded in hexidecimal form. The following program listing is used in connection with the programs listed in the above-identified applications Ser. Nos. 641,362 and 756,532. The left-hand column of the following listing represents line numbers; the middle column is the address in memory; and the right column is the contents in memory.

Following the SPCLB program is the RSCC program described in connection with FIG. 16.

It should be understood, of course, that the foregoing disclosure relates to a preferred embodiment of the invention and that other modifications or alternations may be made therein without departing from the spirit or scope of the invention as set forth in the appended claims.

For example, computers, modems and autodialers other than those specifically disclosed can be used. It is not necessary to use an Alpha "O" instead of "Zero" for the numeric data, and software other than standard G.E. routines can be used. The specific display formats described in the specification also can be modified.

```
1                         .TITLE  SPCLB, ' 2001/ST CONTROL PROG. '
2
3                     ;
4                     ;               VERSION 1           11/04/76
5                     ;        ***********************************
6                     ;        TSECT RAM VERSION - SPCLB, SPCLC CONTROL
7                     ;        ***********************************
8                     ;
9                     ;
10                    ;               SYMBOL DEFINITIONS
11                    ;
12                    ;        REGISTERS
13                    ;
14        0000                 R0=0
15        0001                 R1=1
16        0002                 R2=2
17        0003                 R3=3
18                    ;
19                    ;        KEYBOARD CODES
20                    ;
21        000F                 MINUS=0F
22        000B                 DOT=0B
23        0001                 ONE=1
24        0002                 TWO=2
25        0003                 THREE=3
26        0004                 FOUR=4
27        0005                 FIVE=5
28        0006                 SIX=6
29        0007                 SEVEN=7
30        0008                 EIGHT=8
31        0009                 NINE=9
32        0000                 ZERO=0
33        000D                 BKSPC=0D
34        0010                 RSTRT=010
35        000E                 PRCD=0E
36        000A                 CANCEL=0A
37        000C                 TDCRCL=0C
38                    ;
39                    ;        CONDITION CODES
40                    ;
```

```
41      0001                Z=1
42      0002                P=2
43      0003                ODD=3
44      0005                NZ=5
45      000B                LEZ=11
46              ;
47              ;   PERIPHERAL ADRS
48              ;
49      009C                CCADR=09C
50      00AC                PMEM=0AC
51      FFAC                PMEMX=0FFAC
52      00B8                CLKADR=0B8
53      00B0                PRTADR=0B0
54      0088                ISADR=088
55      00BC                CRTADR=0BC
56      7E59                PUTC=07E59
57      7EC3                MESG=07EC3
58              ;
59
```

SPECLB 2001/ST CONTROL PROG.
BSECT LINKS

```
                        .PAGE 'BSECT LINKS'
60              ;
61              ;   FORM SYMBOLS
62              ;
63              ;           BSECT R/W RAM DATA
64              ;
65      0000                .BSECT
66      0001    BSECT:      .=.+1
67      0011                .=BSECT+011
68      0012    ADVPT:      .=.+1           ;ADVANCE POINTER
69      0017                .=BSECT+017
70      0018    BACKPT:     .=.+1           ;BACKSPACE POINTER
71      0051                .=BSECT+051
72      0052    KBVAL:      .=.+1           ;KEYBOARD VAL
73      0025                .=BSECT+025
74      0026    CUEMOD:     .=.+1           ;=0 IF BETWEEN RSTRT&BEGIN
75      0097                .=BSECT+097
76      0098    SPCSV1:     .=.+1
77      0099    SPCSV2:     .=.+1
78      00A9                .=BSECT+0A9
79      00AA    TSTNUM:     .=.+1
80      00AF                .=BSECT+0AF
81      00B0    STACK:      .=.+1
82      00C5                .=BSECT+0C5
83      00C6    COMPT:      .=.+1
84      0068                .=BSECT+068
85      0069    NCYL:       .=.+1
86      0071                .=BSECT+071
87      0072    OFFSET:     .=.+1
88      0079                .=BSECT+079
89      007A    RTDATA:     .=.+1
90      0096                .=BSECT+096
91      0097    SVADP:      .=.+1
92      00B6                .=BSECT+0B6
93      00B7    IDDATA:     .=.+1
94      00C5                .=BSECT+0C5
95      00C6    EOL:        .=.+1
96              ;
97              ;   END OF RAM DATA
98              ;
99      0100                .=BSECT+0100
100
```

SPECLB 2001/ST CONTROL PROG.
ASECT LINKS

```
                        .PAGE 'ASECT LINKS'
101             ;           PROGRAM SEGMENT LINKAGES
102             ;           TSECT RAM VERSION - SPECLB,SPECLC CONTROL
103     0000                .ASECT
104     0000                .=0
```

```
105      0001     RELOC:    .=.+1
106      1529               .=01529+RELOC
107      152A     STCKSV:   .=.+1
108      1532               .=01532+RELOC
109      1533     RSTRSK:   .=.+1
110      1418               .=01418+RELOC
111      1419     PRINTA:   .=.+1
112      141C               .=0141C+RELOC
113      141D     PRINTM:   .=.+1
114      0C9A               .=0C9A+RELOC
115      0C9B     MSGE:     .=.+1
116      0C9D               .=0C9D+RELOC
117      0C9E     MSG:      .=.+1
118      0C9F               .=0C9F+RELOC
119      0CA0     MSGO:     .=.+1
120      0CCA               .=0CCA+RELOC
121      0CCB     SPAC:     .=.+1
122      0CC5               .=0CC5+RELOC
123      0CC6     CHAR:     .=.+1
124      0CBB               .=0CBB+RELOC
125      0CBC     SKIP:     .=.+1
126      0D86               .=0D86+RELOC
127      0D87     CCWAIT:   .=.+1
128      0D8D               .=0D8D+RELOC
129      0D8E     OCYL:     .=.+1
130
```

SPECLB 2001/ST CONTROL PROG.
CRT LENGTH DEFINITIONS

```
                              .PAGE 'CRT LENGTH DEFINITIONS'
131               ;
132               ;           DEFINE LENGTH CONSTANTS FOR PARAMETERS
133               ;
134      0005     A1P1L=5
135      0004     A1P2L=4
136      0004     A1P3L=4
137      0005     A1P4L=5
138      0004     A1P5L=4
139      0002     A1P6L=2
140      0002     A1P7L=2
141      0004     A2P1L=4
142      0005     A2P2L=5
143      0004     A3P1L=4
144      0004     A3P2L=4
145      0004     A3P3L=4
146      0004     A3P4L=4
147      0004     A3P5L=4
148      0003     A3P6L=3
149      0004     A4P1L=4
150      0004     A4P2L=4
151      0004     A4P3L=4
152      0002     A4P4L=2
153      0002     A4P5L=2
154      0004     A5P1L=4
155      0004     A5P2L=4
156      0004     A5P3L=4
157      0004     A5P4L=4
158      0004     A5P5L=4
159      0004     A5P6L=4
160      0004     A5P7L=4
161      0004     A5P8L=4
162      0004     A5P9L=4
163      0004     A6P1L=4
164      0004     A6P2L=4
165      0002     A6P3L=2
166      0002     A6P4L=2
167      0002     A6P5L=2
168      0002     A6P6L=2
169      0002     A6P7L=2
170      0002     A6P8L=2
171      0002     A6P9L=2
172      0002     A6P10L=2
```

```
173       0004              A7P1L=4
174       0004              A7P2L=4
175       0004              A7P3L=4
176       0004              A7P4L=4
177       0004              A7P5L=4
178       0003              A7P6L=3
179       0004              A7P7L=4
180       0004              A7P8L=4
181       0005              A7P9L=5
182
```

SPECLB 2001/ST CONTROL PROG.
CRT STORAGE AREA

```
                                  .PAGE 'CRT STORAGE AREA'
183                         ;
184                         ;     CRT STORAGE AREA
185                         ;
186       2000                    .=02000+RELOC
187       2001    SAVE1:          .=.+1
188       2006    A1P1:           .=.+A1P1L
189       200A    A1P2:           .=.+A1P2L
190       200E    A1P3:           .=.+A1P3L
191       2013    A1P4:           .=.+A1P4L
192       2017    A1P5:           .=.+A1P5L
193       2019    A1P6:           .=.+A1P6L
194       201B    A1P7:           .=.+A1P7L
195               SAVE2:
196       201F    A2P1:           .=.+A2P1L
197       2024    A2P2:           .=.+A2P2L
198               SAVE3:
199       2028    A3P1:           .=.+A3P1L
200       202C    A3P2:           .=.+A3P2L
201       2030    A3P3:           .=.+A3P3L
202       2034    A3P4:           .=.+A3P4L
203       2038    A3P5:           .=.+A3P5L
204       203B    A3P6:           .=.+A3P6L
205               SAVE4:
206       203F    A4P1:           .=.+A4P1L
207       2043    A4P2:           .=.+A4P2L
208       2047    A4P3:           .=.+A4P3L
209       2049    A4P4:           .=.+A4P4L
210       204B    A4P5:           .=.+A4P5L
211               SAVE5:
212       204F    A5P1:           .=.+A5P1L
213       2053    A5P2:           .=.+A5P2L
214       2057    A5P3:           .=.+A5P3L
215       205B    A5P4:           .=.+A5P4L
216       205F    A5P5:           .=.+A5P5L
217       2063    A5P6:           .=.+A5P6L
218       2067    A5P7:           .=.+A5P7L
219       206B    A5P8:           .=.+A5P8L
220       206F    A5P9:           .=.+A5P9L
221               SAVE6:
222       2073    A6P1:           .=.+A6P1L
223       2077    A6P2:           .=.+A6P2L
224       2079    A6P3:           .=.+A6P3L
225       207B    A6P4:           .=.+A6P4L
226       207D    A6P5:           .=.+A6P5L
227       207F    A6P6:           .=.+A6P6L
228       2081    A6P7:           .=.+A6P7L
229       2083    A6P8:           .=.+A6P8L
230       2085    A6P9:           .=.+A6P9L
231       2087    A6P10:          .=.+A6P10L
232               SAVE7:
233       208B    A7P1:           .=.+A7P1L
234       208F    A7P2:           .=.+A7P2L
235       2093    A7P3:           .=.+A7P3L
236       2097    A7P4:           .=.+A7P4L
237       209B    A7P5:           .=.+A7P5L
238       209E    A7P6:           .=.+A7P6L
239       20A2    A7P7:           .=.+A7P7L
240       20A6    A7P8:           .=.+A7P8L
```

```
241      20AB    A7P9:       .=.+A7P9L
242      20AC    SAVEND:     .=.+1
243      24AC    BUF:        .=.+0400
244
```

SPECLB 2001/ST CONTROL PROG.
SEQUENCE CONTROL

```
                                .PAGE    'SEQUENCE CONTROL'
245       0000                  .TSECT
246                      ;
247                      ;      SPECLA - SEQUENCE CONTROL ROUTINE
248                      ;
249                             .LOCAL
250       1600                  .=.+01600
251  1600 0200 A                RTS                     ;SPECIAL B CONTROL RETURN
252       1602                  .=.+1
253  1602 2101 A                JMP $2                  ;SOFTWARE SWITCH   ?????????
254  1603 2511 A@     $1:       JMP PRINTA              ;JMP TO NORMAL PRINT ROUTINE
255  1604 8096 B      $2:       LD R0,SVADP             ;PRINT AFTER EACH PAGE
256  1605 A103 A                ST R0,SVADP1
257  1606 810F A                LD R0,=.+4
258  1607 A096 B                ST R0,SVADP
259  1608 250E A@               JMP PRINTM
260  1609 0000 A      SVADP1:   .WORD 0
261  160A 81FE A                LD R0,SVADP1
262  160B A096 B                ST R0,SVADP
263  160C 4C08 A      $3:       LI R0,8                 ;TEST FOR 'AREA TEST'
264  160D D0A9 B                SUB R0,TSTNUM
265  160E 1BF4 A                BOC LEZ,$1              ;NOT IN AREA TEST, NORMAL PRI
266  160F A497 B                ST R1,SPCSV1            ;SAVE REGS & STACK
267  1610 A898 B                ST R2,SPCSV2
268  1611 2D06 A@               JSR STCKSV
269  1612 8D0A A                LD R3,STAB              ;JMP TO APPRO. SAVE ROUTINE
270  1613 CCA9 B                ADD R3,TSTNUM
271  1614 2700 A                JMP @(R3)
272  1615 1418 A                .POOL 8
     1616 160A T
     1617 141C T
     1618 1529 A
     1619 0000 A
     161A 0000 A
     161B 0000 A
     161C 0000 A
273  161D 161D T      STAB:     .WORD STAB,SAT1,SAT2,SAT3   ;SAVE ROUTINE TABLE------
     161E 1625 T
     161F 1632 T
     1620 1638 T
274  1621 1642 T                .WORD SAT4,SAT5,SAT6,SAT7
     1622 164B T
     1623 1658 T
     1624 1666 T
275
```

SPECLB 2001/ST CONTROL PROG.
SAVE AREA TEST RESULTS ROUTINES

```
                                .PAGE   ' SAVE AREA TEST RESULTS ROUTINES '
276                      ;
277                      ;      SAVE AREA TEST ONE
278                      ;
279                             .FORM CHAR,4,5,1(0),6
280  1625 8068 B      SAT1:     LD R0,NCYL              ; SAVE NCYL.
281  1626 B1F2 A@               ST R0,SAVE1
282  1627 89F2 A                LD R2,=SAVE1+1
283  1628 2954 A                JSR SAVEC               ;SAVE CRT
284  1629 0007 A                .WORD 07
285  162A 5905 A                CHAR 5,23-A1P1L,A1P1L   ;SAVE BATTERY VOLTS
286  162B 6984 A                CHAR 6,23-A1P2L,A1P2L   ;SAVE STARTER AMPS
287  162C 7984 A                CHAR 7,23-A1P3L,A1P3L   ;SAVE CRANKING RPM
288  162D 8905 A                CHAR 8,23-A1P4L,A1P4L   ;SAVE DYN. RES.
289  162E 9984 A                CHAR 9,23-A1P5L,A1P5L   ;SAVE DWELL
290  162F AA82 A                CHAR 10,23-A1P6L,A1P6L  ;SAVE REL. COMP.
```

```
291  1630 BA82 A             CHAR 11,23-A1P7L,A1P7L   ;SAVE COIL OUTPUT
292  1631 216F A             JMP RTN
293                      ;
294                      ;   SAVE AREA TEST TWO
295                      ;
296  1632 89E8 A    SAT2:    LD R2,=SAVE2
297  1633 2949 A             JSR SAVEC
298  1634 0002 A             .WORD 2
299  1635 A984 A             CHAR 10,23-A2P1L,A2P1L   ;SAVE PEAK RPM
300  1636 B905 A             CHAR 11,23-A2P2L,A2P2L   ;PEAK AMPS
301  1637 2169 A             JMP RTN
302                      ;
303                      ;   SAVE AREA TEST THREE
304                      ;
305  1638 89E3 A    SAT3:    LD R2,=SAVE3
306  1639 2943 A             JSR SAVEC
307  163A 0006 A             .WORD 6
308  163B 5984 A             CHAR 5,23-A3P1L,A3P1L    ;SAVE IDLE RPM
309  163C 6984 A             CHAR 6,23-A3P2L,A3P2L    ;SAVE DWELL
310  163D 7984 A             CHAR 7,23-A3P3L,A3P3L    ;SAVE CO
311  163E 8984 A             CHAR 8,23-A3P4L,A3P4L    ;SAVE HC
312  163F 9984 A             CHAR 9,23-A3P5L,A3P5L    ;INITIAL TIMING
313  1640 9E03 A             CHAR 9,28,A3P6L
314  1641 215F A             JMP RTN
315                      ;
316                      ;   SAVE AREA TEST FOUR
317                      ;
318  1642 8932 A    SAT4:    LD R2,=SAVE4
319  1643 2939 A             JSR SAVEC
320  1644 0005 A             .WORD 05
321  1645 5984 A             CHAR 5,23-A4P1L,A4P1L    ;SAVE RPM
322  1646 6984 A             CHAR 6,23-A4P2L,A4P2L    ;CO
323  1647 7984 A             CHAR 7,23-A4P2L,A4P3L    ;HC
324  1648 8A82 A             CHAR 8,23-A4P4L,A4P4L    ;KV (MAX)
325  1649 9A82 A             CHAR 9,23-A4P5L,A4P5L    ;KV (MIN)
326  164A 2156 A             JMP RTN
327  164B 892A A    SAT5:    LD R2,=SAVE5
328  164C 2930 A             JSR SAVEC
329  164D 0009 A             .WORD 9
330  164E 6984 A             CHAR 6,23-A5P1L,A5P1L    ;SAVE BASE RPM
331  164F 8684 A             CHAR 8,17-A5P2L,A5P2L    ;SAVE DELTA RPM FOR EACH C
332  1650 9684 A             CHAR 9,17-A5P3L,A5P3L
333  1651 A684 A             CHAR 10,17-A5P4L,A5P4L
334  1652 B684 A             CHAR 11,17-A5P5L,A5P5L
335  1653 C684 A             CHAR 12,17-A5P6L,A5P6L
336  1654 D684 A             CHAR 13,17-A5P7L,A5P7L
337  1655 E684 A             CHAR 14,17-A5P8L,A5P8L
338  1656 F684 A             CHAR 15,17-A5P9L,A5P9L
339  1657 2149 A             JMP RTN
340                      ;
341  1658 891E A    SAT6:    LD R2,=SAVE6
342  1659 2923 A             JSR SAVEC
343  165A 000A A             .WORD 10
344  165B 4984 A             CHAR 4,23-A6P1L,A6P1L    ;SAVE RPM (MAX)
345  165C 5984 A             CHAR 5,23-A6P2L,A6P2L    ;SAVE CO (MAX)
346  165D 8982 A             CHAR 8,21-A6P3L,A6P3L    ;SAVE KV(MAX) PER PLUG
347  165E 9982 A             CHAR 9,21-A6P4L,A6P4L
348  165F A982 A             CHAR 10,21-A6P5L,A6P5L
349  1660 B982 A             CHAR 11,21-A6P6L,A6P6L
350  1661 C982 A             CHAR 12,21-A6P7L,A6P7L
351  1662 D982 A             CHAR 13,21-A6P8L,A6P8L
352  1663 E982 A             CHAR 14,21-A6P9L,A6P9L
353  1664 F982 A             CHAR 15,21-A6P10L,A6P10L
354  1665 213B A             JMP RTN
355  1666 8911 A    SAT7:    LD R2,=SAVE7
356  1667 2915 A             JSR SAVEC
357  1668 0009 A             .WORD 9
358  1669 5984 A             CHAR 5,23-A7P1L,A7P1L    ;SAVE RPM
359  166A 6984 A             CHAR 6,23-A7P2L,A7P2L    ;SAVE DEG DWELL
360  166B 7984 A             CHAR 7,23-A7P3L,A7P3L    ;SAVE DEG DELTA DWELL
361  166C 8984 A             CHAR 8,23-A7P4L,A7P4L    ;SAVE TIMING ADV.
362  166D 9984 A             CHAR 9,23-A7P5L,A7P5L    ;SAVE INIT. +ADV. ADVANCE
363  166E 9E03 A             CHAR 9,28,A7P6L          ;SAVE RET./ADV.
```

```
364  166F  A984  A           CHAR 10,23-A7P7L,A7P7L    ;SAVE PERCENT CO
365  1670  B984  A           CHAR 11,23-A7P8L,A7P8L    ;SAVE PPM HC
366  1671  C905  A           CHAR 12,23-A7P9L,A7P9L    ;SAVE CHARGING VOLTS
367  1672  2100  A           JMP .+1                   ;SOFTWARE SWITCH   ????????
368  1673  2505  A@          JMP GECOM                 ;USE /ST OPTION
369  1674  212C  A           JMP RTN                   ;NO /ST
370                   ;
371                   ;      CONSTANTS
372                   ;
373  1675  203B  A           .POOL 8
     1676  204B  A
     1677  206F  A
     1678  2087  A
     1679  1717  T
     167A  0000  A
     167B  0000  A
     167C  0000  A
374                   ;
375                   ;      UTILITY ROUTINE USED FOR SAVING CRT
376                   ;
377                          .LOCAL
378  167D  4700  A    SAVEC: PULL R3                   ;GET # OF ENTRIES
379  167E  8300  A           LD R0,(R3)                ;# OF ENTRIES IN R0
380  167F  CDFA  A    $1:    ADD R3,=1                 ;SET RTS ADRS.
381  1680  1501  A           BOC NZ, $2                ;RETURN IF 0 LEFT
382  1681  2300  A           JMP (R3)                  ;RETURN
383  1682  4000  A    $2:    PUSH R0                   ;SAVE # LEFT
384  1683  4300  A           PUSH R3                   ;SAVE RETURN ADRS.
385  1684  8300  A           LD R0,(R3)                ;GET CHARACTER  POS.
386  1685  3181  A           RCPY R0,R1                ;R0 = > R1
387  1686  65F4  A           AND R1,=03F               ;GET # OF CHARS.
388  1687  61F4  A           AND R0,=0FF80             ;GET POS OF CHARS.
389  1688  4000  A           PUSH R0                   ;SAVE POS.
390  1689  4FBC  A           LI R3,CRTADR              ;ADRS. OF CRT
391  168A  0600  A    $3:    ROUT                      ;OUTPUT CHAR. POS.
392  168B  0400  A           RIN                       ;INPUT CHARACTER
393  168C  61EE  A           AND R0,=03F               ;MASK ALL BUT CHAR
394  168D  5C01  A           SHL R0,1
395  168E  A200  A           ST R0,(R2)                ;STORE CHAR
396  168F  4400  A           PULL R0                   ;GET POS.
397  1690  6A00  A           OR R0,(R2)                ;POS  CHAR
398  1691  A200  A           ST R0,(R2)                ;STORE RESULT
399  1692  C9E7  A           ADD R2,=1                 ;NEXT STORE LOC.
400  1693  61E8  A           AND R0,=0FF80             ;GET CHAR. POS.
401  1694  C108  A           ADD R0,=128               ;NEXT CHAR POS
402  1695  4000  A           PUSH R0                   ;SAVE CHAR POS.
403  1696  49FF  A           AISZ R1,-1                ;TEST FOR LAST CHAR.
404  1697  21F2  A           JMP $3                    ;NO, GET NEXT
405  1698  4400  A           PULL R0                   ;YES,SCRATCH POS.
406  1699  4700  A           PULL R3                   ;GET RETURN ADR.
407  169A  4400  A           PULL R0                   ;GET # LEFT
408  169B  D1DE  A           SUB R0,=1                 ;DECR. # LEFT
409  169C  21E2  A           JMP $1
410  169D  0080  A           .POOL 4
     169E  0000  A
     169F  0000  A
     16A0  0000  A
411                   ;
412                   ;      RETURN ROUTINE FOR SAVE TEST
413                   ;
414  16A1  4C40  A    RTN:   LI R0,040
415  16A2  4F9C  A           LI R3,09C
416  16A3  C1FA  A           ADD R0,=0180
417  16A4  0600  A           ROUT
418  16A5  71D6  A           SKAZ R0,=0FF80
419  16A6  21FC  A           JMP .-3
420  16A7  8497  B           LD R1,SPCSV1;
421  16A8  8898  B           LD R2,SPCSV2              ;RETURN ROUTINE,RESTORE REGS
422  16A9  2DF5  A@          JSR RSTRSK
423  16AA  2496  B           JMP @SVADP                ;RETURN
424                   ;
425
```

SPECLB 2001/ST CONTROL PROG.
MOTHER COMPUTER COMMUNICATION SECTION

```
                                .PAGE 'MOTHER COMPUTER COMMUNICATION SECTION'
426                             ;
427                             ;MODEM INPUT ROUTINE
428                             ;
429                             .LOCAL
430                             ;
431                             ;UTILITY ROUTINES USED FOR COMMUNICATION
432                             ;
433                             .EXTD
434                             ;
435                             ;DEF. COM. CONSTANTS.
436        0380                 VADAD=0380
437        0001                 RDA=1
438        0010                 TBMT=010
439        0020                 CC=020
440        0040                 CF=040
441        0080                 CE=080
442        7EDF                 INTEST=07EDF
443        0011                 DC1=011
444                             ;
445                             ;RESET VADIC MODEM INTERFACE
446                             ;
447 16AB 2905 A   RESETM:  JSR SAVE          ;SAVE REGS.
448 16AC 8DF3 A            LD R3,=VADAD      ;MASTER RESET
449 16AD 0602 A            ROUT 2
450 16AE 4CAF A            LI R0,$CNTWRD     ;LOAD CONTROL WORD
451 16AF 0601 A            ROUT 1
452 16B0 2109 A            JMP RST
453      00AF    $CNTWRD=0AF
454                         ;
455                         ;   SAVE AND RESTORE REG ROUTINE
456                         ;
457 16B1 A104 A   SAVE:    ST R0,$REG        ;STORE REGS
458 16B2 A504 A            ST R1,$REG+1
459 16B3 A904 A            ST R2,$REG+2
460 16B4 AD04 A            ST R3,$REG+3
461 16B5 0200 A            RTS
462      16BA    $REG:    .=.+4
463 16BA 81FB A   RST:     LD R0,$REG        ;RESTORE REGS
464 16BB 85FB A            LD R1,$REG+1
465 16BC 89FB A            LD R2,$REG+2
466 16BD 8DFB A            LD R3,$REG+3
467 16BE 0200 A            RTS
468                         ;
469                         ;   SUBROUTINE TO DELAY APPROX. 1 MILLISEC.
470                         ;
471 16BF 29F1 A   DELAY:   JSR SAVE
472 16C0 5600 A            XCHRS R2          ;GET NO. OF MILS. TO DELAY
473 16C1 8200 A            LD R0,(R2)
474 16C2 5600 A            XCHRS R2
475 16C3 48FF A   $1:      AISZ R0,-1
476 16C4 2103 A            JMP $2
477 16C5 81F0 A            LD R0,$REG        ;RESTORE REGS BEFORE RETURN
478 16C6 85F0 A            LD R1,$REG+1
479 16C7 0201 A            RTS 1
480 16C8 4D60 A   $2:      LI R1,96          ;APPROX. 1 MILLISEC
481 16C9 49FF A            AISZ R1,-1
482 16CA 21FE A            JMP .-1
483 16CB 21F7 A            JMP $1
484                         ;
485                         ;   SUBROUTINE TO GET LINE FROM MODEM
486                         ;
487                         .LOCAL
488 16CC 8DD3 A   GETM:    LD R3,=VADAD      ;MODEM ADRS.
489 16CD 4E00 A            LI R2,0           ;SET UP BUFFER ADRS.
490 16CE 0404 A   $1:      RIN 4             ;GET STATUS
491 16CF 71AA A            SKAZ R0,=RDA      ;CHECK FOR INPUT
492 16D0 2105 A            JMP $2            ;INPUT
493 16D1 7131 A            SKAZ R0,=040      ;CHECK IF CARRIER STILL THERE
494 16D2 2101 A            JMP +2
```

```
495  16D3  21FA  A            JMP  $1              ; YES, CONT. SCAN
496  16D4  4400  A            PULL R0              ; NO
497  16D5  2141  A            JMP  GECOM
498  16D6  0400  A    $2:     RIN  0               ; INPUT CHARACTER
499  16D7  612C  A            AND  R0,=07F         ; ZERO OUT PARITY
500  16D8  11F5  A            BOC  Z,$1            ; IGNORE IF NULL CHARACTER
501  16D9  06D0  A            STB  BUF(R2)         ; STORE BYTE IN BUFFER
     16DA  4158  A
502  16DB  4A01  A            AISZ R2,1            ; INCREMENT BUFFER POINTER
503  16DC  F0C5  B            SKNE R0,EOL          ; TEST FOR STOP CHARACTER
504  16DD  2101  A            JMP  .+2
505  16DE  21EF  A            JMP  $1
506  16DF  4C00  A            LI   R0,0            ; WRITE EOF IN BUFFER
507  16E0  06D0  A            STB  BUF(R2)
     16E1  4158  A
508  16E2  4A01  A            AISZ R2,1
509  16E3  06D0  A            STB  BUF(R2)
     16E4  4158  A
510  16E5  4A01  A            AISZ R2,1
511  16E6  06D0  A            STB  BUF(R2)
     16E7  4158  A
512  16E8  0200  A            RTS                  ; NORMAL RETURN
513                           ;
514                           ; SUBROUTINE TO OUTPUT TO MODEM
515                           ;
516                           .LOCAL
517                           ;
518  16E9  A109  A    PUTM:   ST   R0,$REG         ; SAVE OUTPUT CHAR.
519  16EA  8DB5  A            LD   R3,=VADAD       ; SET VADIC ADRS.
520  16EB  0404  A    $1:     RIN  4               ; INPUT STATUS
521  16EC  7118  A            SKAZ R0,=TBMT        ; TEST FOR TRANSMIT BUFFER EMP
522  16ED  2101  A            JMP  .+2             ; NO, TEST AGAIN
523  16EE  21FC  A            JMP  $1              ; NO, TEST AGAIN
524  16EF  8103  A            LD   R0,$REG
525  16F0  0600  A            ROUT 0               ; OUTPUT CHARACTER
526  16F1  2D14  A@   JSR PUTC ;BUG****************************************
527  16F2  0200  A            RTS
528  16F3  0000  A    $REG:   .WORD 0
529                           ;
530                           ; SUBROUTINE TO OUTPUT A LINE TO THE MODEM
531                           ;
532                           .LOCAL
533                           ;
534  16F4  4600  A    LINEM:  PULL R2              ; GET OUTPUT ADRS.
535  16F5  4200  A            PUSH R2
536  16F6  8A00  A            LD   R2,(R2)
537  16F7  0A80  A            PFLG 2               ; SET FLAG FOR ROTATE, NO LINK
538  16F8  8200  A    $1:     LD   R0,(R2)         ; GET A CHARACTER
539  16F9  1106  A            BOC  Z,$2
540  16FA  58F8  A            ROR  R0,8            ; TOP BYTE FIRST
541  16FB  29ED  A            JSR  PUTM
542  16FC  58F8  A            ROR  R0,8            ; BOTTOM BYTE NEXT
543  16FD  29EB  A            JSR  PUTM
544  16FE  4A01  A            AISZ R2,1
545  16FF  21F8  A            JMP  $1
546  1700  4C0D  A    $2:     LI   R0,0D           ; OUTPUT A 'CR'
547  1701  29E7  A            JSR  PUTM
548  1702  0201  A            RTS  1
549  1703  0040  A            .POOL 12
     1704  007F  A
     1705  0010  A
     1706  7E59  A
     1707  0000  A
     1708  0000  A
     1709  0000  A
     170A  0000  A
     170B  0000  A
     170C  0000  A
     170D  0000  A
     170E  0000  A
550                           ;
551
```

SPECLB 2001/ST CONTROL PROG.
MAIN CALLING PROGRAM FOR COMLINK

```
                               .PAGE 'MAIN CALLING PROGRAM FOR COMLINK'
552                            ;
553                            .LOCAL
554                            .FORM MS,8,8
555  170F 0007 A   DIGITS:    .WORD 7,2,6,0,3,5,0,0C     ;GE METRO NUMBER
     1710 0002 A
     1711 0006 A
     1712 0000 A
     1713 0003 A
     1714 0005 A
     1715 0000 A
     1716 000C A
556  1717 4C00 A   GECOM:     LI R0,0
557  1718 4F80 A              LI R3,080                  ;TURN OFF RPM
558  1719 0620 A              ROUT 020
559  171A 2990 A              JSR RESETM                 ;RESET MODEM
560  171B 2DEB A@             JSR IMSGE                  ;INIT MSG AND ERASE
561  171C 183B T              .WORD $M1
562                            ;
563                            ;    AUTO DIAL SEC.
564                            ;
565  171D 0730 A   $A:        CLRBIT 0                   ;CLEAR DIALER
566  171E 060A A              ROUT 10
567  171F 060B A              ROUT 11
568  1720 89E7 A              LD R2,=DIGITS              ;GET ADRS. OF NUM. TO DIAL
569  1721 8DE7 A              LD R3,=VADAD               ;PERP. ADRS
570  1722 0720 A              SETBIT 0                   ;REQUEST CALL
571  1723 060A A              ROUT 10
572  1724 0408 A   $B:        RIN 8                      ;WAIT FOR PND
573  1725 13F7 A              BOC 3,$A                   ;TIME OUT, RETRY
574  1726 1401 A              BOC 4,.+2
575  1727 21FC A              JMP $B
576  1728 8200 A              LD R0,(R2)                 ;PRESENT NEXT DIGIT
577  1729 F1E0 A              SKNE R0,=0C                ;TEST FOR EON
578  172A 210A A              JMP $C
579  172B 4A01 A              AISZ R2,1                  ;SET UP FOR NEXT DIGIT
580  172C 0609 A              ROUT 9                     ;OUTPUT DIGIT
581  172D 0720 A              SETBIT 0                   ;SET NDP
582  172E 060B A              ROUT 11
583  172F 0408 A              RIN 8                      ;CHECK IF READ
584  1730 13EC A              BOC 3,$A                   ;CHECK FOR TIME OUT
585  1731 14FD A              BOC 4,.-2                  ;NOT READ
586  1732 0730 A              CLRBIT 0                   ;READ, RESET NDP
587  1733 060B A              ROUT 11
588  1734 21EF A              JMP $B
589                            ;
590                            ;   CHECK FOR VALID CARRIER
591                            ;
592  1735 0408 A   $C:        RIN 8                      ;END OF NUMBER
593  1736 13E6 A              BOC 3,$A                   ;TIME OUT?
594  1737 0404 A              RIN 4
595  1738 71CA A              SKAZ R0,=040               ;CARRIER?
596  1739 21FB A              JMP $C                     ;NO
597  173A 0730 A              CLRBIT 0                   ;YES, RESET REQUEST
598  173B 060A A              ROUT 10
599                            ;
600                            ;    VALID CARRIER DETECTED
601                            ;
602  173C 2982 A              JSR DELAY
603  173D 07D0 A              .WORD 2000
604  173E 4C48 A              LI R0,048                  ;OUTPUT PROMT TO COMPUTER
605  173F 0600 A              ROUT 0
606  1740 2DCA A@             JSR DELAY                  ;DELAY 1 SEC.
607  1741 05DC A              .WORD 1500
608  1742 4C48 A              LI R0,048                  ;OUTPUT PROMPT TO COMPUTER
609  1743 0600 A              ROUT 0
610  1744 2DC6 A@             JSR DELAY                  ;DELAY 1 SEC.
611  1745 03E8 A              .WORD 1000
612  1746 4C0D A              LI R0,0D                   ;OUTPUT A 'CR'
```

```
613  1747 0600 A            ROUT
614                  ;
615                  ;           WAIT FOR A REPLY
616                  ;
617  1748 4C11 A            LI R0,011
618  1749 A0C5 B            ST R0,EOL
619  174A 2981 A            JSR GETM            ;WAIT FOR A REPLY
620  174B 2DC0 A@           JSR IMSG            ;OUTPUT ESTABLISHING MESSAGE
621  174C 1831 T            .WORD $M2
622  174D 4C3F A            LI R0,03F           ;CHANGE EOL CHARACTER
623  174E A0C5 B            ST R0,EOL
624  174F 29A4 A            JSR LINEM           ;OUTPUT LOG ON MESG
625  1750 17D4 T            .WORD PSWRD
626  1751 2DBB A@           JSR GETM
627  1752 2DB9 A@           JSR IMSG            ;OUTPUT TRANSMITTING MSG
628  1753 1822 T            .WORD $M3
629  1754 290C A            JSR $TRANS          ;OUTPUT DATA
630  1755 2DB6 A@           JSR IMSG            ;OUTPUT ANALYSING MESSAGE
631  1756 17F6 T            .WORD $M4
632  1757 4C04 A            LI R0,04            ;CHANGE EOL CHAR. TO EOT
633  1758 A0C5 B            ST R0,EOL
634  1759 2DB3 A@           JSR GETM
635  175A 2DB1 A@           JSR IMSG            ;OUTPUT RECEIVED MESG
636  175B 17DF T            .WORD $M5
637  175C 2DAE A@           JSR DELAY           ;FOR ASCETIC PURPOSES
638  175D 07D0 A            .WORD 2000
639  175E 2101 A            JMP .+2              ;SOFTWARE SWITCH   ?????????
640  175F 25AE A@           JMP REST1           ;DISPLAY PREVIOUS TEST
641  1760 255F A@           JMP RSTCOM          ;DISPLAY ANAYLSIS ONLY
642  1761 815F A    $TRANS: LD R0,=TRNT         ;SET UP POINTER
643  1762 A11B A            ST R0,TRN
644  1763 951A A    $E:     LD R1,@TRN          ;LOAD LENGTH
645  1764 F55D A            SKNE R1,=0          ;END ?
646  1765 210F A            JMP $F              ;YES, END
647  1766 7917 A            ISZ TRN             ;NO, GET POISTION
648  1767 9916 A            LD R2,@TRN
649  1768 7915 A            ISZ TRN
650  1769 8200 A    $D:     LD R0,(R2)
651  176A 5CFF A            SHR R0,1
652  176B 6157 A            AND R0,=03F
653  176C E157 A            SKG R0,=01F
654  176D C195 A            ADD R0,=040
655  176E F156 A            SKNE R0,=04F        ;CHANGE 0 TO O
656  176F 8156 A            LD R0,=030
657  1770 2D56 A@           JSR PUTM
658  1771 4A01 A            AISZ R2,1
659  1772 49FF A            AISZ R1,-1
660  1773 21F5 A            JMP $D
661  1774 21EE A            JMP $E
662  1775 80B7 B    $F:     LD R0,IDDATA+1
663  1776 5CF8 A            SHR R0,8
664  1777 2D4F A@           JSR PUTM            ;OUTPUT ID #
665  1778 8068 B            LD R0,NCYL
666  1779 C14C A            ADD R0,=48
667  177A 2D4C A@           JSR PUTM            ;OUTPUT # OF CYL.
668  177B 4C0D A            LI R0,0D
669  177C 2D4A A@           JSR PUTM
670  177D 0200 A            RTS
671  177E 177F T    TRN:    .WORD TRNT
672  177F 0005 A    TRNT:   .WORD A1P1L,A1P1    ;STARTER BATTERY VOLTS
     1780 2001 A
673  1781 0004 A            .WORD A1P2L,A1P2    ;STARTER AMPS
     1782 2006 A
674  1783 0004 A            .WORD A1P3L,A1P3    ;CRANKING RPM
     1784 200A A
675  1785 0004 A            .WORD A1P5L,A1P5    ;STARTING DWELL
     1786 2013 A
676  1787 0002 A            .WORD A1P7L,A1P7    ;STARTING COIL OUTPUT
     1788 2019 A
677  1789 0004 A            .WORD A2P1L,A2P1    ;PEAK RPM
     178A 201B A
678  178B 0005 A            .WORD A2P2L,A2P2    ;PEAK AMPS
     178C 201F A
```

```
679 178D 0004 A        .WORD A3P1L,A3P1      ;IDLE RPM
    178E 2024 A
680 178F 0004 A        .WORD A3P2L,A3P2      ;IDLE DWELL
    1790 2028 A
681 1791 0004 A        .WORD A3P3L,A3P3      ;CO
    1792 202C A
682 1793 0004 A        .WORD A3P4L,A3P4      ;HC
    1794 2030 A
683 1795 0004 A        .WORD A3P5L,A3P5      ;INIT TIMING
    1796 2034 A
684 1797 0004 A        .WORD A4P2L,A4P2      ;CO
    1798 203F A
685 1799 0004 A        .WORD A4P3L,A4P3      ;HC
    179A 2043 A
686 179B 0002 A        .WORD A4P4L,A4P4      ;KV MIN
    179C 2047 A
687 179D 0002 A        .WORD A4P5L,A4P5      ;KV MAX
    179E 2049 A
688 179F 0004 A        .WORD A6P2L,A6P2      ;CO
    17A0 2073 A
689 17A1 0002 A        .WORD A6P3L,A6P3      ;PLUG # 1
    17A2 2077 A
690 17A3 0002 A        .WORD A6P4L,A6P4      ;PLUG # 2
    17A4 2079 A
691 17A5 0002 A        .WORD A6P5L,A6P5      ;PLUG # 3
    17A6 207B A
692 17A7 0002 A        .WORD A6P6L,A6P6      ;PLUG # 4
    17A8 207D A
693 17A9 0002 A        .WORD A6P7L,A6P7      ;PLUG # 5
    17AA 207F A
694 17AB 0002 A        .WORD A6P8L,A6P8      ;PLUG # 6
    17AC 2081 A
695 17AD 0002 A        .WORD A6P9L,A6P9      ;PLUG # 7
    17AE 2083 A
696 17AF 0002 A        .WORD A6P10L,A6P10    ;PLUG # 10
    17B0 2085 A
697 17B1 0004 A        .WORD A7P2L,A7P2      ;DWELL
    17B2 208B A
698 17B3 0004 A        .WORD A7P3L,A7P3      ;DELTA DWELL
    17B4 208F A
699 17B5 0004 A        .WORD A7P4L,A7P4      ;TIMING ADVANCE
    17B6 2093 A
700 17B7 0004 A        .WORD A7P5L,A7P5      ;INIT ADV.
    17B8 2097 A
701 17B9 0004 A        .WORD A7P7L,A7P7      ;CO
    17BA 209E A
702 17BB 0004 A        .WORD A7P8L,A7P8      ;HC
    17BC 20A2 A
703 17BD 0005 A        .WORD A7P9L,A7P9      ;CHARGING RPM
    17BE 20A6 A
704 17BF 0000 A        .WORD 0               ;END OF TABLE
705 17C0 189B T        .POOL 20
    17C1 177F T
    17C2 0000 A
    17C3 003F A
    17C4 001F A
    17C5 004F A
    17C6 0030 A
    17C7 16E9 T
    17C8 0000 A
    17C9 0000 A
    17CA 0000 A
    17CB 0000 A
    17CC 0000 A
    17CD 0000 A
    17CE 0000 A
    17CF 0000 A
    17D0 0000 A
    17D1 0000 A
    17D2 0000 A
    17D3 0000 A
706
```

SPECLB 2001/ST CONTROL PROG.
COMLINK MESSAGES

```
                                    .PAGE /COMLINK MESSAGES/
707                        ;
708                        ;       MESSAGES
709                        ;
710 17D4 424A A   PSWRD:   .ASCII /BJB89001,ELSUN,2001/
    17D5 4238 A
    17D6 3930 A
    17D7 3031 A
    17D8 2C45 A
    17D9 4C53 A
    17DA 554E A
    17DB 2C32 A
    17DC 3030 A
    17DD 3120 A
711 17DE 0000 A           .WORD 0
712 17DF E0E0 A   $M5:    MS 128+96,128+96
713 17E0 E0E0 A           MS 128+96,128+96
714 17E1 A044 A           MS 128+32,/D//256
715 17E2 4941 A           .ASCII /IAGNOSTIC RESULTS/
    17E3 474E A
    17E4 4F53 A
    17E5 5449 A
    17E6 4320 A
    17E7 5245 A
    17E8 5355 A
    17E9 4C54 A
    17EA 5320 A
716 17EB AC4E A           MS 32+128+12,/N//256
717 17EC 4F57 A           .ASCII /OW BEING RECEIVED/
    17ED 2042 A
    17EE 4549 A
    17EF 4E47 A
    17F0 2052 A
    17F1 4543 A
    17F2 4549 A
    17F3 5645 A
    17F4 4420 A
718 17F5 6060 A           MS 96,96
719 17F6 E0E0 A   $M4:    MS 128+96,128+96
720 17F7 E044 A           MS 128+96,/D//256
721 17F8 4941 A           .ASCII /IAGNOSTIC CENTER NOW ANALYZING/
    17F9 474E A
    17FA 4F53 A
    17FB 5449 A
    17FC 4320 A
    17FD 4345 A
    17FE 4E54 A
    17FF 4552 A
    1800 204E A
    1801 4F57 A
    1802 2041 A
    1803 4E41 A
    1804 4C59 A
    1805 5A49 A
    1806 4E47 A
722 1807 A054 A           MS 128+32,/T//256
723 1808 4553 A           .ASCII /EST RESULTS BY COMPARING THEM/
    1809 5420 A
    180A 5245 A
    180B 5355 A
    180C 4C54 A
    180D 5320 A
    180E 4259 A
    180F 2043 A
    1810 4F4D A
    1811 5041 A
    1812 5249 A
    1813 4E47 A
    1814 2054 A
    1815 4845 A
```

```
        1816 4D20 A
    724 1817 AC57 A                MS 128+32+12,'W'/256
    725 1818 4954 A                .ASCII 'ITH STORED VALUES'
        1819 4820 A
        181A 5354 A
        181B 4F52 A
        181C 4544 A
        181D 2056 A
        181E 414C A
        181F 5545 A
        1820 5320 A
    726 1821 6060 A                MS 96,96
    727 1822 E0E0 A      $M3:      MS 128+96,128+96
    728 1823 A354 A                MS 128+32+3,'T'/256
    729 1824 5241 A                .ASCII 'RANSMITTING TEST RESULTS'
        1825 4E53 A
        1826 4D49 A
        1827 5454 A
        1828 494E A
        1829 4720 A
        182A 5445 A
        182B 5354 A
        182C 2052 A
        182D 4553 A
        182E 554C A
        182F 5453 A
    730 1830 6060 A                MS 96,96
    731 1831 E0C7 A      $M2:      MS 128+96,128+64+7
    732 1832 4C49 A                .ASCII 'LINK ESTABLISHED'
        1833 4E4B A
        1834 2045 A
        1835 5354 A
        1836 4142 A
        1837 4C49 A
        1838 5348 A
        1839 4544 A
    733 183A 6060 A                MS 96,96
    734 183B C053 A      $M1:      MS 2*32+128,'S'/256
    735 183C 554E A                .ASCII 'UN 2001 COMPUTER ESTABLISHING'
        183D 2032 A
        183E 3030 A
        183F 3120 A
        1840 434F A
        1841 4D50 A
        1842 5554 A
        1843 4552 A
        1844 2045 A
        1845 5354 A
        1846 4142 A
        1847 4C49 A
        1848 5348 A
        1849 494E A
        184A 4720 A
    736 184B A343 A                MS 128+32+3,'C'/256
    737 184C 4F4D A                .ASCII 'OMMUNICATION LINK TO CENTER'
        184D 4D55 A
        184E 4E49 A
        184F 4341 A
        1850 5449 A
        1851 4F4E A
        1852 204C A
        1853 494E A
        1854 4B20 A
        1855 544F A
        1856 2043 A
        1857 454E A
        1858 5445 A
        1859 5220 A
    738 185A 6060 A                MS 96,96
    739
```

SPECLB 2001/ST CONTROL PROG.
RESTORE AREA TEST ROUTINES

```
                                    .PAGE 'RESTORE AREA TEST ROUTINES'
740  185B  4F80  A    REST1:   LI   R3,080              ;RESET GRAPHIC CONTR.
741  185C  0620  A             ROUT 020
742  185D  4C00  A             LI   R0,0
743  185E  A0A9  B             ST   R0,TSTNUM
744  185F  2D6A  A@            JSR  IMSGE               ;RESTORE AREA TEST #1
745  1860  0298  A             .WORD 0298
746  1861  2978  A             JSR  RESTV               ;RESTORE VALUES
747  1862  2001  A             .WORD SAVE1+1
748  1863  201A  A             .WORD SAVE2-1
749  1864  8166  A             LD   R0,=REST2           ;SET POINTER FOR NEXT PAGE
750  1865  A096  B             ST   R0,SVADP
751  1866  2565  A@            JMP  PRINT               ;PRINT PAGE
752                     ;
753                     ;       AREA TEST TWO
754                     ;
755  1867  2D62  A@  REST2:    JSR  IMSGE
756  1868  0342  A             .WORD 0342
757  1869  2970  A             JSR  RESTV
758  186A  201B  A             .WORD SAVE2
759  186B  2023  A             .WORD SAVE3-1
760  186C  8160  A             LD   R0,=REST3
761  186D  A096  B             ST   R0,SVADP
762  186E  217A  A             JMP  PRINT
763                     ;
764                     ;       AREA TEST THREE
765                     ;
766  186F  2D5A  A@  REST3:    JSR  IMSGE
767  1870  03A7  A             .WORD 03A7
768  1871  2968  A             JSR  RESTV
769  1872  2024  A             .WORD SAVE3
770  1873  203A  A             .WORD SAVE4-1
771  1874  8159  A             LD   R0,=REST4
772  1875  A096  B             ST   R0,SVADP
773  1876  2172  A             JMP  PRINT
774                     ;
775                     ;       AREA TEST FOUR
776                     ;
777  1877  2D52  A@  REST4:    JSR  IMSGE
778  1878  03F6  A             .WORD 03F6
779  1879  2960  A             JSR  RESTV
780  187A  203B  A             .WORD SAVE4
781  187B  204A  A             .WORD SAVE5-1
782  187C  8152  A             LD   R0,=REST5
783  187D  A096  B             ST   R0,SVADP
784  187E  216A  A             JMP  PRINT
785                     ;
786                     ;       AREA TEST FIVE
787                     ;
788  187F  297F  A   REST5:    JSR  IMSGE
789  1880  047D  A             .WORD 047D
790  1881  2958  A             JSR  RESTV
791  1882  204B  A             .WORD SAVE5
792  1883  206E  A             .WORD SAVE6-1
793  1884  854B  A             LD   R1,=08462          ;OUTPUT CYL #S
794  1885  2D4B  A@            JSR  OCYL
795  1886  814B  A             LD   R0,=REST6
796  1887  A096  B             ST   R0,SVADP
797  1888  2160  A             JMP  PRINT
798                     ;
799                     ;       AREA TEST SIX
800                     ;
801  1889  2975  A   REST6:    JSR  IMSGE
802  188A  0525  A             .WORD 0525
803  188B  294E  A             JSR  RESTV
804  188C  206F  A             .WORD SAVE6
805  188D  2086  A             .WORD SAVE7-1
806  188E  8544  A             LD   R1,=084E2          ;OUTPUT PLUG #S
807  188F  2D41  A@            JSR  OCYL
808  1890  8143  A             LD   R0,=REST7
```

```
809  1891 A096 B              ST R0,SVADP
810  1892 2156 A              JMP PRINT
811                ;
812                ;           AREA TEST SEVEN
813                ;
814  1893 296B A   REST7:      JSR IMSGE
815  1894 0589 A               .WORD 0589
816  1895 2944 A               JSR RESTV
817  1896 2087 A               .WORD SAVE7
818  1897 20AA A               .WORD SAVEND-1
819  1898 813C A               LD R0,=RSTCOM
820  1899 A096 B               ST R0,SVADP
821  189A 214E A               JMP PRINT
822                ;
823                ;           PRINT OUT COMPUTER RESULTS
824                ;
825                            .LOCAL
826  189B 4E00 A   RSTCOM:     LI R2,0
827  189C 8139 A               LD R0,=BUF
828  189D A11A A               ST R0,$PBUF
829  189E 06C0 A   $1:         LDB BUF(R2)
     189F 4158 A
830  18A0 6136 A               AND R0,=07F
831  18A1 F136 A               SKNE R0,=0D             ;CR
832  18A2 8136 A               LD R0,=128+32
833  18A3 F14B A               SKNE R0,=0A             ;LF
834  18A4 814B A               LD R0,=103              ;IGNORE LFS
835  18A5 F14B A               SKNE R0,=0C             ;FF
836  18A6 2108 A               JMP $PAGE
837  18A7 F14A A               SKNE R0,=04             ;EOT
838  18A8 2109 A               JMP $2
839  18A9 E149 A               SKG R0,=01F
840  18AA 8145 A               LD R0,=103
841  18AB 06D0 A               STB BUF(R2)
     18AC 4158 A
842  18AD C946 A               ADD R2,=1
843  18AE 21EF A               JMP $1
844  18AF 8145 A   $PAGE:      LD R0,=$NPAGE
845  18B0 A909 A               ST R2,$3
846  18B1 2101 A               JMP .+2
847  18B2 8143 A   $2:         LD R0,=RESTRT
848  18B3 A096 B               ST R0,SVADP
849  18B4 8142 A               LD R0,=96
850  18B5 06D0 A               STB BUF(R2)
     18B6 4158 A
851  18B7 2947 A               JSR IMSGE
852  18B8 20AC A   $PBUF:      .WORD BUF
853  18B9 212F A               JMP PRINT
854       18BB    $3:          .=.+1
855  18BB 89FE A   $NPAGE:     LD R2,$3
856  18BC 8133 A               LD R0,=103
857  18BD 06D0 A               STB BUF(R2)
     18BE 4158 A
858  18BF 4DFE A               LI R1,0FE
859  18C0 3683 A               RAND R1,R2
860  18C1 06D0 A               STB BUF(R2)
     18C2 4158 A
861  18C3 C930 A               ADD R2,=1
862  18C4 3881 A               RCPY R2,R0
863  18C5 5CFF A               SHR R0,1
864  18C6 6131 A               AND R0,=07FFF
865  18C7 C10E A               ADD R0,=BUF
866  18C8 A1EF A               ST R0,$PBUF
867  18C9 21D4 A               JMP $1
868       010B    RESTRT=010B
869  18CA 18FF T               .POOL 16
     18CB 1867 T
     18CC 18E9 T
     18CD 186F T
     18CE 1877 T
     18CF 187F T
     18D0 8462 A
     18D1 0D8D A
```

```
            18D2 1889  T
            18D3 84E2  A
            18D4 1893  T
            18D5 189B  T
            18D6 20AC  A
            18D7 007F  A
            18D8 000D  A
            18D9 00A0  A
870                        ;
871                        ;            RESTORE VARIABLE ROUTINE
872                        ;
873                                     .LOCAL
874  18DA 4F9C  A  RESTV:  LI R3,CCADR           ;SET UP CHAR CONTR. ADRS.
875  18DB 5700  A          XCHRS R3              ;GET STARTING ADRS.
876  18DC 8B00  A          LD R2,(R3)            ;R2-----ADRS
877  18DD 5700  A  $1:     XCHRS R3              ;GET CCADR
878  18DE 0400  A          RIN 0                 ;GET STATUS
879  18DF 1301  A          BOC ODD,.+2           ;WAIT FOR READY
880  18E0 21FD  A          JMP .-2
881  18E1 8200  A          LD R0,(R2)            ;GET OUTPUT
882  18E2 0600  A          ROUT 0                ;OUTPUT => CRT
883  18E3 5700  A          XCHRS R3
884  18E4 C90F  A          ADD R2,=1             ;NEXT OUTPUT
885  18E5 EB01  A          SKG R2,1(R3)          ;CMP TO LAST
886  18E6 21F6  A          JMP $1                ;NOT DONE
887  18E7 5700  A          XCHRS R3              ; RETURN => STACK
888  18E8 0202  A          RTS 2                 ;RETURN
889                        ;
890                        ;            PRINT ROUTINE
891                        ;
892  18E9 4C01  A  PRINT:  LI R0,1
893  18EA C0A9  B          ADD R0,TSTNUM
894  18EB A0A9  B          ST R0,TSTNUM
895  18EC 2D0C  A@         JSR DELAY
896  18ED 05DC  A          .WORD 1500
897  18EE 250B  A@         JMP PRINTM
898                        ;
899                        ;            CONSTANTS
900                        ;
901  18EF 000A  A          .POOL 16
     18F0 0067  A
     18F1 000C  A
     18F2 0004  A
     18F3 001F  A
     18F4 0001  A
     18F5 18BB  T
     18F6 010B  A
     18F7 0060  A
     18F8 7FFF  A
     18F9 16BF  T
     18FA 141C  A
     18FB 0000  A
     18FC 0000  A
     18FD 0000  A
     18FE 0000  A
902                        ;
903
```

SPECLB 2001/ST CONTROL PROG.
INDIRECT MESSAGE GENERATOR

```
                                     .PAGE 'INDIRECT MESSAGE GENERATOR'
904                                  .LOCAL
905                        IMSGE:
906  18FF 2DFB  A@         JSR CCWAIT
907  1900 4C01  A          LI R0,1
908  1901 0600  A          ROUT 0                ;ERASE (R0=1)
909                        ;
910  1902 4C00  A  IMSG:   LI R0,0
911  1903 A071  B          ST R0,OFFSET
912  1904 4600  A  IMSG0:  PULL R2
913  1905 4200  A          PUSH R2
914  1906 8A00  A          LD R2,(R2)
```

```
915  1907  8071 B           LD R0,OFFSET
916  1908  5C07 A           SHL R0,7
917  1909  A079 B           ST R0,RTDATA              ;ROUT DATA WORD
918                    ;    THIS IS THE RECOURSE ENTRY
919  190A  8200 A   $NXT:   LD R0,0(R2)
920  190B  5CF8 A           SHR R0,8
921  190C  2904 A           JSR $PC                   ;PROCESS CHARACTER
922  190D  8200 A           LD R0,0(R2)
923  190E  2902 A           JSR $PC
924  190F  4A01 A           AISZ R2,1
925  1910  21F9 A           JMP $NXT
926                    ;
927                    ;    PROCESS CHAR FROM R0
928                    ;
929  1911  6123 A   $PC:    AND R0,$XFF
930  1912  E123 A           SKG R0,$X1F
931  1913  210F A           JMP $WORD                 ;USE WORD TABLE
932  1914  F122 A           SKNE R0,$X20              ;BLANK
933  1915  25E6 A@          JMP SPAC
934  1916  F121 A           SKNE R0,$X30
935  1917  4C4F A           LI R0,'0'/256             ;CONVERT ZERO TO AN ALPHA
936  1918  E120 A           SKG R0,$X5F
937  1919  25E3 A@          JMP CHAR                  ;CHAR
938  191A  F11F A           SKNE R0,$X60
939  191B  210F A           JMP $END
940  191C  F11E A           SKNE R0,$X66              ;WORD END
941  191D  210A A           JMP $WEND
942  191E  F11D A           SKNE R0,$X67
943  191F  0200 A           RTS                       ;IGNORE
944  1920  E11C A           SKG R0,$X7F
945                    ;    ERROR, ILLEGAL CHARACTER
946  1921  25DA A@          JMP SPAC
947                    ;    SKIP RR ROWS, SET CCCCC COLUMN
948  1922  25DB A@          JMP SKIP
949                    ;
950                    ;    WORD FROM DICTIONARY TABLE
951                    ;
952  1923  4200 A   $WORD:  PUSH R2                   ;SAVE R2
953  1924  9919 A           LD R2,@$WTBL
954  1925  3200 A           RADD R0,R2
955  1926  8A00 A           LD R2,0(R2)
956  1927  21E2 A           JMP $NXT
957                    ;
958                    ;    WORD END
959                    ;
960  1928  4600 A   $WEND:  PULL R2
961  1929  4600 A           PULL R2
962  192A  0200 A           RTS
963                    ;
964                    ;    END
965                    ;
966  192B  4400 A   $END:   PULL R0
967  192C  0201 A           RTS 1
968  192D  0000 A           .POOL 8
     192E  0000 A
     192F  0000 A
     1930  0000 A
     1931  0000 A
     1932  0000 A
     1933  0000 A
     1934  0000 A
969                    ;
970                    ;    CONSTANTS
971                    ;
972  1935  00FF A   $XFF:   .WORD 0FF
973  1936  001F A   $X1F:   .WORD 01F
974  1937  0020 A   $X20:   .WORD 020
975  1938  0030 A   $X30:   .WORD 030
976  1939  005F A   $X5F:   .WORD 05F
977  193A  0060 A   $X60:   .WORD 060
978  193B  0066 A   $X66:   .WORD 066
979  193C  0067 A   $X67:   .WORD 067
980  193D  007F A   $X7F:   .WORD 07F
```

```
981 193E 0CE6 A  $WTBL:  .WORD 0CE6
982              ;
983              ;        POINTERS FOR SUNCOM
984              ;
985
```

SPECLB 2001/ST CONTROL PROG.
POINTERS AND SYMBOL TABLE

```
                          .PAGE 'POINTERS AND SYMBOL TABLE'
986      0000             .END
ASECT PTRS

TSECT PTRS 1619 2000 A
    161A 2001 A
    161B 201B A
    161C 2024 A
    167A 0001 A
    167B 003F A
    167C FF80 A
    169E 0180 A
    169F 1532 A
    16A0 0380 A
    1707 18FF T
    1708 170F T
    1709 0380 A
    170A 000C A
    170B 16BF T
    170C 1902 T
    170D 16CC T
    170E 185B T
    18FB 0D86 A
    18FC 0CCA A
    18FD 0CC5 A
    18FE 0CBB A
BSECT PTRS

SYMBOL MAP
A1P1     2001   A
A1P1L    0005   A
A1P2     2006   A
A1P2L    0004   A
A1P3     200A   A
A1P3L    0004   A
A1P4     200E   A*
A1P4L    0005   A
A1P5     2013   A
A1P5L    0004   A
A1P6     2017   A*
A1P6L    0002   A
A1P7     2019   A
A1P7L    0002   A
A2P1     201B   A
A2P1L    0004   A
A2P2     201F   A
A2P2L    0005   A
A3P1     2024   A
A3P1L    0004   A
A3P2     2028   A
A3P2L    0004   A
A3P3     202C   A
A3P3L    0004   A
A3P4     2030   A
A3P4L    0004   A
A3P5     2034   A
A3P5L    0004   A
A3P6     2038   A*
A3P6L    0003   A
A4P1     203B   A*
A4P1L    0004   A
```

SPECLB 2001/ST CONTROL PROG.
POINTERS AND SYMBOL TABLE

```
A4P2     203F   A
A4P2L    0004   A
A4P3     2043   A
A4P3L    0004   A
A4P4     2047   A
A4P4L    0002   A
A4P5     2049   A
A4P5L    0002   A
A5P1     204B   A*
A5P1L    0004   A
A5P2     204F   A*
A5P2L    0004   A
A5P3     2053   A*
A5P3L    0004   A
A5P4     2057   A*
A5P4L    0004   A
A5P5     205B   A*
A5P5L    0004   A
A5P6     205F   A*
A5P6L    0004   A
A5P7     2063   A*
A5P7L    0004   A
A5P8     2067   A*
A5P8L    0004   A
A5P9     206B   A*
A5P9L    0004   A
A6P1     206F   A*
A6P10    2085   A
A6P10L   0002   A
A6P1L    0004   A
A6P2     2073   A
A6P2L    0004   A
A6P3     2077   A
A6P3L    0002   A
A6P4     2079   A
A6P4L    0002   A
A6P5     207B   A
A6P5L    0002   A
A6P6     207D   A
A6P6L    0002   A
A6P7     207F   A
A6P7L    0002   A
A6P8     2081   A
A6P8L    0002   A
A6P9     2083   A
A6P9L    0002   A
A7P1     2087   A*
A7P1L    0004   A
A7P2     208B   A
A7P2L    0004   A
A7P3     208F   A
A7P3L    0004   A
A7P4     2093   A
A7P4L    0004   A
A7P5     2097   A
A7P5L    0004   A
A7P6     209B   A*
A7P6L    0003   A
A7P7     209E   A
A7P7L    0004   A
A7P8     20A2   A
A7P8L    0004   A
A7P9     20A6   A
A7P9L    0005   A
ADVPT    0011   B*
BACKPT   0017   B*
BKSPC    000D   A*
BSECT    0000   B
BUF      20AC   A
```

SPECLB 2001/ST CONTROL PROG.
POINTERS AND SYMBOL TABLE

```
CANCEL   000A   A*
CC       0020   A*
CCADR    009C   A
CCWAIT   0D86   A
CE       0080   A*
CF       0040   A*
CHAR     0CC5   A
CLKADR   00B8   A*
COMPT    00C5   B*
CRTADR   00BC   A
CUEMOD   0025   B*
DC1      0011   A*
DELAY    16BF   T
DIGITS   170F   T
DOT      000B   A*
EIGHT    0008   A*
EOL      00C5   B
FIVE     0005   A*
FOUR     0004   A*
GECOM    1717   T
GETM     16CC   T
IDDATA   00B6   B
IMSG     1902   T
IMSGE    18FF   T
IMSGO    1904   T*
INTEST   7EDF   A*
ISADR    0088   A*
KBVAL    0051   B*
LEZ      000B   A
LINEM    16F4   T
MESG     7EC3   A*
MINUS    000F   A*
MS              FORM
MSG      0C9D   A*
MSGE     0C9A   A*
MSGO     0C9F   A*
NCYL     0068   B
NINE     0009   A*
NZ       0005   A
OCYL     0D8D   A
ODD      0003   A
OFFSET   0071   B
ONE      0001   A*
P        0002   A*
PMEM     00AC   A*
PMEMX    FFAC   A*
PRCD     000E   A*
PRINT    18E9   T
PRINTA   1418   A
PRINTM   141C   A
PRTADR   00B0   A*
PSWRD    17D4   T
PUTC     7E59   A
PUTM     16E9   T
R0       0000   A
R1       0001   A
R2       0002   A
R3       0003   A
RDA      0001   A
RELOC    0000   A
RESETM   16AB   T
REST1    185B   T
REST2    1867   T
REST3    186F   T
REST4    1877   T
REST5    187F   T
REST6    1889   T
REST7    1893   T
RESTRT   010B   A
```

SPECLB 2001/ST CONTROL PROG.
POINTERS AND SYMBOL TABLE

| | | | | | | |
|---|---|---|---|---|---|---|
| RESTV | 18DA | T | | $1 | 16CE | T |
| RST | 16BA | T | | $1 | 16EB | T |
| RSTCOM | 189B | T | | $1 | 16F8 | T |
| RSTRSK | 1532 | A | | $1 | 189E | T |
| RSTRT | 0010 | A* | | $1 | 18DD | T |
| RTDATA | 0079 | B | | $2 | 1604 | T |
| RTN | 16A1 | T | | $2 | 1682 | T |
| SAT1 | 1625 | T | | $2 | 16C8 | T |
| SAT2 | 1632 | T | | $2 | 16D6 | T |
| SAT3 | 1638 | T | | $2 | 1700 | T |
| SAT4 | 1642 | T | | $2 | 18B2 | T |
| SAT5 | 164B | T | | $3 | 160C | T* |
| SAT6 | 1658 | T | | $3 | 168A | T |
| SAT7 | 1666 | T | | $3 | 18BA | T |
| SAVE | 16B1 | T | | $A | 171D | T |
| SAVE1 | 2000 | A | | $B | 1724 | T |
| SAVE2 | 201B | A | | $C | 1735 | T |
| SAVE3 | 2024 | A | | $CNTWR | 00AF | A |
| SAVE4 | 203B | A | | $D | 1769 | T |
| SAVE5 | 204B | A | | $E | 1763 | T |
| SAVE6 | 206F | A | | $END | 192B | T |
| SAVE7 | 2087 | A | | $F | 1775 | T |
| SAVEC | 167D | T | | $M1 | 183B | T |
| SAVEND | 20AB | A | | $M2 | 1831 | T |
| SEVEN | 0007 | A* | | $M3 | 1822 | T |
| SIX | 0006 | A* | | $M4 | 17F6 | T |
| SKIP | 0CBB | A | | $M5 | 17DF | T |
| SPAC | 0CCA | A | | $NPAGE | 18BB | T |
| SPCSV1 | 0097 | B | | $NXT | 190A | T |
| SPCSV2 | 0098 | B | | $PAGE | 18AF | T |
| STAB | 161D | T | | $PBUF | 18B8 | T |
| STACK | 00AF | B* | | $PC | 1911 | T |
| STCKSV | 1529 | A | | $REG | 16B6 | T |
| SVADP | 0096 | B | | $REG | 16F3 | T |
| SVADP1 | 1609 | T | | $TRANS | 1761 | T |
| TBMT | 0010 | A | | $WEND | 1928 | T |
| TDCRCL | 000C | A* | | $WORD | 1923 | T |
| THREE | 0003 | A* | | $WTBL | 193E | T |
| TRN | 177E | T | | $X1F | 1936 | T |
| TRNT | 177F | T | | $X20 | 1937 | T |
| TSTNUM | 00A9 | B | | $X30 | 1938 | T |
| TWO | 0002 | A* | | $X5F | 1939 | T |
| VADAD | 0380 | A | | $X60 | 193A | T |
| Z | 0001 | A | | $X66 | 193B | T |
| ZERO | 0000 | A* | | $X67 | 193C | T |
| $1 | 1603 | T | | $X7F | 193D | T |
| $1 | 167F | T | | $XFF | 1935 | T |
| $1 | 16C3 | T | | | | |

NO ERROR LINES
SOURCE CK. = 0654

```
PROG2A        09:20CST    02/18/77

100C                ANALYSIS PROGRAM FOR /ST
110C
120C
130C
140 REAL IN(47)
150C THIS IS THE NEW VERSION OF PROG2
160 IMPLICIT REAL (A-H,I-Z)
170 INTEGER ALCR/0/,PT(27)/27*0/,IEOT/4/
180 REAL X(27)
190 REAL A(27)/9.6,200.,80.,100.,32.,28.,20.,2000.,20.,550.,650.,28.,
200 &          32.,1.0,500.,4.,10.,20.,28.,32.,2.,70.,1.0,500.,13.5,
210 &          14.5,8./
220 REAL B(27)/4.9,200.,80.,100.,43.,37.,16.,2000.,18.,550.,650.,37.,
230 &          43.,1.0,500.,4.,10.,16.,37.,43.,2.,70.,1.0,500.,6.7,
240 &          7.3,6./
250 REAL C(27)/9.6,180.,80.,100.,43.,37.,20.,2000.,18.,550.,650.,37.,
260 &          43.,1.0,300.,6.,12.,20.,37.,43.,2.,70.,1.0,300.,13.5,
```

```
270 &              14,5,6,/
280 LP=4
290 CALL CMD ('TYPE 6')
300 CALL CMD ('SET BI')
310 INPUT 100,CBAT,STAT A,CRPM,CDW,CLO,PS,AP,SI,DI,CO,HC,TI,COI,
320 &           HCI,KVI,KVA,COI,PA,PB,PC,PD,PE,PF,PG,PH,HDW,DD,TA,
330 &           AI,COK,HCK,CHV,ID,ICYL
340 100 FORMAT(F5.0,3F4.0,F2.0,F4.0,F5.0,7F4.0,2F2.0,
350 &           F4.0,8F2.0,6F4.0,F5.0,2I1)
360 IF (ID-2) 182,185,187
370 182 DO 183 I=1,27
380 X(I)=B(I)
390 183 CONTINUE
400 GO TO 190
410 185 DO 186 I=1,27
420 X(I)=C(I)
430 186 CONTINUE
440 GO TO 190
450 187 DO 188 I=1,27
460 X(I)=A(I)
470 188 CONTINUE
480 190 IF(ABS(CBAT) .LT. X(1)) PT(1)=1
490 IF (ABS(STAT A) .GT. X(2)) PT(2)=1
500 IF (ABS(STAT A) .LT. X(3)) PT(3)=1
510 IF (CRPM .LT. X(4)) PT(4)=1
520 IF (CDW .GT. X(5)) PT(5)=1
530 IF (CDW .LT. X(6)) PT(6)=1
540 IF (CLO .LT. X(7)) PT(7)=1
550 IF(PS .LT. X(8)) PT(8)=1
560 IF(ABS(AP) .LT. X(9)) PT(9)=1
570 IF(SI .LT. X(10)) PT(10)=1
580 IF(ST .GT. X(11)) PT(11)=1
590 IF(DI .LT. X(12)) PT(12)=1
600 IF(DI .GT. X(13)) PT(13)=1
610 IF(CO .GT. X(14)) PT(14)=1
620 IF(HC .GT. X(15)) PT(15)=1
630 IF(TI .LT. X(16)) PT(16)=1
640 IF(TI .GT. X(17)) PT(17)=1
650 IF(KVA .LT. X(18)) PT(18)=1
660 IF(HDW .LT. X(19)) PT(19)=1
670 IF(HDW .GT. X(20)) PT(20)=1
680 IF(DD .GT. X(21)) PT(21)=1
690 IF(TA .GT. X(22)) PT(22)=1
700 IF(COK .GT. X(23)) PT(23)=1
710 IF(HCK .GT. X(24)) PT(24)=1
720 IF(CHV .LT. X(25)) PT(25)=1
730 IF(CHV .GT. X(26)) PT(26)=1
740 DO 203 I=1,7
750 IF (PT(I) .EQ. 1) GO TO 204
760 203 CONTINUE
770 GO TO 261
780 204 CALL TITLE(1,LP,ALCR)
790 IF(PT(1) .NE. 1) GO TO 210
800 LP=LP+4
810 PRINT 205,CBAT
820 205 FORMAT(" BATTERY    ="F5.1," VOLTS")
830 PRINT 206,X(1)
840 206 FORMAT(" LO LIMIT   ="F5.1," VOLTS")
850 PRINT," CHECK CHARGER/STARTER SYSTEM"
860 PRINT," "
870 210 IF (PT(2) .NE. 1) GO TO 215
880 LP=LP+4
890 PRINT 211,STAT A
900 211 FORMAT(" STARTER DRAW  ="F5.1," AMPS")
910 PRINT 212, X(2)
920 212 FORMAT(" HI LIMIT      ="F5.1," AMPS")
930 PRINT," CHECK STARTER SYSTEM"
940 PRINT," "
950 215 IF (PT(3) .NE. 1) GO TO 220
960 LP=LP+4
970 PRINT 216,STAT A
980 216 FORMAT(" STARTER DRAW  ="F5.1," AMPS")
990 PRINT 217, X(3)
```

```
1000 217 FORMAT(" LO LIMIT       ="F5.1," AMPS")
1010 PRINT," CHECK STARTER STYSTEM"
1020 PRINT," "
1030 220 IF (PT(4) .NE. 1) GO TO 230
1040 IF (LP .GT. 12) CALL TITLE (1,LP,ALCR)
1050 LP=LP+4
1060 PRINT 221,CRPM
1070 221 FORMAT (" CRANKING SPEED   ="F5.0," RPM")
1080 PRINT 222, X(4)
1090 222 FORMAT(" LO LIMIT         ="F5.0," RPM")
1100 PRINT," CHECK STARTER STYSTEM"
1110 PRINT," "
1120 230.IF (PT(5) .NE. 1) GO TO 240
1130 IF (LP .GT. 12) CALL TITLE(1,LP,ALCR)
1140 LP=LP+4
1150 PRINT 231,CDW
1160 231 FORMAT(" DWELL       ="F5.1," DEG")
1170 PRINT 232, X(5)
1180 232 FORMAT(" HI LIMIT    ="F5.1," DEG")
1190 PRINT," ADJUST DWELL"
1200 PRINT," "
1210 240 IF (PT(6) .NE. 1) GO TO 250
1220 IF (LP .GT. 12) CALL TITLE(1,LP,ALCR)
1230 LP=LP+4
1240 PRINT 241,CDW
1250 241 FORMAT(" DWELL       ="F5.1," DEG")
1260 PRINT 242,X(6)
1270 242 FORMAT(" LO LIMIT    ="F5.1," DEG")
1280 PRINT," ADJUST DWELL"
1290 PRINT," "
1300 250 IF (PT(7) .NE. 1) GO TO 265
1310 IF (LP .GT. 12) CALL TITLE(1,LP,ALCR)
1320 LP=LP+4
1330 PRINT 251,CLO
1340 251 FORMAT(" COIL OUTPUT  = "F4.1," KV")
1350 PRINT 252,X(7)
1360 252 FORMAT(" LO LIMIT     = "F4.1," KV")
1370 PRINT," CHECK IGNITION SYSTEM"
1380 PRINT," "
1390 GO TO 265
1400 261 PRINT," "
1410 PRINT,"   TEST 1 PARAMETERS OK"
1420 PRINT," "
1421 265 DO 267 I=8,9
1422 IF (PT(I) .EQ. 1) GO TO 270
1423 267 CONTINUE
1424 GO TO 290
1430 270 IF(PT(8) .NE. 1) GO TO 280
1440 CALL TITLE(2,LP,ALCR)
1450 LP=LP+4
1460 PRINT 271, PS
1470 271 FORMAT(" PEAK ENGINE SPEED "F5.0," RPM")
1480 PRINT,"SPEED TOO LO FOR MAX OUTPUT"
1490 PRINT," "
1500 280 IF(PT(9) .NE. 1) GO TO 291
1510 IF(LP .GT. 12)CALL TITLE(2,LP,ALCR)
1520 LP=LP+4
1530 PRINT 281,AP
1540 281 FORMAT(" ALTERNATOR PEAK   ="F5.1," AMPS")
1550 PRINT 282,X(9)
1560 282 FORMAT(" LO LIMIT          ="F5.1," AMPS")
1570 PRINT," CHECK CHARGING SYSTEM"
1571 PRINT," "
1573 GO TO 291
1585 290 CALL TITLE (2,LP,ALCR)
1590 PRINT," "
1600 PRINT,"   TEST 2 PARAMETERS OK"
1610 PRINT," "
1613 291 DO 292 I=10,17
1614 IF (PT(I) .EQ. 1) GO TO 293
1615 292 CONTINUE
1616 GO TO 650
1620 293 IF (PT(10) .NE. 1) GO TO 300
```

```
1630 CALL TITLE (3,LP,ALCR)
1640 LP=LP+4
1650 PRINT 295,SI
1660 295 FORMAT(" ENGINE SPEED      ="F5.0," RPM")
1670 PRINT 296,X(10)
1680 296 FORMAT(" LO LIMIT          ="F5.0," RPM")
1690 PRINT," ENGINE SPEED LO"
1700 PRINT," "
1710 300 IF(PT(11) .NE. 1) GO TO 350
1715 IF (ALCR .NE. 3) CALL TITLE(3,LP,ALCR)
1720 LP=LP+4
1730 PRINT 310,SI
1740 310 FORMAT(" ENGINE SPEED      ="F5.0," RPM")
1750 PRINT 312,X(11)
1760 312 FORMAT(" HI LIMIT          ="F5.0," RPM")
1770 PRINT," ENGINE SPEED HI"
1780 PRINT," "
1790 350 IF(PT(12) .NE. 1) GO TO 400
1800 LP=LP+4
1810 PRINT 355,DI
1820 355 FORMAT(" DWELL             ="F5.1," DEG")
1830 PRINT 357,X(12)
1840 357 FORMAT(" LO LIMIT          ="F5.1," DEG")
1850 PRINT," ADJUST DWELL"
1860 PRINT," "
1870 400 IF(PT(13) .NE. 1) GO TO 450
1875 IF (LP .GT. 12) CALL TITLE (3,LP,ALCR)
1880 LP=LP+4
1890 PRINT 425,DI
1900 425 FORMAT(" DWELL             ="F5.1," DEG")
1910 PRINT 430,X(13)
1920 430 FORMAT(" HI LIMIT          ="F5.1," DEG")
1930 PRINT," ADJUST DWELL"
1940 PRINT," "
1950 450 IF(PT(14) .NE. 1) GO TO 500
1960 LP=LP+4
1970 PRINT 475,CO
1980 475 FORMAT(" CO                ="F4.1," X")
1990 PRINT 480,X(14)
2000 480 FORMAT(" HI LIMIT          ="F4.1," X")
2010 PRINT," CHECK CARB SETTING"
2020 PRINT," "
2030 500 IF(LP .GT. 12) CALL TITLE(3,LP,ALCR)
2040 IF (PT(15) .NE. 1) GO TO 550
2050 LP=LP+4
2060 PRINT 525,HC
2070 525 FORMAT(" HC                ="F4.1," PPM")
2080 PRINT 535,X(15)
2090 535 FORMAT(" HI LIMIT          ="F4.1," PPM")
2100 PRINT," CHECK CARB & IGNITION"
2110 PRINT," "
2120 550 IF(PT(16) .NE. 1) GO TO 600
2130 IF(LP .GT. 12) CALL TITLE(3,LP,ALCR)
2140 PRINT 575,TI
2150 575 FORMAT(" INITIAL TIMING ="F4.1," DEG ADV.")
2160 PRINT 585,X(16)
2170 585 FORMAT(" LO LIMIT          ="F4.1," DEG ADV.")
2180 PRINT," "
2190 600 IF (PT(17) .NE. 1) GO TO 655
2200 PRINT 625,TI
2210 625 FORMAT(" INITIAL TIMING ="F4.1," DEG ADV.")
2220 PRINT 635,X(17)
2230 635 FORMAT(" HI LIMIT          ="F4.1," DEG ADV.")
2240 PRINT," "
2250 GO TO 655
2270 650 CALL TITLE (3,LP,ALCR)
2280 PRINT," "
2290 PRINT,"    TEST 3 PARAMETERS OK"
2300 PRINT," "
2310 PRINT," "
2320 655 IF(PT(18) .NE. 1) GO TO 700
2330 CALL TITLE(4,LP,ALCR)
2340 PRINT 675,KVA
```

```
2350 675 FORMAT(" IGN SECONDARY    ="F4.1," KV")
2360 PRINT 685,X(18)
2370 685 FORMAT(" LO LIMIT         ="F4.1," KV")
2380 PRINT," CHECK IGNITION SYSTEM"
2390 PRINT," "
2400 GO TO 709
2410 700 CALL TITLE(4,LP,ALCR)
2420 PRINT," "
2430 PRINT,"   TEST 4 PARAMETERS OK"
2440 PRINT," "
2450 PRINT," "
2460 709 DO 710 I=1,27
2470 PT(I)=0
2480 710 CONTINUE
2490 IEOT=4
2500 PRINT 720,IEOT
2510 720 FORMAT(A4)
2520 CALL CMD ('BYE')
2530 STOP;END
2540 SUBROUTINE TITLE(I,LP,ALCR)
2550 STRING F(7) /'         TEST 1-CRANKING',
2560 &'   TEST 2-ALTERNATOR OUTPUT',
2570 &'          TEST 3-IDLE',
2580 &'       TEST 4-LOW CRUSIE',
2590 &'TEST 5-AUTOMATIC POWER BALANCE',
2600 &'     TEST 6-SNAP ACCELERATION',
2610 &'       TEST 7-HIGH CRUISE'/
2620 LP=4
2630 IFF=12
2640 IF (ALCR .GE. 1) PRINT 10,IFF
2650 10 FORMAT(A4)
2660 ALCR=I
2670 PRINT," "
2680 PRINT,F(I)
2690 PRINT," "
2700 RETURN,END
```

READY

?

```
        TEST 1-CRANKING

BATTERY    =  0.  VOLTS
LO LIMIT   = 4.9 VOLTS
 CHECK CHARGER/STARTER SYSTEM

STARTER DRAW   = 0.   AMPS
LO LIMIT       = 80.0 AMPS
 CHECK STARTER STYSTEM

CRANKING SPEED =  0.  RPM
LO LIMIT       = 100. RPM
 CHECK STARTER STYSTEM

TEST 1-CRANKING

DWELL      =  0.  DEG
LO LIMIT   = 37.0 DEG
 ADJUST DWELL

COIL OUTPUT  = 0.   KV
LO LIMIT     = 16.0 KV
 CHECK IGNITION SYSTEM

TEST 2-ALTERNATOR OUTPUT

PEAK ENGINE SPEED   0. RPM
SPEED TOO LO FOR MAX OUTPUT

ALTERNATOR PEAK  = 0.   AMPS
LO LIMIT         = 18.0 AMPS
 CHECK CHARGING SYSTEM
```

```
TEST 3-IDLE

ENGINE SPEED   =   0   RPM
LO LIMIT       = 550   RPM
  ENGINE SPEED LO

DWELL          =  0.   DEG
LO LIMIT       = 37.0  DEG
  ADJUST DWELL

INITIAL TIMING =  0.   DEG ADV
LO LIMIT       =  4.0  DEG ADV

TEST 4-LOW CRUISE

IGN SECONDARY  =  0.   KV
LO LIMIT       = 16.0  KV
  CHECK IGNITION SYSTEM 00042.99 CRU     0000.12  TCH      0013.96  KC

OFF AT 09:26CST 02/18/77
```

What is claimed is:

1. Apparatus for analyzing a first internal combustion engine located at a first site and a second internal combustion engine located at a second site displaced from the first site comprising:

first data acquisition means located at the first site for generating, displaying and storing first condition data quantitatively defining a plurality of conditions of the first engine and for displaying first diagnostic data resulting from analysis of the first condition data based on first program instructions;

second data acquisition means located at the second site for generating, displaying and storing second condition data quantitatively defining a plurality of conditions of the second engine and for displaying second diagnostic data resulting from analysis of the second condition data based on second program instructions;

data processor means located at a third site displaced from the first and second sites for storing a data base defining engine condition specifications and for analyzing the first and second condition data by means of the data base in order to generate the first diagnostic data representing a diagnostic evaluation of the first engine and the second diagnostic data representing a diagnostic evaluation of the second engine;

first memory means located at the first site and dedicated to the storage of said first program instructions independent of the data processor means;

second memory means located at the second site and dedicated to the storage of said second program instructions independent of the data processor means;

terminal means for updating the data base; and linking means for enabling the first and second condition data to be transmitted from the first and second data acquisition means, respectively, to the data processor means, for enabling the first and second diagnostic data to be transmitted from the data processor means to the first and second data acquisition means, respectively, and for enabling the first and second diagnostic data to be stored by the first and second data acquisition means, respectively, whereby acquisition and display of condition data representing engine conditions occurs at the sites of the engines, detailed analysis of the condition data is performed by the data processor means at the third site, and the results of the analysis are displayed at the sites of the engines, so that engines at displaced sites can be analyzed in detail by means of an up-to-date data base located at a remote site.

2. Apparatus, according to claim 1, wherein the terminal means is located at a fourth site displaced from the first, second and third sites, and wherein the linking means further comprises means for enabling the terminal means to communicate with the data processor means.

3. Apparatus, according to claim 1, wherein said linking means includes telephone line means for transferring the first and second condition data and the first and second diagnostic data in serial form between the first and second acquisition means, respectively, and the data processor means; wherein said first data acquisition means includes first converting means connectable to said linking means for converting the first condition data from parallel to serial form and for converting the first diagnostic data from serial to parallel form; and wherein said second data acquisition means includes second converting means connectable to said linking means for converting the second condition data from parallel to serial form and for converting the second diagnostic data from serial to parallel form.

4. Apparatus, according to claim 3, wherein said first and second data acquisition means each includes dialing means for dialing a telephone number onto said telephone line means.

5. Apparatus, according to claim 3, wherein the first data acquisition means comprises:

measurement means connectable to the first internal combustion engine for generating a plurality of digital measurement signals corresponding to said first engine conditions;

display means having a face for displaying a plurality of numbers indicative of the plurality of engine conditions, first character groups indicative of the units in which the engine conditions are measured, and second character groups indicative of the diagnostic data;

third memory means for storing first character code signals corresponding to said character groups;

display controller means for enabling the display means to display said numbers and first and second character groups in response to said first condition data, said first character code signals and said first diagnostic data; and acquisition processor means
(i) for utilizing the values of said digital measurement signals to produce said first condition data;
(ii) for enabling the transmission of the first condition data and said first character code signals to said display controller means so that the numbers and first character groups are displayed,
(iii) for enabling the transmission of first condition data to said first converting means, so that the first condition data is transmitted to the data processor means, and
(iv) for enabling the transmission of said first diagnostic data from the first converting means to the display controller means, whereby the results of the diagnosis performed by the data processor means can be displayed on the display means.

6. Apparatus, according to claim 5, wherein the acquisition processor means comprises means for enabling the transmission of the first condition data to the first converting means to the exclusion of the first character code signals, whereby only the data needed for diagnosis is transmitted to the data processor means.

7. Apparatus, according to claim 6, wherein the acquisition processor means comprises means for enabling the transmission of the first condition data to the first converting means in a predetermined order, so that the data processor means is able to identify the type of condition data received from the order in which the condition data is received.

8. Apparatus, according to claim 1, wherein the data processor means comprises:
central memory means for storing the data base, and
central computer means for comparing the first and second condition data with a portion of the data base to determine whether the conditions of the first and second engines be within the limits established by the data base.

9. Apparatus, as claimed in claim 1, wherein the first internal combustion engine is a first type of engine and the second internal combustion engine is a second type of engine different from the first type of engine.

10. Apparatus, as claimed in claim 9, wherein the linking means further comprises means for transmitting to the data processor means an identification of the first type of engine and an identification of the second type of engine.

11. Apparatus, as claimed in claim 1, wherein the linking means comprises means for enabling the first data acquisition means to display the status of the communication between the data processor means and the first data acquisition means.

12. Apparatus, as claimed in claim 1, wherein the data processor means comprises means for recording the amount of use of the data processor means by the first data acquisition means and for separately recording the amount of use of the data processor means by the second data acquisition means.

13. Apparatus, as claimed in claim 1, wherein the linking means comprises means for initiating communication with data processor means and wherein the data processor means comprises means for terminating communication with the first or second data acquisition means after the first or second diagnostic data has been transmitted.

14. Apparatus for use in a system including a remote data processor capable of generating diagnostic data representing a diagnostic evaluation of condition data which quantitatively defines a plurality of conditions of an internal combustion engine, the diagnostic data and condition data being transmitted over linking means, said apparatus comprising:
measurement means connectable to the internal combustion engine for generating a plurality of digital measurement signals corresponding to a plurality of engine conditions;
memory means for storing the condition data and diagnostic data and for storing program instructions independent of the remote data processor;
communication means for enabling the linking means to transmist the condition data to the remote data processor and for enabling the receipt of the diagnostic data from the linking means;
display means for displaying condition numbers representing the value of the condition data and for displaying diagnostic characters in response to the diagnostic data; and
acquisition processor means for (i) utilizing said digital measurement signals to produce said condition data quantitatively defining said engine conditions, (ii) storing said condition data in said memory means, (iii) enabling the display means to display the condition numbers in response to the condition data, (iv) enabling said communication means to establish communication with the linking means so that the condition data is transmitted to the remote data processor, and the diagnostic data is received from the remote data processor, and (v) enabling the display means to display the diagnostic characters in response to the diagnostic data, whereby acquisition of condition data representing engine conditions can occur at the site of the engine and diagnostic evaluation of the engine conditions can occur at a site remote from the engine.

15. Apparatus, according to claim 14 wherein the communication means comprises:
transfer means for establishing an intercommunicational link with the telephone line means so that the condition data can be transmitted in serial format to the remote data processor and so that the diagnostic data can be received in serial format from the remote data processor; and
converter means for converting the parallel format condition data to serial format and for converting the serial format diagnostic data to parallel format.

16. Apparatus according to claim 15 wherein the memory means comprises means for storing the condition data in parallel format and wherein the acquisition processor means comprises means for:
(i) transmitting the condition data from the memory means to the converter means so that the condition data is converted to serial format; and
(ii) enabling the converter means to convert the serial format diagnostic data to parallel format.

17. Apparatus according to claim 15 wherein said transfer means includes dialing means for dialing a telephone number onto the telephone line means; and wherein said acquisition processor means includes means for instructing said dialing means to dial a telephone number for linking said transfer means to the remote data processor.

18. Apparatus according to claim 17 wherein said transfer means includes:
- transmitter means for transmitting the serial format condition data to the remote data processor; and
- receiver means for receiving the serial format diagnostic data from the remote data processor.

19. Apparatus according to claim 14 wherein:
said display means includes a display face for displaying at a plurality of display locations on the face the condition numbers; and
said memory means includes a first memory section having a plurality of storage locations for storing said condition data and a second memory section for storing a plurality of display address signals each corresponding to one of said display locations and one of said storage locations;
wherein said apparatus further includes:
display controller means for enabling said display means to display said condition numbers at said display locations in response to the display address signals and the condition data;
memory controller means for enabling the first memory section to store said condition data in response to the display address signals; and
wherein said acquisition processor means comprises means for transmitting the condition and display address signals to said display controller means and said memory controller means during a single time period.

20. Apparatus according to claim 19 wherein said memory means includes a third memory section; and wherein said acquisition processor means comprises means for retrieving from said first memory section a portion of the condition data corresponding to one of the condition numbers, for forming a data word signal by combining the retrieved condition data with the associated display address signal, for storing said data word signal in a selected location in said third memory section, and for transferring said data word signal from said third memory section to said converter means.

21. A method of analyzing a first internal combustion engine located at a first site by means of a first dedicated memory and analyzing a second internal combustion engine located at a second site displaced from the first site by means of a second dedicated memory, comprising the steps of:
- permanently storing first program instructions in the first dedicated memory and locating said memory at the first site;
- permanently storing second program instructions in the second dedicated memory and locating said memory at the second site;
- generating, displaying and storing, at the first site, first condition data quantitatively defining a plurality of conditions of the first engine based on said first program instructions;
- generating, displaying and storing, at the second site, second condition data quantitatively defining a plurality of conditions of the second engine based on said second program instructions;
- storing a data base defining engine condition specifications at a third site displaced from the first and second sites;
- transmitting the first and second condition data from the first and second sites, respectively, to the third site;
- analyzing, at the third site, the first and second condition data for diagnostically evaluating the first and the second engines respectively, said analyzing including utilizing the data base;
- generating, at the third site, first diagnostic data representing the diagnostic evaluation of the first engine and generating second diagnostic data representing the diagnostic evaluation of the second engine;
- transmitting the first and second diagnostic data from the third site to the first site and the second site, respectively;
- storing the first diagnostic data at the first site;
- storing the second diagnostic data at the second site; and
- displaying, at the first site, the first diagnostic data and displaying, at the second site, the second diagnostic data.

22. The method according to claim 21 wherein said step of generating, displaying and storing first condition data includes storing said first condition data in parallel format; wherein said step of generating, displaying and storing second condition data includes storing said second condition data in parallel format; and wherein the method further includes converting said first and second stored condition data to a serial format prior to said transmitting of the first and second condition data.

23. The method according to claim 22 wherein said step of transmitting first and second diagnostic data includes transmitting said first and second diagnostic data in serial format; and wherein the method further includes converting said first and second diagnostic data to a parallel format prior to said step of displaying.

* * * * *